US008651957B2

(12) United States Patent
Goldman et al.

(10) Patent No.: US 8,651,957 B2
(45) Date of Patent: Feb. 18, 2014

(54) SYSTEM AND METHOD FOR FANTASY SPORTS GAMBLING

(75) Inventors: Justin Edward Goldman, Wayne, PA (US); Robert Daniel Shedd, Yardley, PA (US); Alan David deLevie, Bexley, OH (US); Jonathan Beatty, Co. Meath (IE); Simon Keating, Co. Meath (IE); Daire Manning, Co. Meath (IE); Catherine O'Mahony, Co. Meath (IE)

(73) Assignee: Paddy Power PLC (IE)

( * ) Notice: Subject to any disclaimer, the term of this patent is extended or adjusted under 35 U.S.C. 154(b) by 141 days.

(21) Appl. No.: 13/307,892

(22) Filed: Nov. 30, 2011

(65) Prior Publication Data

US 2012/0115585 A1 May 10, 2012

Related U.S. Application Data

(63) Continuation-in-part of application No. 12/870,287, filed on Aug. 27, 2010, now abandoned.

(60) Provisional application No. 61/418,092, filed on Nov. 30, 2010.

(51) Int. Cl.
*A63F 13/00* (2006.01)

(52) U.S. Cl.
USPC .................................................. 463/42; 463/4

(58) Field of Classification Search
USPC .................................................. 463/42
See application file for complete search history.

(56) References Cited

U.S. PATENT DOCUMENTS

2009/0203447 A2* 8/2009 Hansen et al. .................. 463/42
2010/0311484 A1* 12/2010 Suh et al. .......................... 463/4

* cited by examiner

*Primary Examiner* — Aurthur O Hall
*Assistant Examiner* — Jeffrey Wong
(74) *Attorney, Agent, or Firm* — Jack Schwartz & Associates, PLLC

(57) ABSTRACT

A method and system for providing an interactive gaming system is disclosed. At least one interactive social gaming community allows a plurality of users to engage in a wagering contest against a single entity. An initial amount of gaming units associated with an initial user investment is allocated to each user. A payout table is dynamically generated and includes at least one threshold amount of gaming units associated with rewards available to the user. A bet request signal received from a user is automatically reconciled with an outcome of at least one type of contest occurring during an active gaming period. A user account is updated by modifying an amount of gaming units in a user account based on a result of the at least one type of contest and determines if user has earned the reward associated with the at least one threshold.

23 Claims, 30 Drawing Sheets

602

600

Fig 12
Welcome, Rob
MY LEAGUES
PLACE BETS
BET HISTORY
MY BET STATS
GUIDES & RULES
NATIONAL LEADERBOARD
Your bets have been placed! What would you like to do next?
1) Place new bets
close this bar
Bet History
League
Type
Date
Sport
Game
Bet
Final Results
Risk Amount
Lock
Amount Won

SYSTEM AND METHOD FOR FANTASY SPORTS GAMBLING

CROSS REFERENCE TO RELATED APPLICATIONS

This application is a continuation in part application of U.S. patent application Ser. No. 12/870,287 filed on Aug. 27, 2010 by Justin Edward Goldman et al. and also claims priority from U.S. Provisional Patent Application Ser. No. 61/418,092 filed on Nov. 30, 2010 by Justin Edward Goldman et al.

FIELD OF THE INVENTION

The invention concerns a type of interactive gaming community that allows users to test wagering skills on various contests occurring within a given time period without directly competing against other users in the community.

BACKGROUND OF THE INVENTION

Interactive electronic and online games are well known and widely implemented and played by users all over the world. The types of games vary in nature, setup, design and implementation. A common type of game is called a Fantasy game and is associated with a particular type of sport or event. An example of this type of game is a Fantasy Football game which may be operated online by a service provider that allows users to log in and access their servers to play the game entirely online and in a remote manner. These games allow individuals to gather together and form a league whereby each league member selects players in the National Football League to create a team and utilize in-game statistics for the selected players to create a score. The individuals are then able to use these scores to compete against other individuals to determine who has selected a better team of players. These types of games have been extended to every different type of professional sports league including baseball, basketball, hockey, golf, soccer and car racing. These games have also been extended into the arena of amateur sporting leagues and association such as college football and basketball. However, a drawback associated with these types of games is that typically, the leagues only allow players to operate within a single sport and the players are limited to using the statistics of the players selected as a basis for competition.

Wagering on sporting events is thought by some to be an activity that enhances the fun for sports fans during the actual games because the wagers represent an interest for the individual in the outcome of the game. However, many sports fans do not participate in this activity due to the strict restrictions placed on sports wagering and for fear of losing a substantial amount of money. Therefore, there is a desire to create and implement a game whereby the users are able to wager on sporting events in the setting of an online social game that enables sports fans to enjoy the thrill of sports betting in a low risk and fun environment. While online gambling websites exist that allow users to wager on real sporting events, these sites require users to wager with real funds and generally provide a solitary gaming environment. However, the wagering starts and ends with the particular contests. These sites do not provide a gaming environment that allows all players to play in a social environment while hiding the actual buy in amount provided by each member. Therefore a need exists to provide a system that automatically hosts and facilitates a fantasy wagering game that allows a single user to compete against a single non-human entity (e.g. “the house”) to test their skill in wagering real money on a plurality of sporting events in a social gaming environment. A further need exists for a system that enables a single user to engage in a game alone or with groups of friends to wager on outcomes of particular events across a number of different sporting leagues over a given period of time. A system and method according to invention principles remedies the drawbacks associated noted above.

SUMMARY OF THE INVENTION

A method and system provides an interactive gaming system for a plurality of users connected via a communication network. At least one interactive social gaming community is provided that allows a plurality of users to engage in a wagering contest against the house. A user is able to access at least one game having a predetermined set of rules that set forth at least one of a game duration and define at least one type of contest on which a wager may be placed by the accessing user. Input is received from a user identifying (a) at least one game to be joined and (b) an initial investment value to be placed on the outcome of the at least one game. Data representing a dynamic payout table is automatically generated. The payout table includes a plurality of threshold values defining points at which rewards (or penalties) may be applied to a user. Data representing the dynamic payout table based on the initial investment value is transmitted to the user for display on a user display device. A user account is automatically updated with an amount of initial gaming units and the user is provided access to the selected gaming environment. A game clock is presented to the user for the selected game. A user interface is generated and the user interface includes a plurality of user selectable image elements that enable the user to wager an amount of gaming units on at least one type of wager on at least one type of contest that is available during the active gaming period. A bet request signal is received and includes data representing (a) the amount of gaming units to be wagered; (b) at least one contest type; and (c) at least one bet type to be placed. The bets placed by the user are automatically reconciled and the user account is automatically updated by (a) adding gaming units won to the user account in response to winning bets; (b) subtracting gaming units lost from the user account in response to losing bets and (c) making no modification to the user account.

In one embodiment, a method for providing an interactive gaming system for a plurality of users connected via a communication network is disclosed. At least one interactive social gaming community allowing a plurality of users to engage in a wagering contest against a single entity is created. An initial amount of gaming units is allocated to each user, the initial amount of gaming units associated with an initial investment amount selected by the user. Data representing a payout table is dynamically generated and includes at least one threshold including an amount of gaming units associated with at least one type of reward available to the user. A bet request signal received from a user and is automatically reconciled with an outcome of at least one type of contest occurring during an active gaming period, the bet request signal including data representing an amount of gaming units to be associated with at least one type of wager on the at least one type of contest. A user account is updated by modifying an amount of gaming units in a user account based on a result of the at least one type of wager and data representing a current amount of gaming units in the user account is compared with the at least one threshold to determine if user has earned the at least one type of reward associated with the at least one threshold.

In another embodiment, an interactive gaming system is provided. The system includes a processor that creates at least one interactive social gaming community allowing a plurality of users to engage in a wagering contest against a single entity. The processor allocates an initial amount of gaming units to each user, the initial amount of gaming units associated with an initial investment amount selected by the user and dynamically generates data representing a payout table including at least one threshold including an amount of gaming units associated with at least one type of reward available to the user. A bet request signal received from a user is automatically reconciled with an outcome of at least one type of contest, the bet request signal including data representing an amount of gaming units to be associated with at least one type of wager on the at least one type of contest. The processor updates a user account by modifying an amount of gaming units in a user account based on a success of the at least one type of wager and compares data representing a current amount of gaming units in the user account with the at least one threshold to determine if the user has earned the at least one type of reward associated with the at least one threshold. An image generator is connected to the processor and generates display images in response to a control signal from said processor and enables the plurality of players to access the system and an interface connects the processor to the plurality of users through a communication network and provides the display images from the image generator to the plurality of users.

BRIEF DESCRIPTION OF THE DRAWING FIGURES

DETAILED DESCRIPTION

Figure 1:
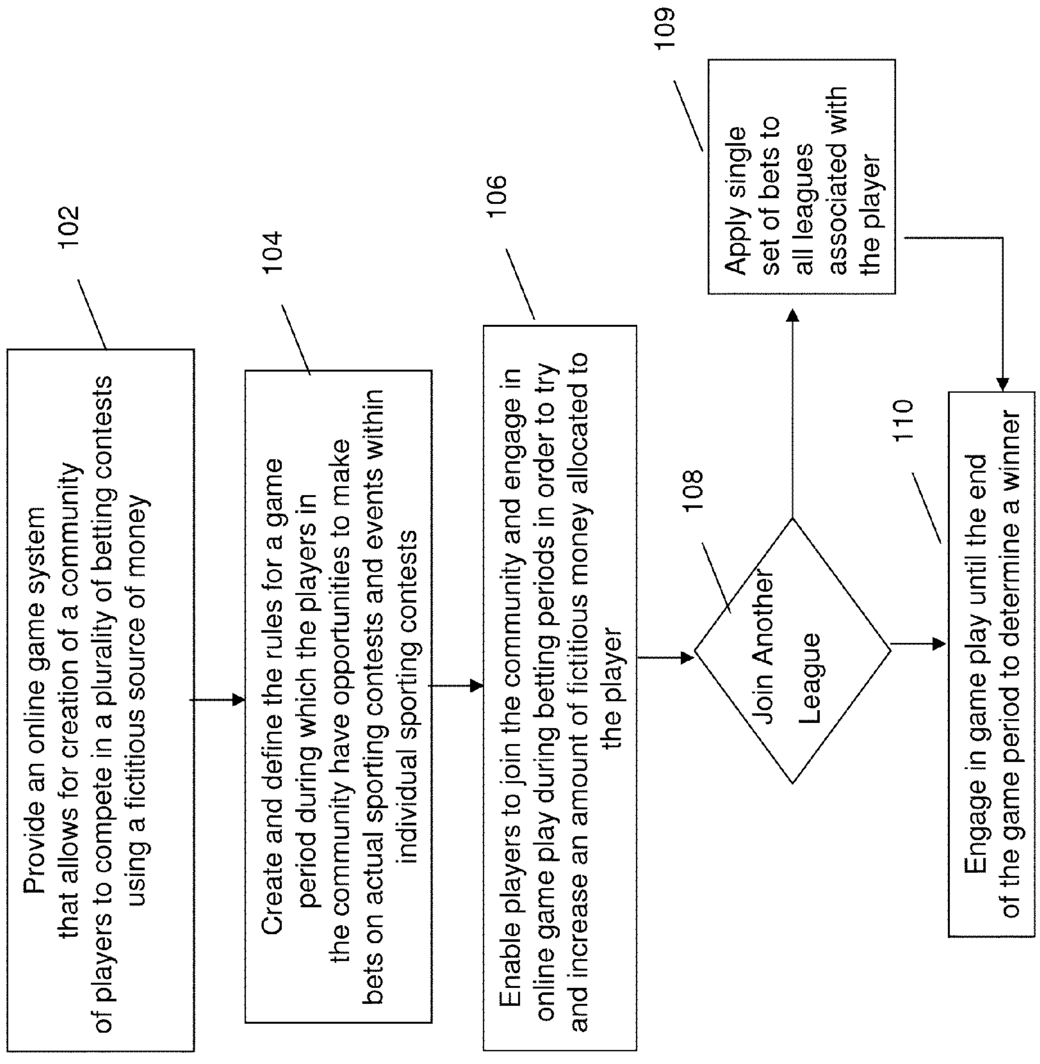
FIG. 1 is a flow diagram detailing an algorithm for implementing and operating a fantasy sports gaming system according to invention principles.

An executable application, as used herein, comprises code or machine readable instructions for conditioning a processor to implement predetermined functions, such as those of an operating system, a context acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A processor as used herein is a device for executing machine-readable instructions stored on a computer readable medium, for performing tasks and may comprise any one or a combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between.

A user interface (UI), as used herein, comprises one or more display images, generated by a display processor and enabling user interaction with a processor or other device and associated data acquisition and processing functions. Data representing a UI design may be pre-stored in a repository or database in advance of execution and display thereof. The UI is caused to be displayed by combining the dynamic output processing code or executable applications (based on the information retrieved from the database) into the UI at runtime. The UI may also include an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application manipulates the UI display images in response to the signals received from the input devices, for example via a user's browser. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

FIG. 1 details an algorithm for creating and operating a fantasy sports betting system. In step 102, a system and method provides and implements a game enabling a plurality of individuals to gather for the purpose wagering on the outcome of a plurality of different types of sporting events without risking actual money. A community of users is advantageously created and allows the individuals (users) to determine how to organize themselves into individual leagues having a predetermined number of individuals in order to participate in and the system determines which of the users has the greatest amount of success selecting the winner or outcome of various contests as well as events occurring during a particular contest. A contest may include a sporting event such as a football or baseball game. However, a contest as used herein may refer to a live or pre-recorded television show that is outcome based and includes at least one event or occurrence that a person may wager on. For example, a reality television show may be the contest and a challenge between participants could be an event. The game may include a system comprising a server having executable instructions that implement game features stored thereon. Users can selectively access this server via any computing device including, but not limited to, a desktop computer, a laptop computer, a tablet computing device, a cellular phone, a smart phone or any other hardware device that enables a user to remotely connect with a server over any type of communication network.

The system enables users to create a password protected user account that grants access to the various features of the game system. As used herein, the terms user and player may be used interchangeably. One aspect of the system and method enables a registered user to become a commissioner and selectively create and define a targeted user community whereby each user within the community will be a player in a respective game. The community design feature of the game advantageously enables the commissioner to selectively determine the game rules applied to the community and the particular game or games being played by the community. The game may be a fantasy sports betting game whereby the users in the community compete against one another in monetary wagering contests without actually wagering or paying legal tender using the rules selected by the commissioner. The community of users may be a network or group of friends or acquaintances that decide to establish their own league and play the game amongst the members of their network or league. The winner of the game is determined at the end of the gaming period by identifying the user that has accumulated the greatest amount of money/points representing an overall success rate on the wagers placed by that user.

In step 104, the system enables the creation and definition of rules for a game period during which the players in the community have opportunities to make bets on actual sporting contests and events within individual sporting contests. In creating a game, the commissioner may select from a predetermined set of rules stored in a rules repository on a server or other storage device. Alternatively, the commissioner may create rules different from the predetermined set of rules. The rules available to the commissioner advantageously enable the commissioner to selectively determine every aspect of the game to be played. The commissioner may choose a starting bankroll value that is available for each player. This initial bankroll value represents an amount of money that the player can use during the course of the game. The initial bankroll amount is what each player seeks to improve on during the course of the game by successfully betting on the outcome of at least one of a sporting contest or an event within a sporting contest. For example, in one embodiment the initial bankroll is $100,000.00 per player.

The commissioner can select the duration of the game as well as the duration of individual betting periods within the context of the game. In one embodiment, the user may determine that the game will be played for 30 days and at the end of the 30 day period a winner will be determined by the player having the largest amount of money in their bankroll. In the present exemplary embodiment, the user may divide up the initially selected 30 day period into 4 weekly betting periods and bets by each user are placed during the respective betting periods. In this embodiment, a winner may be determined both at the end of each betting period as well as a cumulative winner at the end of the game period which, in this example, is 30 days. Alternatively, the commissioner may define the gaming period to cover specifically identified weeks such as those corresponding to weeks 1-17 of a National Football League schedule. The use of the National Football League schedule to outline a gaming period is merely exemplary and the game duration may be based on the duration of any season of any sport or other type of competition. The flexibility provided in allowing users to determine the duration of the gaming period allows users to play in multiple leagues without having to wait for subsequent season to begin for the sport on which they are betting. It advantageously allows for shorter commitments to be made by players. Additionally, from a system operator and revenue source point of view, the flexible gaming periods advantageously enable gaming periods to begin and end at any time throughout the calendar year or season/competition which allows for increased revenue generation.

In a further embodiment, a user may selectively determine that the duration of a game should correspond to a particular sporting event or other competition such as a single game of a particular sport. In this embodiment, the commissioner is able to selectively identify types of events within the particular sport event on which wagers may be placed. The types of events available for use by the commissioner may be presented in a categorized list according to the type of sporting event that is selected. For example, there will be different in-game events to bet on in football games as compared to baseball and basketball games. In this type of game, the betting period is event-based and may be selectively defined as opening and closing at predetermined times prior to the identified event. The winner of this type of game is determined at the end of the sporting event by the user having the most money in their bankroll. An exemplary single contest game period may comprise a live betting environment whereby the players of the game will access a community game screen that shows, in real-time, a representation of every event occurring during a sporting contest. In this embodiment, a group of individuals would start out with an initial bankroll value at the beginning of a single contest. Using a system that enables live betting, the players would be presented with a plurality of different events occurring within the contest including the potential available outcomes associated with the event. The player would be further presented with odds of the listed outcome occurring and would be able to place bets in real time via a play-by-play method. The user with the highest bankroll after bets are settled would be the winner. An example of how this operates can be seen in the context of a baseball game wherein, before each at-bat by the player playing in the actual baseball game, the fantasy game player will be presented with a set of outcomes (i.e. single, strikeout, homerun, walk) and odds associated with each of the outcomes presented. The fantasy player can bet an amount in accordance with the betting rules on that at-bat. Should the player in the actual game get on base, the system may present the player in the fantasy game with two different types of bets corresponding to the player on base as well as the player up at bat. The fantasy bettor may be simultaneously presented with multiple other events to wager on. Additionally, the commissioner may define certain additional events in the game on which bets can be placed. For example, prior to the game starting one exemplary wager may include the odds associated with a particular player on a particular team hitting the first homerun of the game. Alternatively, the user defined bets may be straight bets whereby, for a particular event within the sporting contest, the player can enter a name of a player and an amount of a wager and if the event occurs (i.e. hitting the first homerun) then the player wins the bet.

The commissioner may also selectively determine the number of bets available to each player for a particular betting period. In one embodiment the number of bets is fixed for each betting period. In another embodiment, the number of bets may be variable wherein, based on the success rate of a player in the previous betting period, the player may be awarded with at least one additional bet that may be placed during the subsequent betting period(s) thereby giving the successful player an advantage in subsequent betting periods by providing them additional opportunities to win money. Alternatively, the number of available bets per player may be reduced for the next scoring period. For example in an effort to handicap a match between players, a really successful player may have a predetermined number of bets less than another player against which he is directly competing. The number of bets may also be tied to the type of sporting contest or events within a sporting contest as determined by the commissioner.

The commissioner may also selectively determine the type of sporting contests that will be available to each player for purposes of betting. For example, the commissioner may determine that a particular league should only bet on the outcome of football games played in the National Football League. In this embodiment, for each betting period, all the games being played during that betting period are available to be bet on by the players. The system enables the commissioner to select from a plurality of different types of sporting contests that are available during the gaming period thus allowing players to bet on various sporting events in different sport leagues during the betting periods and the gaming periods. A commissioner may also determine a subset of contests selected from a plurality of different type of sporting contests for use during a particular betting period.

The commissioner may also selectively determine the type and nature of bets able to be placed by the user during the betting period. There are a number of known types of bets including but not limited to parlays, teasers, run line bets, over/under, progressive parlays, and head-to-head bets. The respective type of bets available and associated with a particular sporting contest are displayed to a player in the game and the player is able to select the type of bet they want to place from the group of bet types presented. The parameters of each of the types of bets presented to the user may be selectively determined by the system operator in a known manner. The parameters include but are not limited to the spread, the over/under, number of teams able to be used in at least one of a parlay and a teaser, etc. Alternatively, the server implementing the game may connect, via a communication network to a remote source whereby these parameters can be acquired for presentation to a user.

In addition to the number and types of bets available to the players, the commissioner may enable rules that control an amount of money a player can bet on a particular sporting contest or event within a sporting contest in a particular circumstance. To enable this feature, the commissioner activates and sets parameters for a Maximum Bet Amount. The parameters associated with the Maximum Bet Amount include but are not limited to:

a. an actual dollar amount maximum on a specific bet or a per day/week/month and based on a total risk amount, for example, a maximum percent of the players bankroll that may be risked on any given bet, or a per day/week/month total risk amount.

b. progression/regression whereby the maximum amount able to be bet by a player increases or decreases over a defined period of time. Alternatively this may be implemented based on another circumstance that is user-defined.

c. elimination of the maximum bet amount at a predetermined time during the game which enables no-limit betting by the players on any of the contests or events during that betting period.

In addition to the Max Bet feature, the system enables a commissioner to implement a Max Bet Breaker which, if selected by a player for a particular Max Bet, would allow the player to bet an amount greater than the predetermined Max Bet value. In one embodiment, the Max Bet Breaker feature enables a player to wager a certain amount over the max bet value such as 5 times (5×) the current max bet. Therefore, if the Max Bet was $1000, then the user selecting and applying the Max Bet Breaker option to a particular bet could bet $5000. The number of Max Bet breakers may be selected by the commissioner when establishing the community, or, may automatically be available to users based on performance in previous weeks or based on another circumstance or event during the season such as particular week or beginning of a playoff period, etc. Alternatively, users/players may pay sum certain to at least one of the league commissioner or system operator to buy a Max Bet Breaker. The circumstances may be selected from a list of potential circumstances that commonly arise during gaming periods or may be any user defined circumstance that could arise during the course of the game.

A further type of betting feature available to the commissioner is Lock Bet feature that allows players to make a bet a "lock bet" and multiply the amount able to be won on a particular bet without increasing the amount risked. A 2× Lock Bet multiplies the winning amount by 2 and a 4× Lock Bet multiplies the winning amount by 4. The commissioner may select the number and types of lock bets available to the players of the game and when these types of bets can and cannot be used. Lock bets may be multipliers for the amount to be won or may be fixed dollar amounts able to be wagered. For example, a player is able to risk $100 to win $90 on Team A wherein the point spread is +4.5points. If applying a 2× Lock Bet, the player would be risking $100 to win $180. If applying a 3× Lock Bet, the player would be risking $100 to win $270. The number of Lock Bets, once determined, may be allocated in a plurality of ways. For example, the amount of lock bets available may vary on a daily, weekly, monthly or even on a full season basis. The amount of lock bets may change by sport and game. In some cases players can even earn more lock bets through successful performance. Players may also "buy" lock bets by paying a predetermined purchase price in accordance with rules to the league commissioner or the system operator. In the event sums are paid to the league commissioner, the system operator may take a predetermined cut of the transaction fee. The commissioner can set the cost amount for each of the lock bets able to be purchased by players. Combinations of these possibilities may also be configured. Lock bets may broken into different levels and each player may be assigned a number of allowable lock bets at each level. These lock bets may or may not have to be used during a particular betting period or game period. The commissioner may determine that lock bets that are not used by players during a given betting period are to expire or carry over to future betting periods. Alternatively, the system may enable players who do not want to use their lock bets to offer then for sale to other users for an set amount of money which would be paid to at least one of the league commissioner and the system operator. If paid to the league commissioner, the system operator may elect to take a cut of the transaction fee paid by the user acquiring the lock bet. Alternatively, the players may be allocated a certain number of lock bets having predetermined monetary values at each level based on the total number of bets the player is placing during a given time period. In an exemplary embodiment there are four levels of lock bets. A level 1 lock bet may be valued at $2,500. A level 2 lock bet may be valued at $5,000. A level 3 lock bet may be valued at $7,500 and a level 4 lock bet may be valued at $10,000. These numbers are used for purposes of example only and each level can be assigned any number. In this example, for every 10 bets placed, players received one level 4 $10,000 bet, two level 3 $7,500 bets, three level 2 $5,000 bets and 4 level 1 $2,500 bet. The level bets are intended to be bonus bets that allow a player to bet more money on contests or events that they are more certain of the outcome.

A further type of bet that may be enabled for use during game allows the user to choose a game and if the spread was within 3.5 points in either direction, you win 2× your money. For example, if Team A is +4 and they lose the game by no more than 7, then the spread was within 3.5 points and thus you win the fantasy wager. The number of these types of bets available to players during any particular betting or gaming period may be selectively configured. Alternatively, the availability of these bets may be provided to players at a predetermined time period or based on the success of the player in previous betting periods.

In a further embodiment, the system enables a commissioner to enable a free bet whereby a player could bet a specified dollar amount on a particular contest or event within a contest without penalty to the player's current bankroll. For example, a player could place a free bet to win the corresponding amount of money without having that amount of money removed from their bankroll should the bet be unsuccessful. If the bet is $10,000 to win $9000.00, and the player loses the bet, no amount of money is subtracted from the bankroll. The value of a free bet enabled by the system may be of a predetermined monetary value or may be automatically determined based on a characteristic such as a percent of total bankroll or percent of total amount of money wagered during at least one of a current betting period and a previous betting period.

Once the rules of the game have been created and defined as discussed above, step 106 provides the ability of players to join at least one community and engage in game play during the specified betting periods in order to try to increase the amount of fictitious money allocated to the player. An exemplary rule set and operation of a game as stated in step 106 is described with respect to the following example.

Example 1

Start Date:

Game begins when a league is formed and the game ends at the conclusion of week 17 of the NFL season. The start and end dates are flexible though.

Starting Bankroll and How To Win:

Each player starts with a bankroll of virtual cash. For this season we are allocating $25,000. The objective for each player is to increase their bankroll by placing and winning bets. The player with the largest bankroll at the end of the tournament wins! Once a player has $0 left in their bankroll, they are eliminated from the tournament.

Tie Breaker:

If two players are tied after the season ends, the tiebreaker is the player with the actual highest dollar amount down to the last cent. Full bankroll data is hidden from the users until the final standings. Should two or more players be tied after reviewing the full bankroll amount including the decimal places, then system will crown all participants that are tied as Co-Champions.

Bet Types:

Straight Bets, Parlays and Teasers

Maximum Bet:

The Maximum Bet is the maximum amount of money that can be wagered on any specific bet. Each week, the Max Bet amount increases by $100. The Max Bet starts at $400 on August 31$^{st}$ and increases by $100 a week. Players may risk the Max Bet on many different bets at one time. However, the Max Bet cannot be changed on any one specific bet. A player can even use the same team in multiple bets as long as each bet is different. For example, if the Max Bet was $500, a player could place $500 on the Philadelphia Eagles −7 and you could also place a parlay bet with the Eagles −7 and the Falcons +9. Additionally, there is a bet minimum of $100.

This game allows a player to place a Lock Bet that may multiply the potential winnings by either double (2-for-1), triple (3-for-1) or quadruple (4-for-1). The lock bet advantageously enables the player to win more however the player can only lose the initial amount wagered. In this game, players may use each of the three types of lock bets (2-for-1, 3-for-1 and 4-for-1) once per week which is the betting period which runs Tuesday through Monday. Lock Bets may only be used on straight bets and teasers, they cannot be used on parlays. An exemplary bet available to player may be:

Philadelphia Eagles at −7 risking $100 to win $90.

By using a lock bet on the above wager, it would look like this:

Philadelphia Eagles at −7 risking $100 to win $180 using 2-for-1 Lock Bet

Philadelphia Eagles at −7 risking $100 to win $270 using 3-for-1 Lock Bet

Philadelphia Eagles at −7 risking $100 to win $360 using 4-for-1 Lock Bet

Depending on the outcome of the actual game in which the Eagles are playing, the players bankroll is automatically adjusted accordingly by the system. The system checks the results of the games that players bet on, compared against the selected handicaps/odds of the bet, and determines whether the player has won or lost the bet. Then the system calculates the amount won or lost and deposits or debits this amount from the bankroll, respectively.

In step 108, a player is presented the option to join another league and/or community that may have similar or different rule set that is created in accordance with steps 102 and 104 discussed above. If the player does want to join another league, the player may do so and once game play begins, the player, in step 109, may advantageously apply any or all of the bets made in one league to any other league in which he is a member. Applying bets across different leagues and communities is subject to the rules of the respective communities and games. Thus, if a common bet is available in two of the three leagues, the player may select an option to have the same bet be active in those leagues. Thus the system advantageously enables a user to control multiple leagues from a single interface presented to the player. Once the common bets are applied across the various leagues, the player engages in game play until the end of the game period to determine a winner as in step 110. Alternatively, referring back to step 108, if the player does not want to join another league, then the player proceeds to step 110 and engages in game play until the end of the game period to determine a winner.

The above described game and rules comprise an algorithm including the steps for implementing and operating a fantasy gambling game system. The algorithm may be encoded as computer executable instructions that is embodied on a computer readable medium and which, when acted on by a computer device, transforms the instructions into a tangible user interface image that may be selectively displayed to a user using either the same or a different computing device. The above rules and operations may be embodied in computer code and be hard coded on a particular processing device that is able to execute the instructions encoded thereon. In one embodiment, the computer readable instructions are stored on a fixed storage medium that is acted upon by a server that conditions a processor to generate a user interface display presented to a remote user accessing the server. The rules may be packaged may be into “rulesets” in a database stored on a computer readable medium. Any league may play under any one ruleset, and the system pulls the league’s ruleset from the database and the code applies the rules as needed in order to perform game functions.

After establishment of various fantasy betting communities each including a plurality of different players that have wagered on different sporting contests and/or events within particular sporting contests, the system is able to selectively query and mine the data associated with the players across all communities in order to produce a revenue source for the system operators. The system provides for selling user collective data intelligence whereby the system automatically monitors selections of the most successful players within the community, aggregate this information whenever trends are identified and sell this aggregated data back to one or more of the players. The monitoring may be done automatically at predetermined intervals by the system or may be performed manually by a system operator. The monitoring is continual and, as more players are entered into the system, the database being queried is refreshed to ensure the most current information is available.

Additionally, while the above description with respect to FIG. 1 references creation of a league by a commissioner who sets the rules and parameters for the game being played in a respective community, it should be appreciated that the same functionality and operation may be performed by a system operator. This advantageously enables the creation of public leagues and communities, each potentially being governed by different rule sets, that players may join without being specifically invited. Thus, if a player enjoys fantasy sports betting but friends of the player do not, the player can still participate in the game. Furthermore, the inclusion of these public leagues enables the system to mine and derive additional data that may be used as a source of revenue as will be described below.

Figure 2:
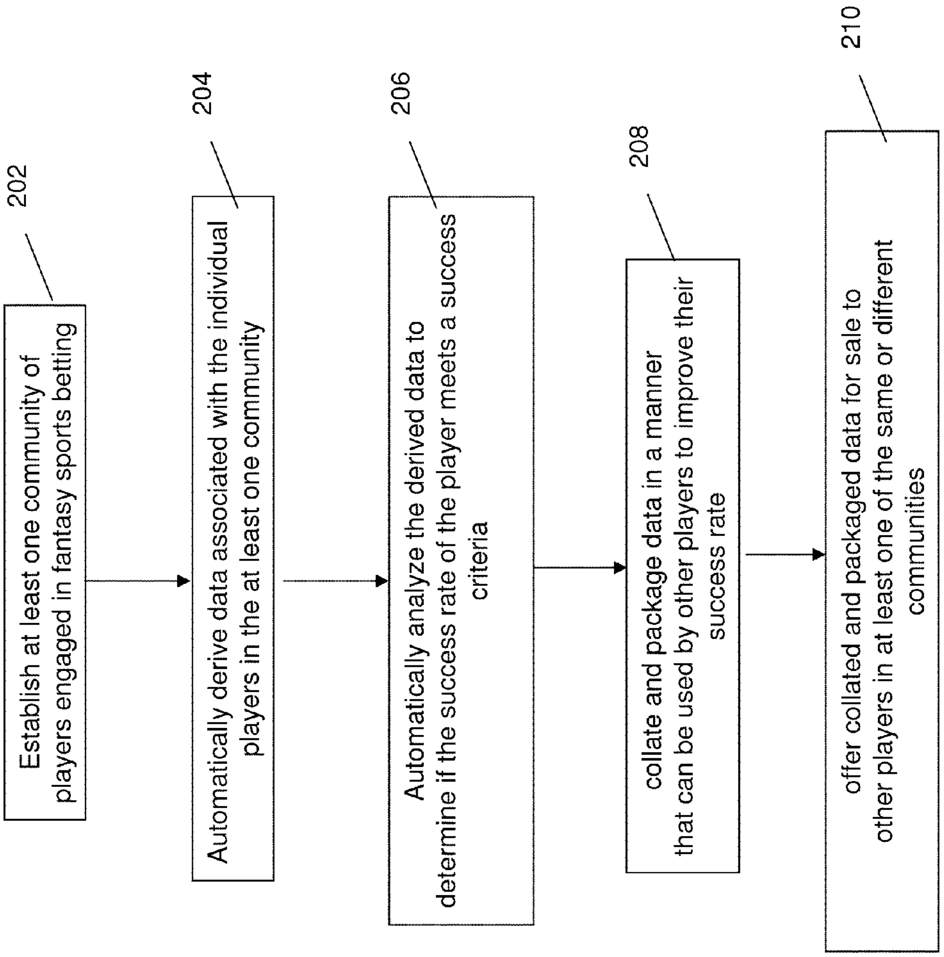
FIG. 2 is a flow diagram detailing an algorithm enabling a system operator to derive a revenue source from the fantasy sports gaming system according to invention principles.

FIG. 2 is an exemplary algorithm implemented by the system that generates revenue for the system operator. In step 202, at least one community including a plurality of players is created and the players engage in at least one cycle of betting on sporting contests and/or events taking place during a particular sporting contest or any other type of competition that has a definable outcome. In step 204, the system automatically derives data associated with the individual players in at least one community. The derived data is automatically analyzed to determine if the success rate of each player in the community meets a success criteria in step 206. The success criteria may include but is not limited to, (a) data identifying the number of successful bets, (b) data indicating a trend of success over a specified time period, and (c) data identifying success of bets based on the type of bet and/or the frequency of the bet. This data may be collated and packaged in a manner than can be used by other players in the same or different communities to help improve their success rate as in step 208. Once this data is collated and packaged, the system may offer the packaged data for sale to players as shown in step 210.

An example of how the data may be presented to the user is in the form of a leader board which that will showcase a rank for each player in the game thereby making it easy for the other players in any community who are the best and most successful players. The leader board may be categorized to show the best players based on the type of bet selected from all available types of bets. Another user control or feature comprises being able to place a single bet and applying it to multiple leagues. The leader board may also provide for compiling and providing to a user a comprehensive view of a particular user’s betting statistics such as winning percentage on specific bet types, total earnings year-to-date and being able to track this information year over year and across multiple leagues.

Additionally, the leader board may be organized to display trend data indicating which players have been most successful over a predetermined time period thereby providing users with knowledge of bettors that are “hot” and have consistently been making successful winning bets. For example, if Player X has been really hot the past few months and is the #1 ranked player (determined by percentage of correct bets) across all of the leagues on our site. The system advantageously provides Player X a forum to input predictions for future sporting contests and events can be presented for view by other players. The full set of prediction data in this forum would be protected from general access via a log-in screen, for example. The system would generate a teaser message that provided a subset of the protected data to all of the players. The teaser message would enable the other players to pay an access fee thereby enabling them to access the full set of protected data in order to improve their performance. The player would pay an access fee to the system operator in exchange for data representing credentials for accessing the protected data.

Alternatively, if Player Z wanted targeted information on a particular sporting contest or event within the sporting contest, the system provides Player Z with the ability to contact Player X to inquire about a particular pick. The system allows Player X to charge a predetermined fee, for example, a micro fee for example, $0.25 to $0.50 per targeted prediction. Upon payment by Player Z, to Player X, the system would automatically take a percentage of the micro fee and derive revenue therefrom. The system may also allow players to group a set of targeted transactions and charge a fee for obtaining predictions on a set of contests or events. For example, Player X might post 10 or more predictions per week if he’s a top player and the players buying the picks may buy multiple picks per week.

In a further embodiment, data representing how “hot” a player is at any given time is shown in conjunction with the name of the player. Sports bettors are always interested in getting advice from the hot hand and if a player is ranked $30^{th}$ all time in the game but over the past 6 weeks he’s been the hottest player as indicated by winning the highest number or percentage of bets, the system enables the hot player to sell predictions either via micro fee transaction or in a forum that requires payment for access.

An additional mechanism by which the system can generate a revenue stream for the operators is to enable management of betting restrictions. For example, betting may be disabled for games under one or more particular conditions (e.g., at a defined time before the start of the game). If betting is restricted, a user may request to bypass the betting restriction in order to, for example, be able to place a bet past that defined time but before the start of the game. By requesting the bypass, the player must pay a bypass transaction fee which is collected by the system operator and provides a source of revenue. Once the fee is paid by the player, the player is provided access to the previously restricted content which allows the player to overcome the condition. For example, a user will have the ability to purchase a bypass to bet up until the last minute before the start of the game.

Another aspect for generating revenue from the system is collecting fees for league management. For each community and/or league created by a user, a fee for facilitating and/or managing may be assessed and collected. For example, a group of people or entities may wish to form a league based on each individual or entity providing input of a fantasy amount or stake for the season with the winner collecting the sum total of all of the stakes at the end of the season and an operator collects fees for managing the league formation, collection of participant stakes, and distribution of winnings. As a specific example, if 10 individuals wish to form a league with each putting in a fantasy amount of $50, then the winner at the end of the season will collect the fantasy pool of $500 at the end. The operator will collect a fee for one or more of each fantasy amount contribution by a participant, holding the fantasy pool, and distributing the pool to the winner at the end.

Figure 3:
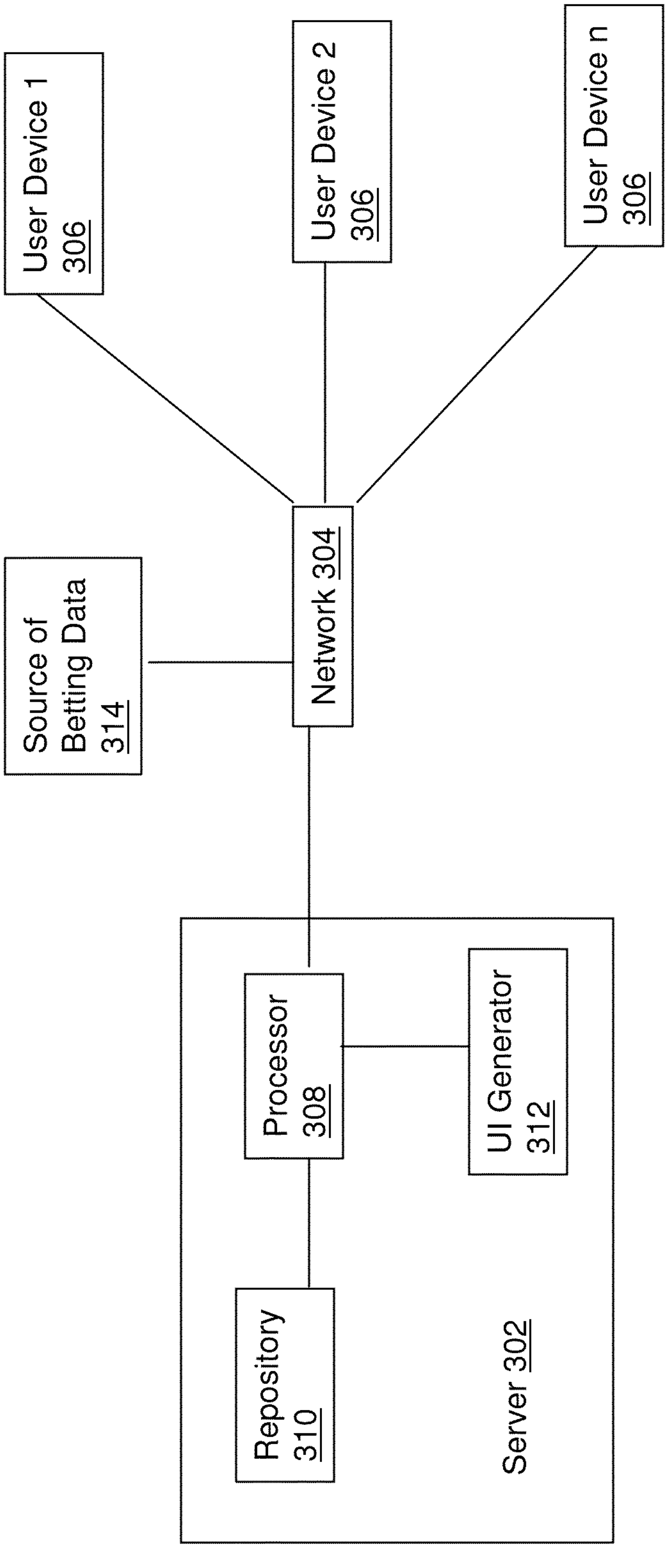
FIG. 3 is a block diagram of an embodiment of a system for implementing a fantasy sports gaming system according to invention principles.

FIG. 3 is a block diagram of the fantasy sports gaming system according to invention principles. The hardware shown and described herein is able implement the instructions described above with respect to FIGS. 1 and 2 which represents an algorithm for creating and operating the system. The system includes a server 302 that is connected via a communication network 304 to a plurality of user devices 306. While only three user devices are described herein, it is apparent that any number of user devices may connect to the server 302 via communication network 304. The user devices 306 allow users to transmit and receive data associated with the fantasy gaming system in order to engage in game play as discussed above. User devices 306 include at least one of a computer, a tablet computing device, a cellular phone, a smartphone, a conventional telephone and any other device able to receive input from a user and transmit data corresponding to the user input for receipt by the server 302 as well as receive requested data from the server 302. In one embodiment the user device is a cell phone. The cell phone is able to place a bet on a contest by inputting a text message and sending that text message via the communication network 304 for receipt by the server.

The server 302 includes a processor 308, a repository 310 and a user interface generator 312. The repository 310 includes a plurality of instructions stored therein that direct the operation of the fantasy sports gaming system. The instructions may be in the form of machine executable code that are able to perform the functions described hereinabove with respect to FIGS. 1 and 2. When an activation of a particular feature is requested, the processor 308 executes the instruction corresponding to the particular feature that is stored in the repository. Upon execution and activation of the feature, the processor conditions the user interface generator 312 to generate a display image for display to at least one user that allows the user to make use of the particular feature. The system is also in communication with an external source of betting data 314 from which category of bets, types of bets and parameters of bets may be obtained for use during game play. Alternatively, betting data may be stored locally in the repository 310 or acquired from external source 314 and cached in the repository 310. Examples of data retrieved from external sources includes sports event data (teams, schedules/fixtures, game times, game results) and betting odds (for a given game, what odds were being set) and contest results data that provides the ability to score/settle bets.

Figure 4:
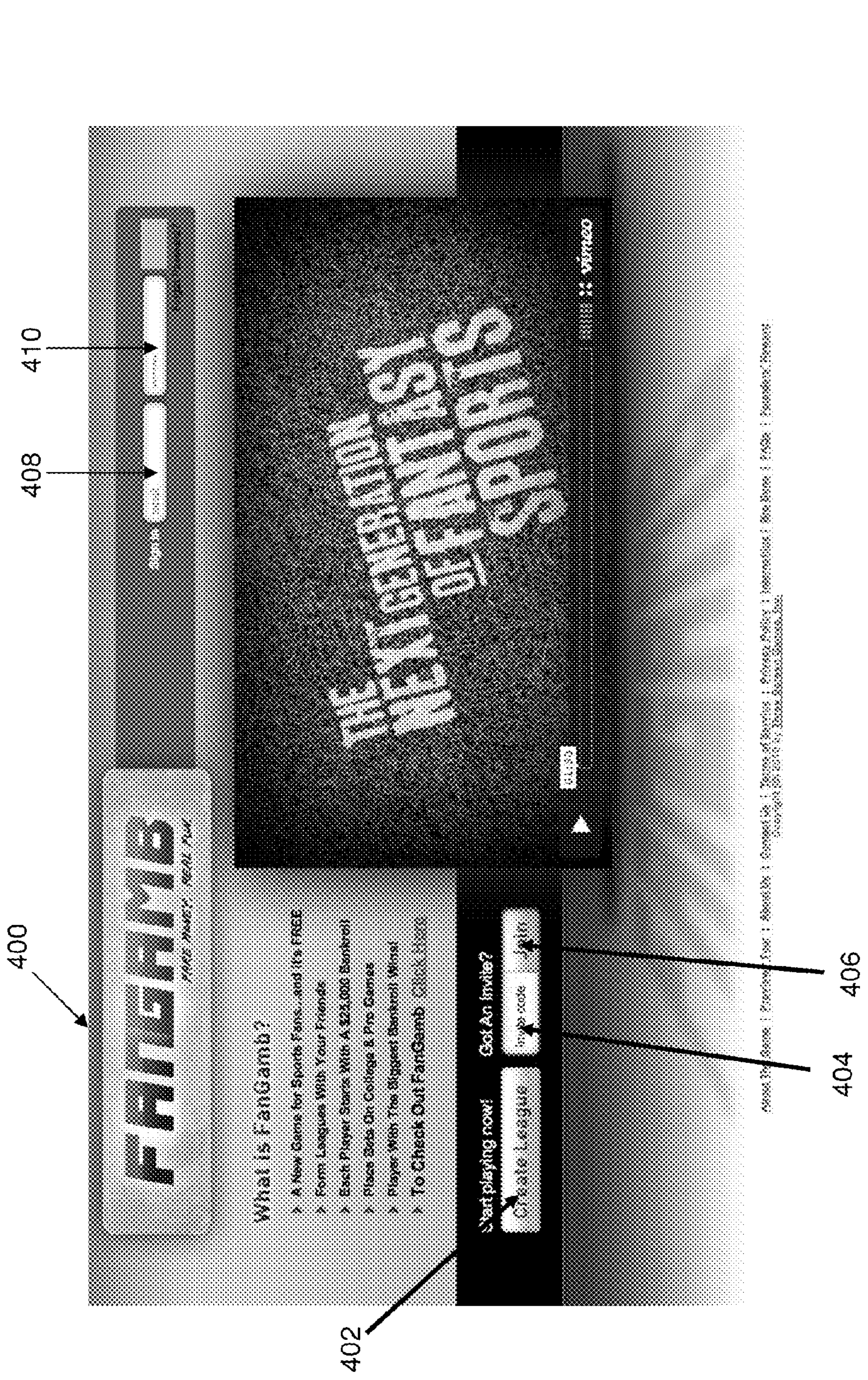
FIGS. 4-19 are exemplary screen shots of display images generated by the fantasy sports gambling system enabling users to engage in game play.

The processor 308 executes an initial instruction which conditions the user interface generator 312 to generate a home page for presentation to at least one user upon the user accessing the system at an address on the communication network. An example is a home page encoded in a particular data format (e.g. HTML, with JavaScript and CSS) that is selectively accessible by users via a web address using a communication protocols such as TCP/IP and HTTP. FIG. 4 is an exemplary screenshot of a home page generated by the system for display to at least one user. The home page provides a gateway for users of the system to access their accounts and initiate additional system functions. The display image includes a league creation of user selectable image element 402 that, when selected, initiates execution of a league creation algorithm by the processor 308. The league creation algorithm includes a set of instructions as described above with respect to FIG. 1 that allows a user to create a league or community in which the fantasy sports game is played. The home page further includes a field 404 that receives data corresponding to a unique league identifier access code input by a user using user device 306. Upon entering information by the user in field 404, a league join image element 406 is selected by the user using an input device such as a mouse or touch screen. Upon selection of image element 406, the processor initiates an algorithm that enables the user to join the league or community that is associated with the unique league identifier access code.

Once the user has either created or joined a league including setting up a personal username and password, the home page provides a username field 408 and a password field 410 that allows the user to securely access the system. Once the username and password are entered in the respective fields, the processor receives the user credential data and authenticates the entered data with user profile data stored on repository 310. Once authenticated, the user can access all areas of the system that are deemed public, for example, general leader board information as well as restricted access to the leagues and communities to which the user belongs.

Figure 5:
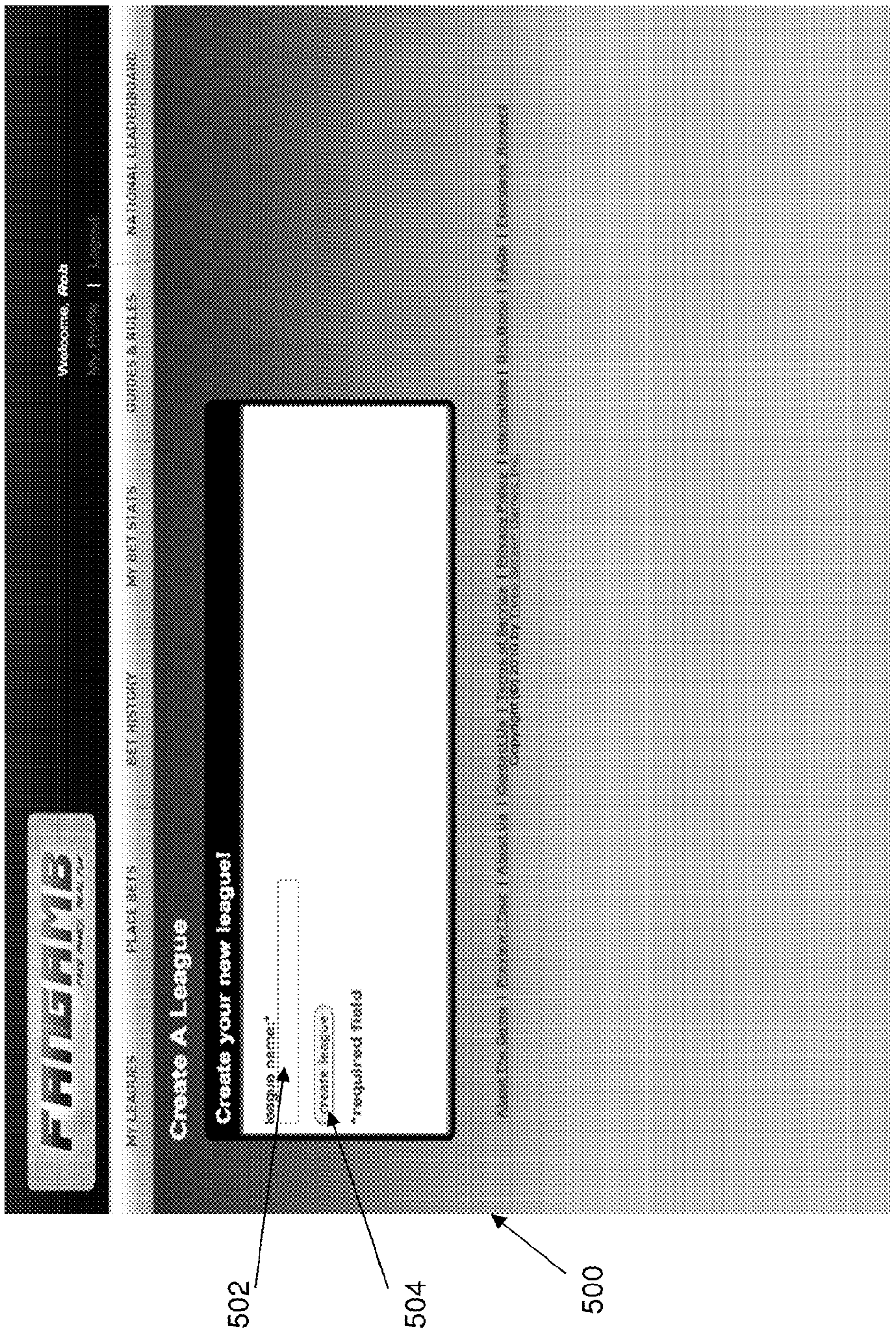

FIG. 5 is an exemplary screen shot of a user interface display image 500 that is generated by generator 312 in response to initiation of the league creation algorithm. Display image 500 includes a window 502 having a user-fillable field for receiving data representing a league/community name. A creation image element 504 is selected after league name data is entered and the league is created. Data associated with the league is stored in the repository 310. The league is created and designed by a user by interacting with a plurality of different user interface display images that allow for selection of all the rules for the league. These image elements may include a candidate list of rules from which the user can select. Additionally, the image elements may be able to receive user input allowing the user to define a specific rule to be implemented in the game being created.

Figure 6:
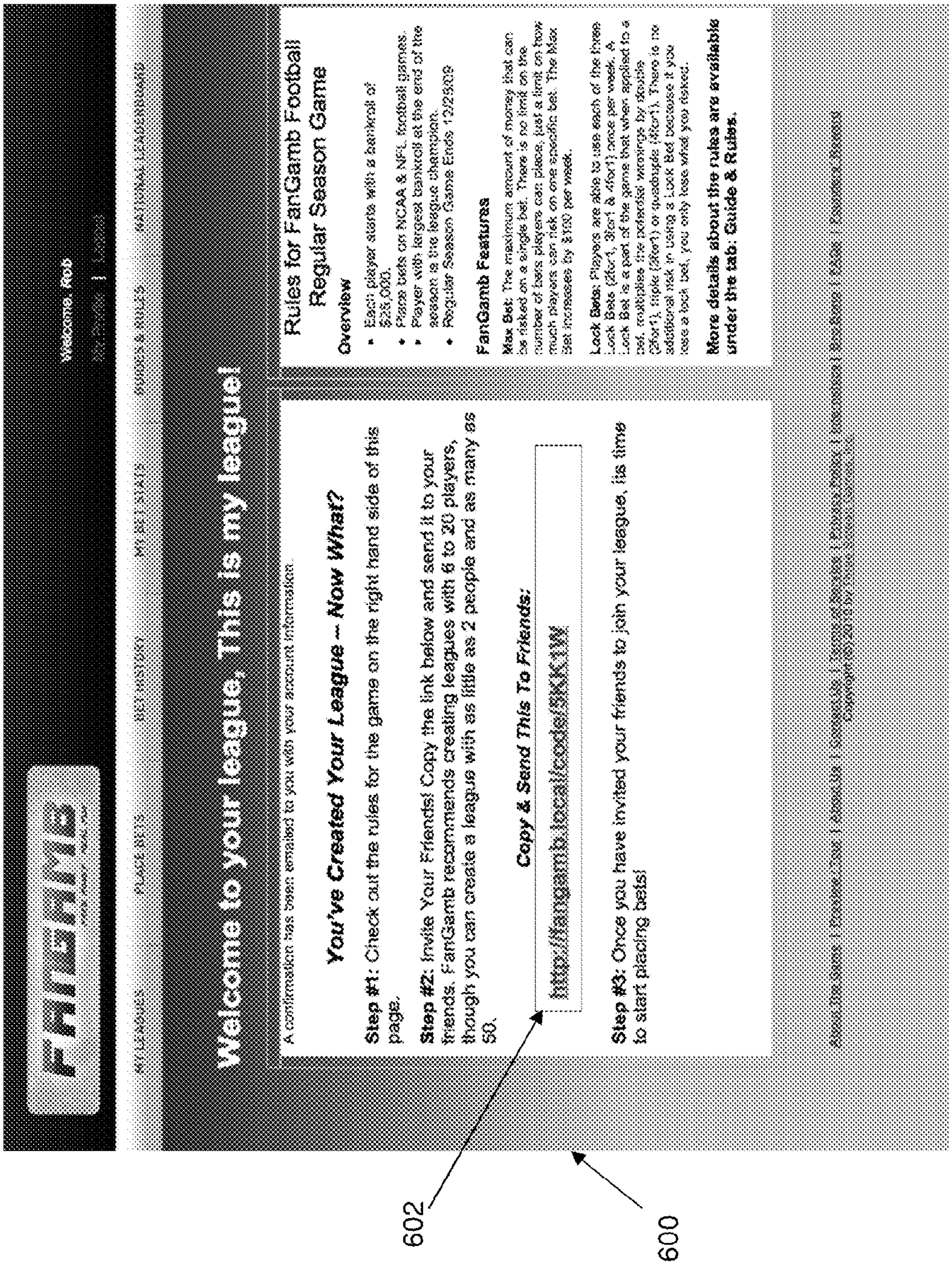
Figure 7:
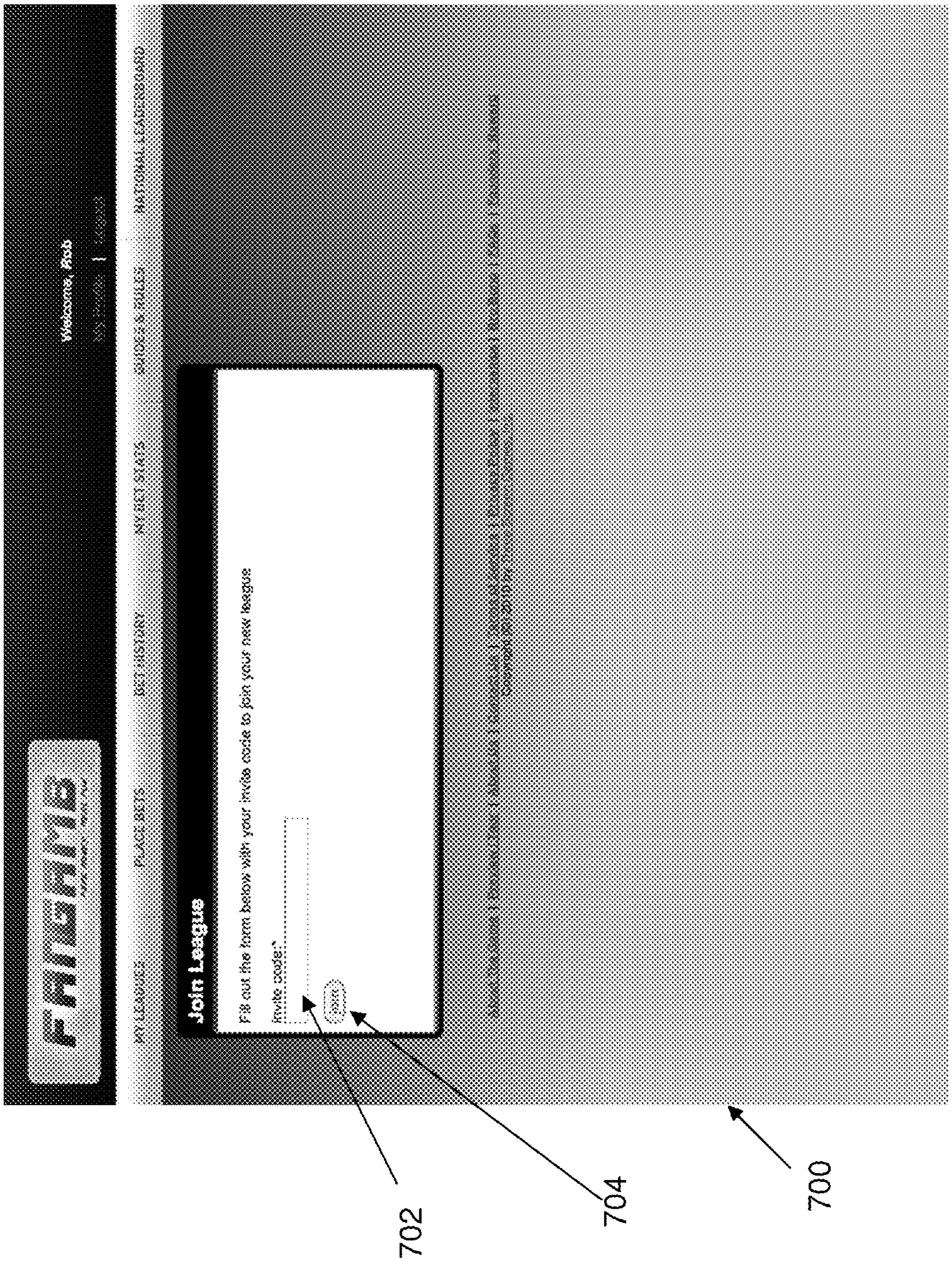

Upon creation of the league by the user, a display image 600 as shown in FIG. 6 is presented to the creating user that includes the unique league access identifier 602. The identifier may be for example, a universal resource locator or other link that enables a user to access the league on the server 302 of the system. The identifier 602 can be copied and pasted, in a known manner, into an electronic message. Alternatively, the display image may include a selectable image element that executes instructions for an electronic mail application that enables the user who created the league to message other people to suggest that they join the league. In this embodiment, the identifier is automatically embedded in the message being sent by the system. When a user receives and selects the identifier 602, the processor 302 conditions the User Interface Display Generator to generate a display image 700 shown in FIG. 7 that enables the user who selected the identifier to join the league. The display image 700 in FIG. 7 includes an input field 702 for receiving a code or other data from the user that notifies the system as to which league the player wants to join. Once entered, the player can select image element 704 which causes the code entered in field 702 to be sent to the processor 302. The processor 302 queries the repository for league data that matches the code entered in field 702 and conditions the user interface display generator 312 to generate a display image including the league data and formatted in particular format. The format may be for example, a standard format determined by at least one of the user who created the league, the system operator and the individual user.

Figure 8:
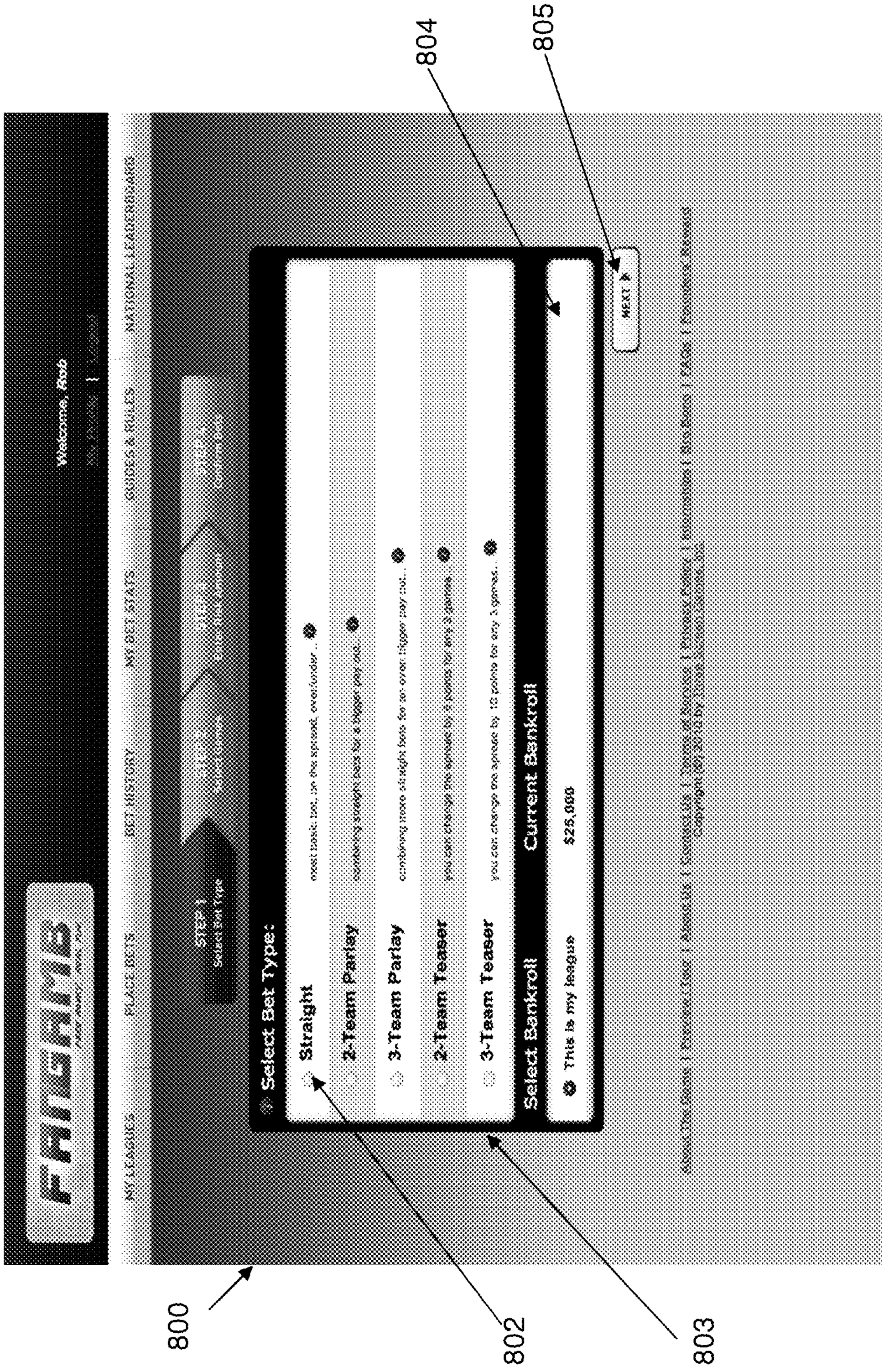

Now that the user has joined a league to play a game, the system generates a plurality of display images as shown in FIGS. 8-11 that enable the player to engage in game activities. The system generates the display image 800 as shown in FIG. 8 which includes a first window 802 including information representing the category of bets available to the player for the game. A selection box 803 is positioned proximate the betting category information and allows the player to select the category of bet to make for the current betting period. The display image 800 also includes a second window 804 including data representing an amount of fictitious money/player bankroll that may be bet on the selected bet category. Upon selecting the category, the user selects the next button 805. Data representing the betting category selected by the user is provided to the processor 308 which queries a source of betting information in order to aggregate all of the available bets and types of bets for the selected betting category. This query may be performed on the repository 310 which may include a source of betting information as well as on an external source of betting information 314 (FIG. 3). The results of the query are presented in the display image 900 in FIG. 9.

Figure 9:
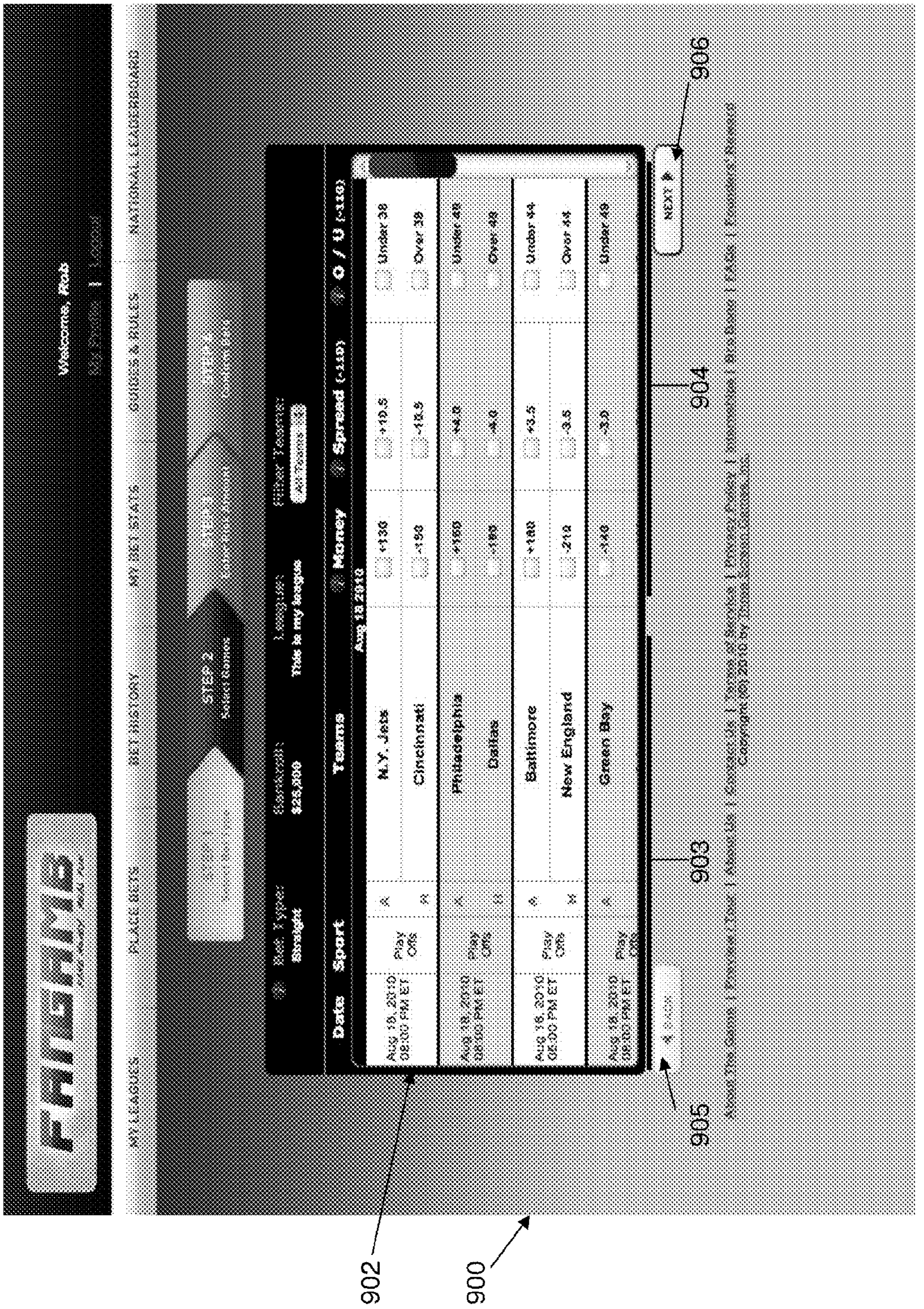

FIG. 9 includes a window 902 that presents the results of the query and organizes the results. The results are presented in column and row format with the row including the information associated with a respective contest and the columns 903 containing information about the respective contest including the date, sport, teams involved, etc. Additionally, there are columns 904 associated with types of bets available for the respective contest. This format is described for purposes of example only and the data may be formatted in any manner as determined by the system operator or the league creator. In this embodiment, the user is presented with a column for a money bet, a spread bet and an over/under bet. The bet type columns include at least one user-selection box enabling the user to select a bet type to be placed along with the parameters of the bet being placed. The format shown in FIG. 9 is described for purposes of example only and the information described herein may be presented in any format or design. FIG. 9 also includes a reverse navigation button 905 that, when selected, allows a user to return the display image of FIG. 8. A forward navigation button 906 is also included and, when selected, causes data representing the betting selection and parameters to be used by the processor 308 to condition the user interface display generator 312 to generate the display image in FIG. 10.

Figure 10A:
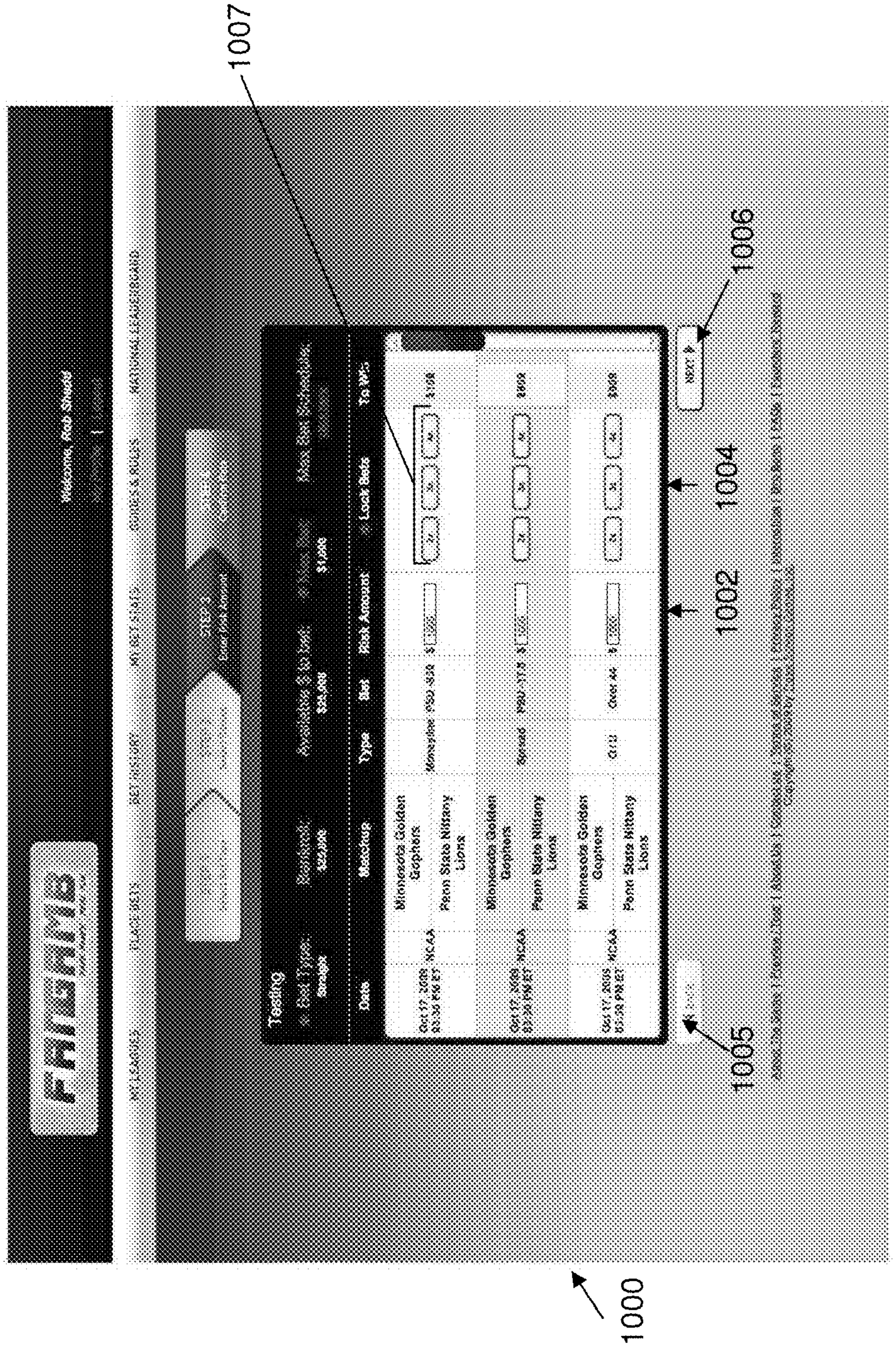
Figure 10B:
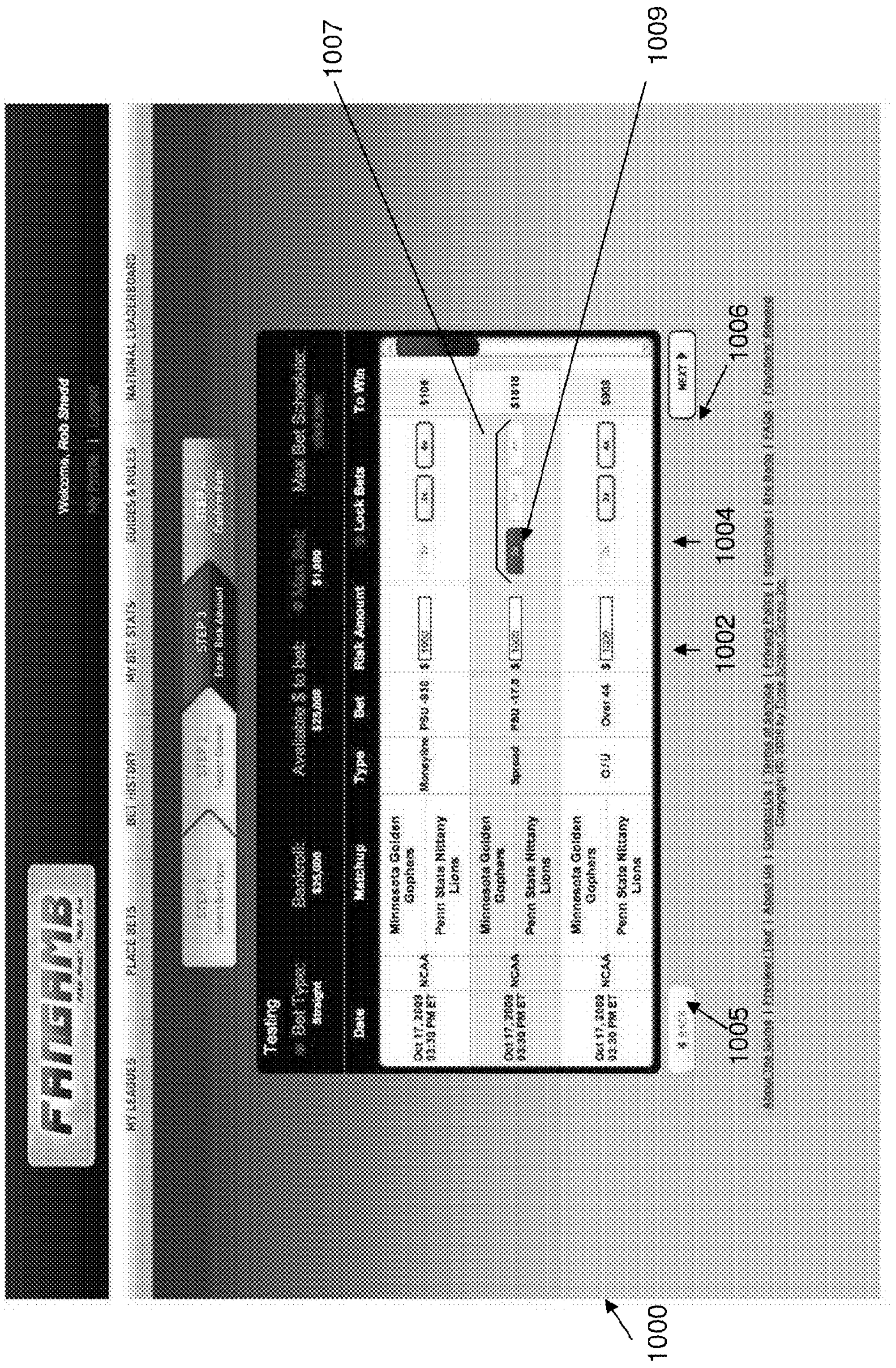
Figure 10C:
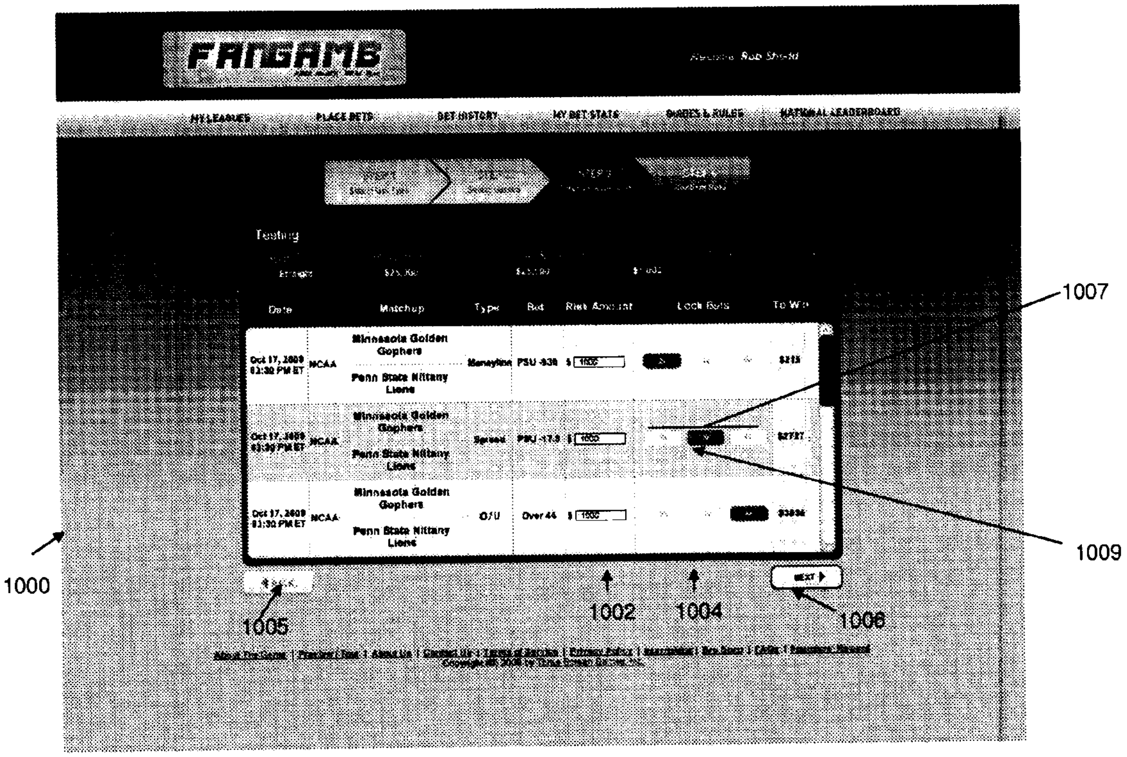

FIGS. 10A-C include a display images that lists all of the bet types and bet parameters that were selected in FIG. 9 and enables the user, in column 1002 to enter an amount of money from the players bankroll to be wagered on each respective bet. FIG. 10A also includes a column 1004 that enables a user to apply a bet enhancement, such as a lock bet or a max bet described above with respect to FIG. 1. Whether or not these enhancements are available depend on the rules of the league and game established by the user that created the league. FIGS. 10A-10C include image elements 107 corresponding to the type of available bet enhancement will be presented to the user in column 1004. In FIG. 10A, there image elements 1007 remain unselected and thus no bet enhancement is applied to any wager listed. In FIG. 10B, a respective image element 1007*a* from the set of image elements 1007 representing a type of bet enhancement is highlighted thus indicating that the corresponding bet enhancement is only applied to one of the listed bets placed by the user. FIG. 10C includes shows the one of the respective image elements corresponding to a type of bet enhancement for each bet placed by the user and that the system will execute the rules to apply the selected enhancement to the bet when the bet is settled by the system. FIG. 10 also includes a reverse navigation button 1005 enabling the user to return to the display image in FIG. 9 and a forward navigation button 1006 which, when selected, transmits the information entered in at least one of columns 1002 and 1004 for use in generating the display image shown in FIG. 11.

Figure 11:
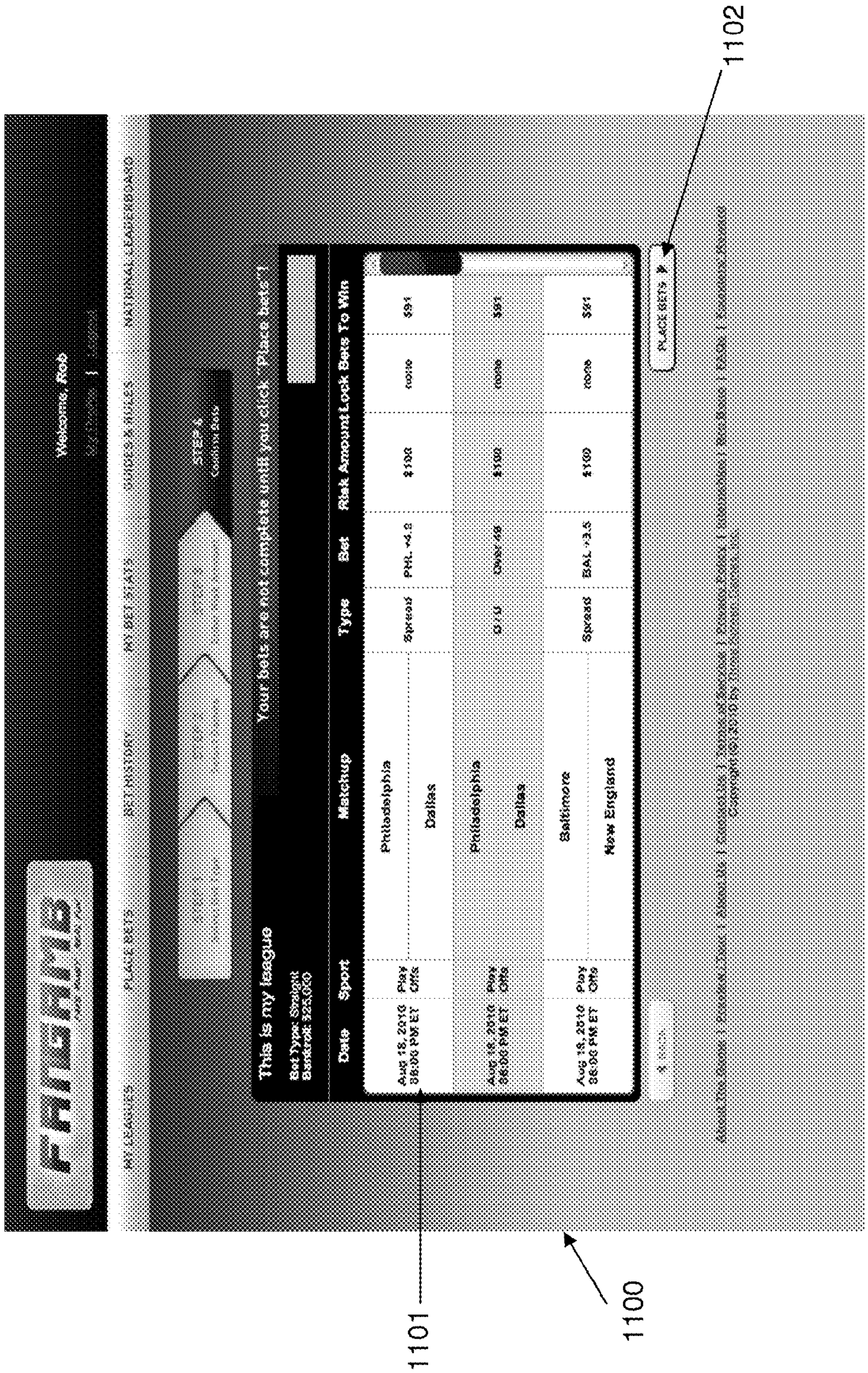

FIG. 11 includes a display image that presents a window 1101 including summary of the different contests the player has selected to place bets on as well as all associated information about the bet including the bet type, bet parameter, amount risked, whether or not any bet enhancements have been selected and the amount to be won if the bet is successful. A confirmation image element 1102 is included that enables the user to confirm and place the bets listed in the window 1101. By selecting image element 1102, data representing the contest, bet category, bet type, bet parameters, amount risked and amount to be won is transmitted for storage in the repository 310 such that, after completion of the contest, the stored bet selections for the respective player can be compared with the outcome to determine how many of the placed bets were successful for the given betting period. This comparison is performed by the processor 308 which executes a reconciliation algorithm that determines whether or not the bets were successful.

Figure 12:
Figure 13:
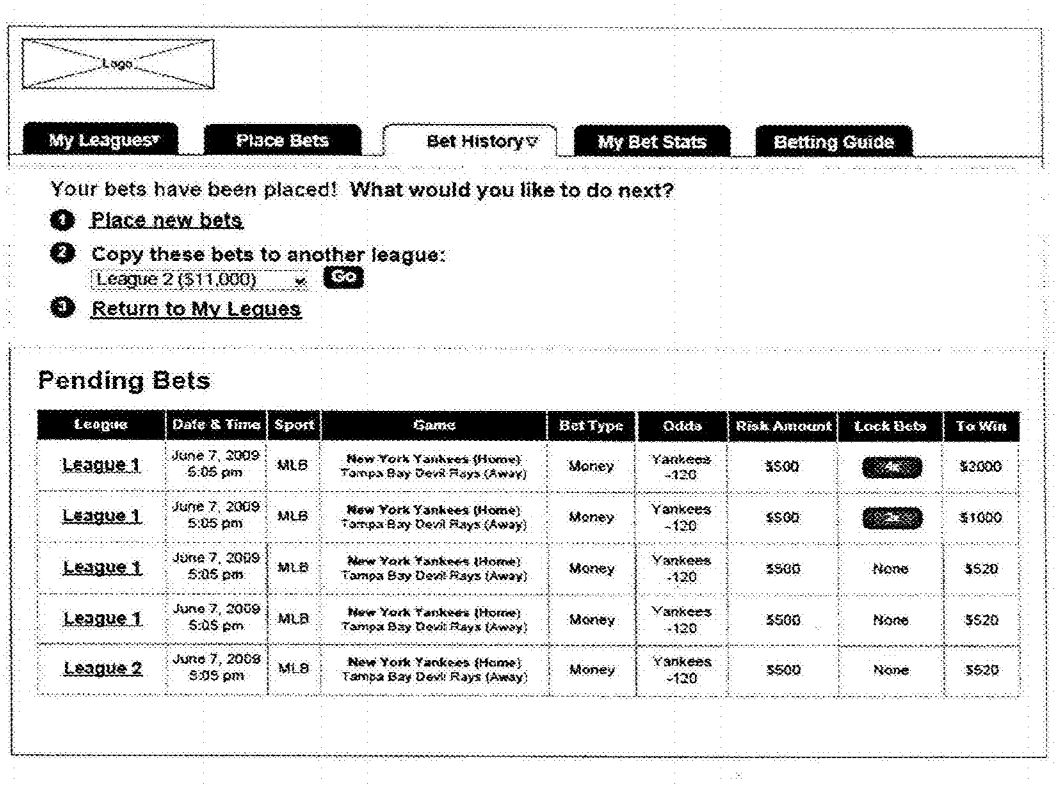
Figure 14:
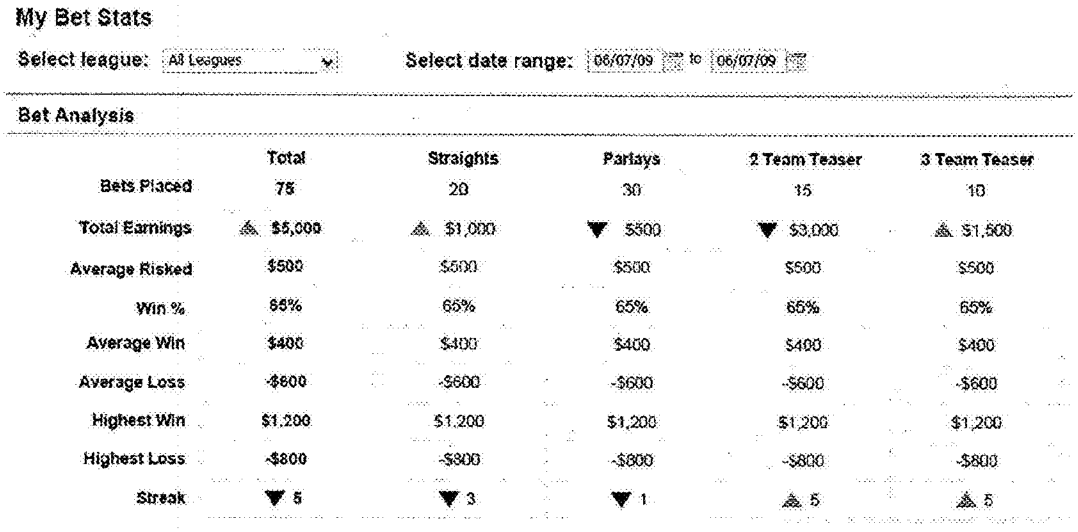

At any point, a player may selectively access a history of betting activity as shown in FIG. 12 by, for example, selecting a link on the league home page. By selecting this link, the processor queries the repository for bets placed by the player and produces a report such as the ones shown in FIG. 12. These reports may include a standard set of information such as the league name, the type of bet, the date the bet was placed, the type of contest, information about the actual contest, the parameter of the bet, the result of the bet, the amount risked, whether or not an enhancer was applied, and an amount won. These categories as shown herein represent the respective columns in the display images of FIG. 12. Alternative image displays of betting history and statistics are shown in FIGS. 13 and 14.

Figure 15A:
Figure 15B:
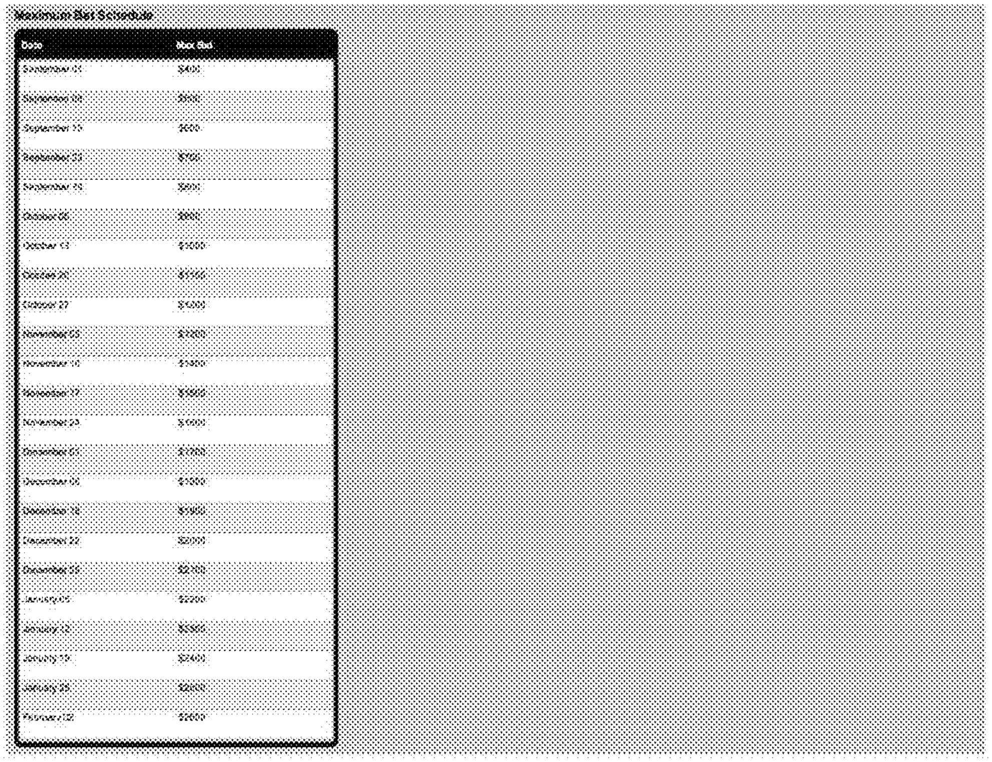
Figure 16:
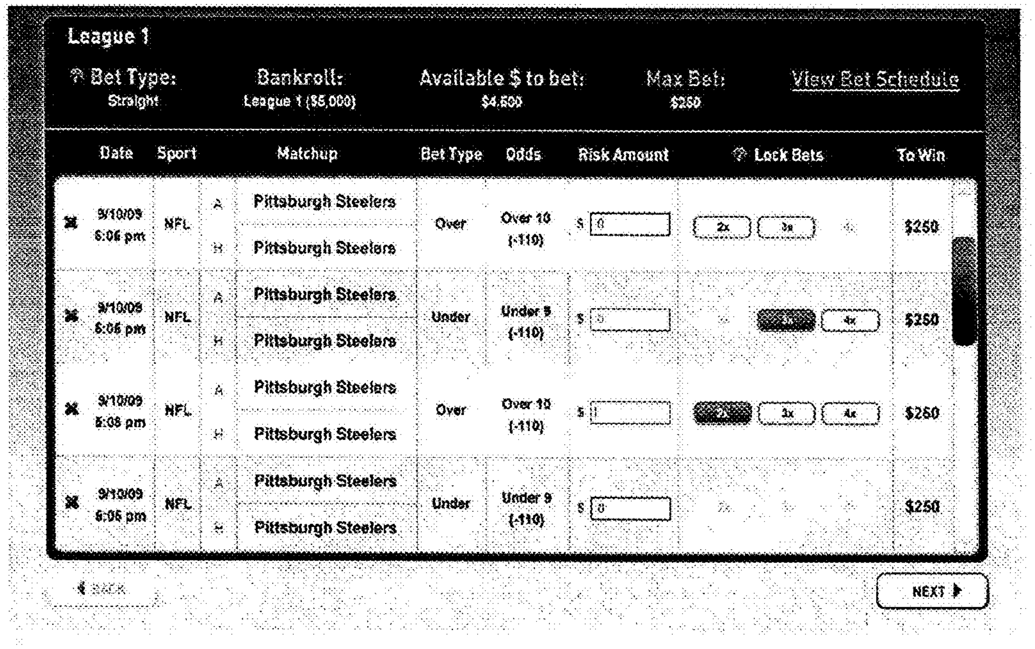

FIGS. 15A and B and 16 are alternative display images presented to the user that enables the user to apply a bet enhancer to a particular bet. FIG. 15 presents the user with the Max Bet option for the particular league. Upon selecting the Max Bet image element, the system automatically displays the image shown in FIG. 15B listing the schedule of available Max Bet values by betting period as determined by the rules. FIG. 16 represents an exemplary screen shot that includes a column entitled lock bets. For each contest, image elements representing the available lock bets are presented for selection by a user. Once selected, the image elements changes color to notify the user that the particular type of lock bet has been selected for a respective contest.

Figure 18:
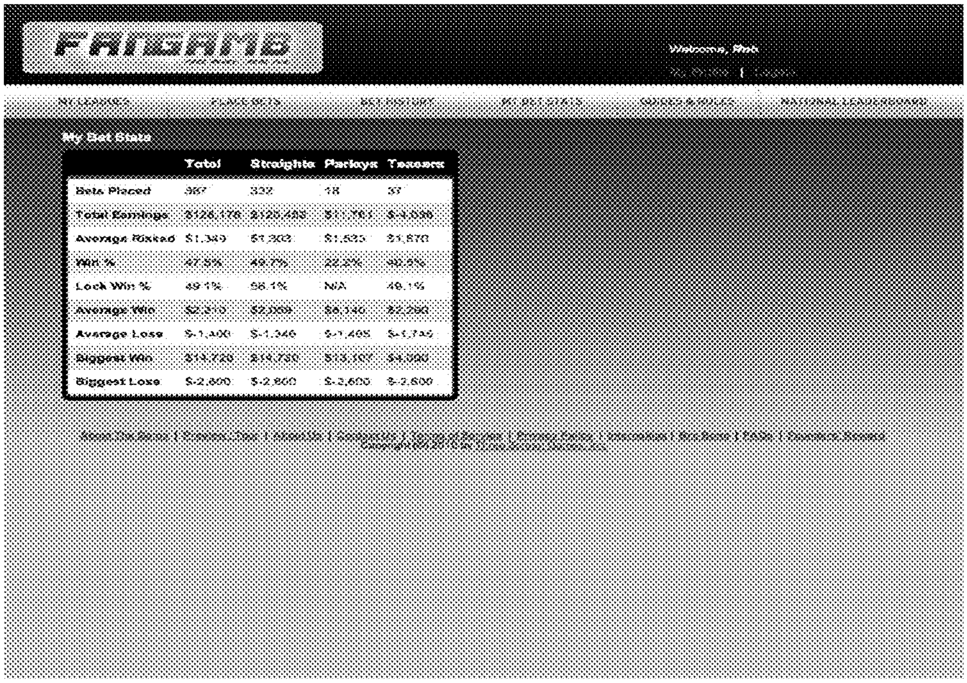
Figure 17:
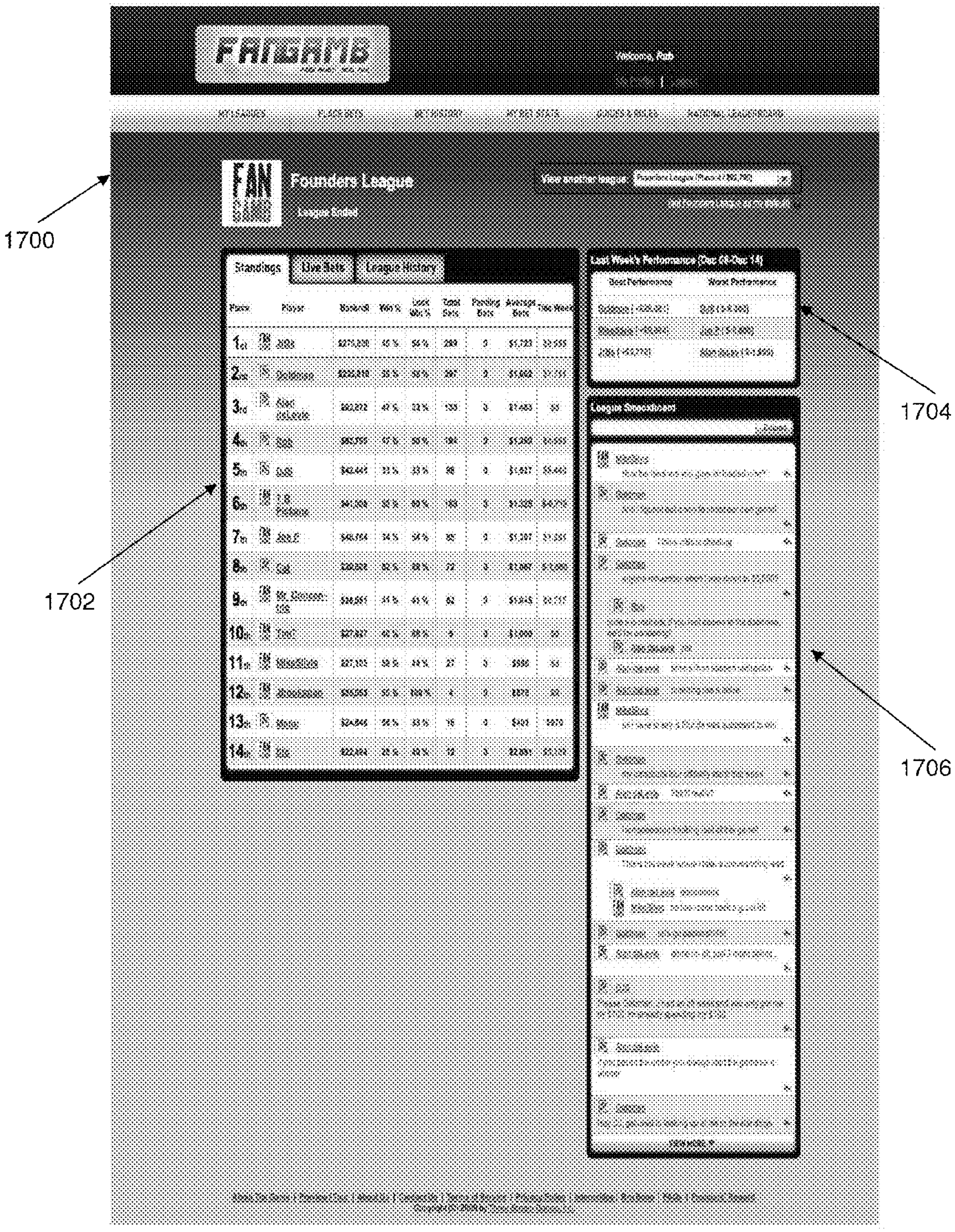
Figure 19:
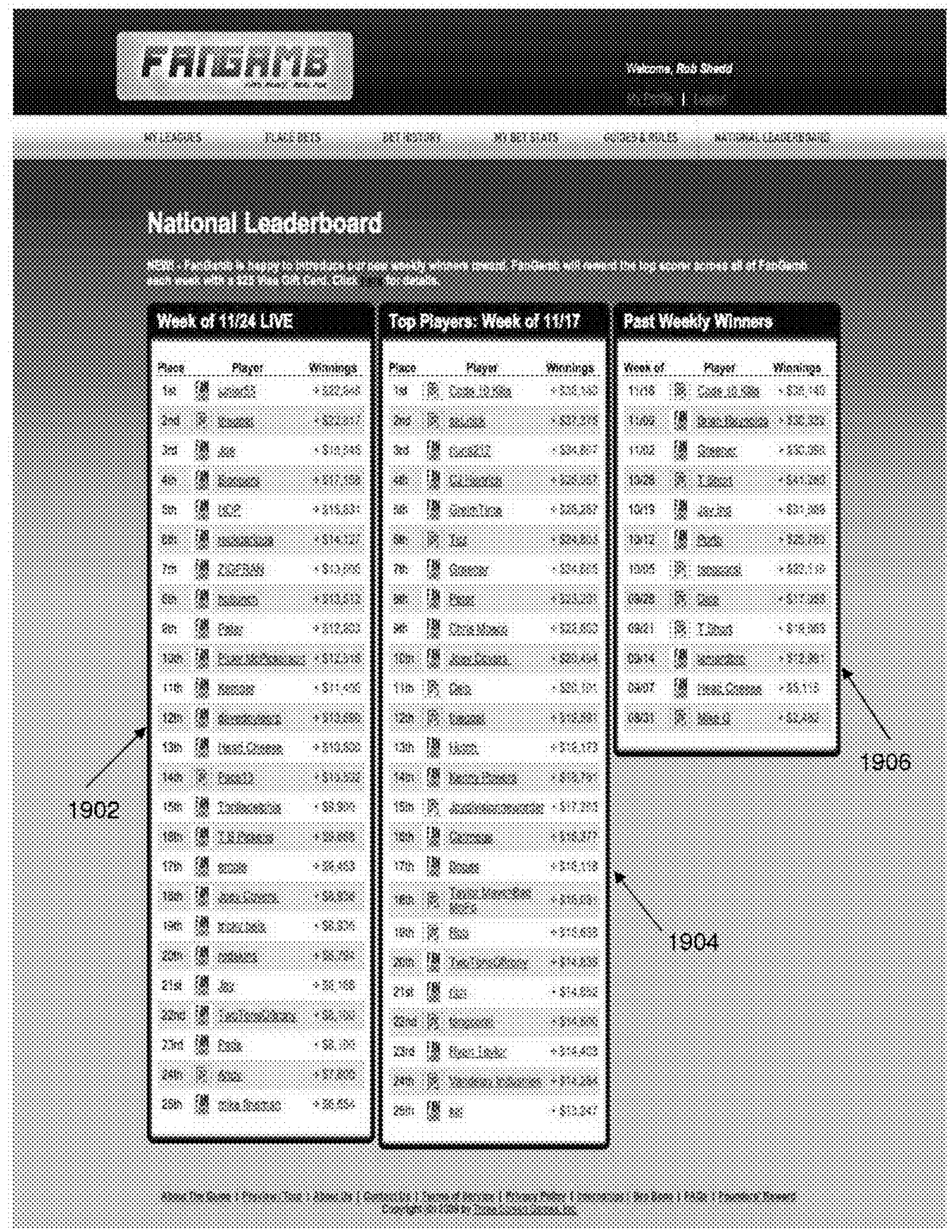

FIG. 17-19 are additional exemplary screen shots of player and league information that are selectively presented to the user and enhance the community gaming experience. FIG. 17 is an exemplary display image that includes a plurality of individual display windows including different types of information associated with the league. A first window 1702 includes a tab activated system whereby a user can select a tab and display a respective type of data. The exemplary tabs shown enable display of the league standings, the existence of any live bets and the league history. A second window 1704 displays information identifying league or community members that had the best and worst performances. Additionally, window 1706 provides an interface for users to post messages to other league members that advantageously encourages the social aspect of the league. FIG. 18 is a display image that includes the betting statistics associated with a respective player.

FIG. 19 is an exemplary display image of a leader board that provides a plurality of information to a user of the system. In window 1902, the standings for a respective betting period for the respective league are presented. In window 1904, a list of data representing the most successful players across all leagues are shown and in window 1906, data representing past overall weekly winners is displayed. The types and organization of information shown in FIG. 19 are described for purpose of example only and the user or league creator may determine what information is shown as well as how the information is formatted thereby providing a more customized experience for each player and/or league. Additionally, the leader board information may also include user selectable icons associated with a particular element of data that enables a player to access additional information about the data. For example, in window 1904, if an icon appears next a players name, the current user may select the icon and be presented with a display image including data representing the selected players future predictions. Additionally, the future prediction data may be incomplete and provide the current user the ability to access a full set of predictions by paying a fee thereby generating revenue for at least one of the system operator and the player who makes the predictions. In an alternate embodiment, the leader board may provide an indicator associated with a particular player that identifies a characteristic about the player. The characteristics may include but are not limited to how successful the player has been over a predetermined time period, how unsuccessful the player has been over a predetermined time period, a status identifying the players standing in their respective league, availability of the player to make predictions, data identifying the number of additional players have used information from the particular player, data identifying total amount of monies won using information provided by the player, etc. These characteristic indicators are presented to players across the entire system and allow the players to determine if at least one particular player may be able to provide helpful information for future betting periods. A user selectable icon may be associated with the players having a particular characteristic indicator showing that allows players to contact the particular player to obtain information therefrom. By selecting the icon, the player is required to pay a fee to at least one of the particular player and the system operator to have access to the particular player's information.

Another embodiment provides a gaming environment enabling players to place wagers on at least one contest and/or event during a given time period, using units of an initial bankroll amount that corresponds to an initial investment unit value specified by the user, to obtain a return on the initial investment units. As used herein the term unit may correspond to a class of monetary instruments in one or more jurisdictions (e.g. dollars, euros, etc). Alternatively, the initial investment may be a unit value specified by the user but not actually paid by the user to the system operator or game manager. In this alternative embodiment, the user is playing for free and is unable to obtain an actual return on the initial investment specified by the user. For example, the user may specify the amount of initial investment unit being 5.00 and the game may provide the user with initial bankroll units of 100,000.00. The user may select an amount of units from the initial bankroll to be used in wagers on contests. If the wager is successful, the number of units rewarded is automatically added to the bankroll and the system automatically tracks the number of units in each player's bankroll. As this is a single player game whereby the player is playing against the system operator, there is no official "winner". Rather, at the end of the gaming period, the number of units in the user's bankroll is compared to threshold values that correspond to specific returns on initial investments (see Table 1, below) to determine a level of success that the particular user had during the game period. The user may selectively obtain a monetary reward (e.g. cashing out) equal to the threshold level reached during that gaming period. Table 1 represents an exemplary payout table that provides information to users regarding the rewards (or penalties) that the user has achieved based on their performance in the game. In one embodiment, the data values including the payout table may be static and are derived from predefined payout table data. In another embodiment, the data values in the payout table may be dynamically generated based at least in part on data entered or selected by a user and which is associated with the game.

The rules of the game identify at least (a) the type of wagers able to be placed, (b) the types of contests on which wagers may be placed; and (c) a time limit defining the duration of a particular game. The time limit may be set by a system operator in a manner described above with respect to step 104 in FIG. 1. Other rules may also include (a) a "minimum bet amount" (e.g. 5% of the units of the user's bankroll); (b) a "maximum bet amount" (e.g. no more than 25% of the units of the user's bankroll) (c) a maximum amount able to be won on any particular wager; and (d) a booster value that modifies (e.g. increases, multiplies, etc) an amount of money wagered on at least one contest. For example, if the maximum win value is 500,000 units and a player has a bankroll of 400,000 units, if they attempt to place a bet of 100,000 units on a 10/1 shot, the system will automatically notify the player that the maximum amount allowed to be risked on this bet is 50,000 units which then pays out the maximum win amount of 500,000 units. Once the rules of the game are defined, respective users may engage in game play at any time during the active duration of the game. Thus, the system advantageously provides users with an asynchronous risk based social game. Unlike a multiplayer game which requires all players to be online playing at the same time, asynchronous game play allows participants to compete with others but on their own schedule. Asynchronous social gaming environments are those that allow the users of the game to compete against other users and/or a game operator at non-specific time periods that are convenient to the particular user. This advantageously encourages a greater number of potential game players (users) because each user may vary their level of participation depending on their schedule while still being able to participate in all aspects of the gaming environment. By enabling participation based on each user's own schedule, the users are able to play collectively but not necessarily at the same time such as is required by synchronous games (e.g. online head-to-head video games). Moreover, the system advantageously provides a risk-based asynchronous game that allows individual user's in a community of users to wager on events against a single non-user opponent and actively share their success with the community of users. Furthermore, the system advantageously maintains the user's initial investment value confidential and provides each user with the same amount of initial bankroll with which to wager. In this manner, the user's are able to socially compete without being made aware of the actual amount of money risked by each user.

This single player gaming environment also advantageously encourages cooperation and social interaction between the various players because each player has the same objective, i.e. to increase the value of the user's initial bankroll by placing as many successful wagers on contests (e.g. sporting events) during the given gaming period as possible. Heretofore, there is no interactive asynchronous risk-based gaming environment that allows users to wager money on a set of contests during a given period of time. Despite being an asynchronous gaming system, the present embodiment actively encourages interaction with other users (players) by providing a series of user interfaces that prompt a user to help other users actively participating in the game. The system allows for users to interact with one another without the need to be online simultaneously. This may be accomplished by a series of electronic notifications, the delivery of which are controlled by a respective user. For example, if User A believes they have information about a particular team in a particular sporting event that increases the likelihood the team will win the contest, the system enables User A to share this knowledge with User B (e.g. a "friend") who is also playing the game. The sharing mechanism may be an immediate notification (e.g. an electronic mail message sent by the system to User B when the system receives a control signal indicating data is to be shared) or a delayed notification (e.g. generating and posting a message to User B that is viewable upon a subsequent login to the system by User B). These notifications are for purposes of example only and any notification method may be used by the system to facilitate sharing of information or data between users of a particular game or even between users of different games. Upon receipt of the notification, User B can selectively decide whether or not to act on the information and place a corresponding wager.

In order to further encourage a robust and thriving gaming community playing the asynchronous risk-based wagering game, the system advantageously enables users to begin playing the game with an initial bankroll having the same number of units despite the value of the initial investment provided by the user. For example, User A may provide an initial investment of 5 units but User B may provide an initial investment of 10 units. Once the game period begins, both User A and User B are provided with an initial bankroll having 100,000 units that may be wagered. However, the amount of their respective initial investment remain confidential from each other and any other users. Moreover, the return on the initial investment is dependent on a dynamically created payout table having threshold values identifying rewards of a certain number of units if the threshold values are met. An exemplary payout table is shown in Table 1.

TABLE 1

| User A: 5 unit initial investment | | User B: 10 unit initial investment | |
|---|---|---|---|
| Game€ | Euro | Game€ | Euro |
| € 1m | 100 | € 1m | 200 |
| € 900k | 75 | € 900k | 150 |
| € 800k | 50 | € 800k | 100 |
| € 700k | 37.5 | € 700k | 75 |
| € 600k | 30 | € 600k | 60 |
| € 500k | 25 | € 500k | 50 |
| € 400k | 20 | € 400k | 40 |
| € 300k | 15 | € 300k | 30 |
| € 200k | 10 | € 200k | 20 |

TABLE 1-continued

| User A: 5 unit initial investment | | User B: 10 unit initial investment | |
|---|---|---|---|
| Game€ | Euro | Game€ | Euro |
| € 150k | 6 | € 150k | 12 |
| € 100k | 4.5 | € 100k | 9 |
| € 90k | 4 | € 90k | 8 |
| € 80k | 3.5 | € 80k | 7 |
| € 70k | 3 | € 70k | 6 |
| € 60k | 2.5 | € 60k | 5 |
| € 50k | 2 | € 50k | 4 |
| € 40k | 1.5 | € 40k | 3 |
| € 30k | 1 | € 30k | 2 |
| € 20k | .5 | € 20k | 1 |
| € 10k | .25 | € 10k | 0.5 |
| 0 | 0 | 0 | 0 |

As shown in Table 1 the columns labeled "Game" are the threshold unit values at which rewards are provided. The columns labeled "Euro" represent an amount of a reward in Euros that a user is able to win at respective threshold values. For example, User A has only provided an initial investment of 5 Euros, so the maximum reward available to User A is 100 Euros and only available if User A reaches one million game units. However, in this example, with an initial investment of 10 units, User B is able to win 200 Euros when reaching the one million unit mark.

The system automatically creates the payout table using an algorithm that generates reward levels, the reward levels between various threshold levels may be linear up to a particular threshold and become non-linear at least one of above and below another threshold value. In the exemplary payout table in Table 1, the reward levels are non-linear below the 100 k mark and above the 700 k mark. However, this is shown for purposes of example only and the payout table may be at least one of (a) linear; (b) non-linear; and (c) partially linear and partially non-linear in both a positive and negative manner with respect to the initial bankroll value. Therefore, the players that have total game units below the initial bankroll value are penalized while those players having game units as listed at the top of the table are rewarded. The system advantageously hides the number of initial investment units provided by each player but enables various players across an economic spectrum to engage in a game using a same set of rules (100,000 virtual bankroll, 21 day clock, etc.). This enables players to compete socially while keeping real money considerations to themselves.

In another embodiment, the system may provide a user with an option to select a type of payout table from a set of different types of payout tables that may be used during game play. The option to select a type of payout table may be selectively presented to the user upon initiation of the game. A payout table type includes a set of predetermined threshold reward and penalty levels that are categorized according to a predetermined level of risk associated with reaching different thresholds included within the payout table. Payout table types may include at least one of (a) a conservative payout table; (b) a medium payout table; and (c) a risky payout table. Each payout table type differs in the maximum total reward available to the user based on their initial investment as well as the number of individual reward levels in each respective type of payout table. For example, the total reward available to the user who selects the medium payout table is greater than the total reward available to the user who selects the conservative payout table. Similarly, the total reward available to the user selecting the risky payout table is greater than both the medium payout table and conservative payout tables.

Additionally, the number of reward threshold levels decreases as one moves up the risk scale from conservative payout tables to medium payout tables to risky payout tables. The conservative payout table includes the largest number of reward threshold levels and least number of game units between respective reward threshold levels. The medium payout table includes a number of reward threshold levels less than the number of reward threshold levels in the conservative payout table and also includes a greater number of game units between respective reward threshold levels than in the conservative payout table. The risky payout table includes a number of reward threshold levels less than the number of reward threshold levels in both the medium payout table and conservative payout table and also includes a greater number of game units between respective reward threshold levels than in either the medium payout table or the conservative payout table.

In one embodiment, the conservative payout table may include a first top reward value equal to a first multiple of the initial investment (e.g. 10 times the initial investment value) and also including a first number of reward threshold levels with a first amount of game units between respective reward threshold values. The medium payout table may include a second top reward value equal to a second multiple of the initial investment, wherein the second multiple is greater than the first multiple. The medium payout table includes a second number of reward threshold levels, the second number of reward threshold levels being less than the first number of reward threshold levels and a second number of game units between respective reward threshold levels, the second number of game units being greater than the first number of game units. The risky payout table may include a third top reward value equal to a third multiple of the initial investment, the third multiple being greater than the second multiple. The risky payout table includes a third number of reward threshold levels wherein the third number of reward threshold levels is less than the second number of reward threshold values and a third number of game units between respective reward threshold levels, the third number of game units being greater than the second number of game units. For example, the conservative payout table may provide a user with the ability to win ten times their initial investment amount whereas the medium and risky payout tables may enable the user to win fifteen and twenty times their initial investment, respectively. However, there are less reward threshold levels as one progresses up the payout table risk scale such that there are less reward thresholds and each reward threshold level is harder to reach as the risk increases. Examples of the various payout table types may be found in FIG. 22B.

In another embodiment, the payout table types may include a subset of payout table types within each respective type of payout table type. For example, a user may select from any number of conservative payout table types from within a set of conservative payout tables. The difference between respective conservative payout table types is the number of reward threshold levels and the number of game units between respective reward threshold levels. In a further embodiment, the number of game units between respective reward threshold levels may be equal or unequal providing a differing risk profile to the user. One skilled in the art would appreciate that these principles may be applied to each of the medium payout tables and the risky payout tables.

Figure 20:
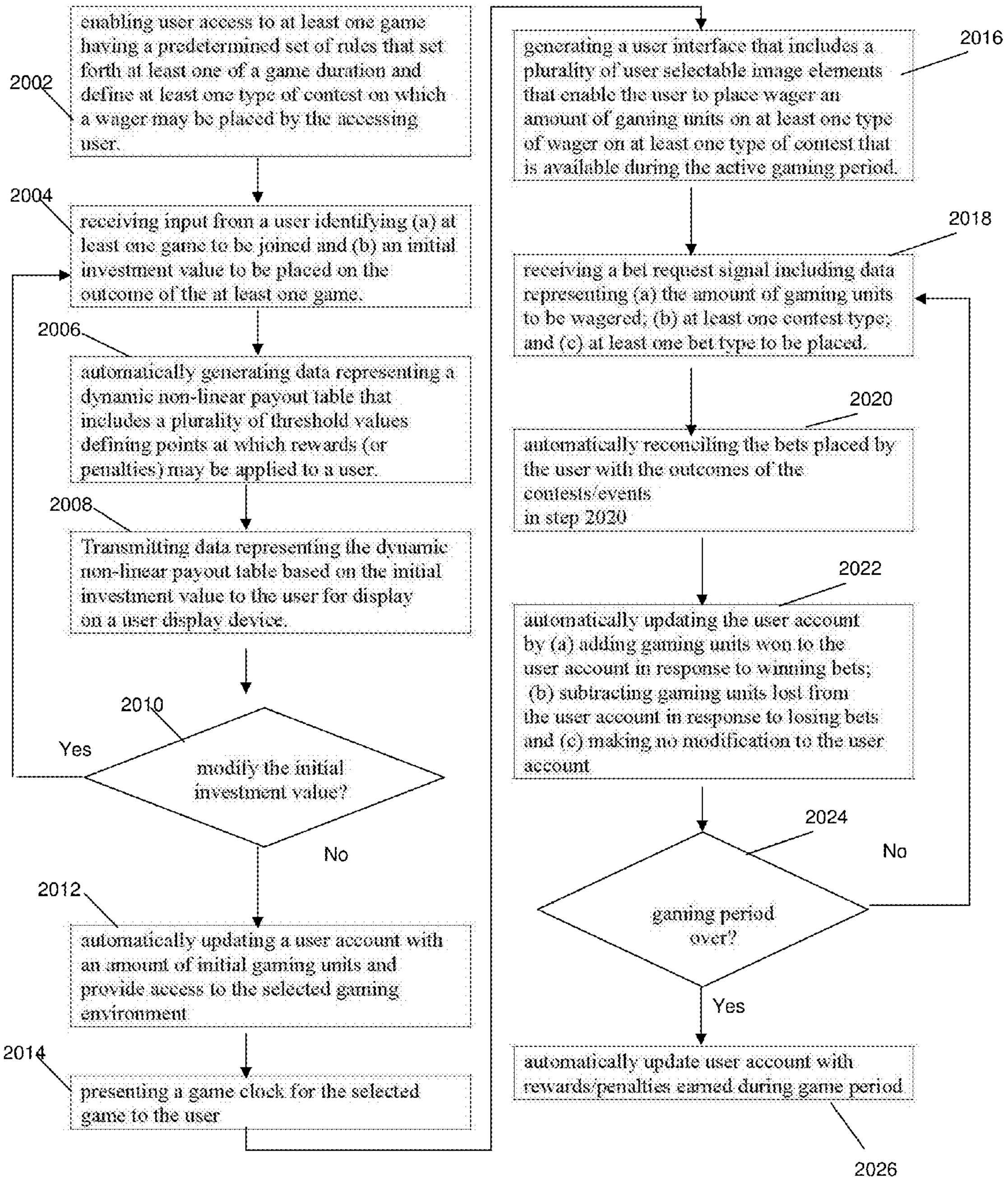
FIG. 20 is a flow detailing an algorithm for implementing and operating a gaming system according to invention principles.

FIGS. 20-28 describe an exemplary embodiment of the asynchronous risk-based gaming system described above. FIG. 20 is a flow diagram detailing exemplary operation of the asynchronous gaming system. In step 2002, the system enables user access to at least one game having a predetermined set of rules that set forth at least one of a game duration and define at least one type of contest on which a wager may be placed by the accessing user. The game duration may span a single day or a plurality of days. Alternatively, the game duration may be specified within a single contest and the wagers to be placed are on outcomes of events occurring within the single contest as discussed above with respect to FIGS. 1-3. Thus, in an exemplary embodiment, in response to an access request signal generated by a user and received over a communications network, the system may generate a user interface display image to be transmitted to and displayed on a user display device (e.g. a computer, handheld device, smartphone, etc). The games provide an interactive gaming environment that allows the users to selectively wager an amount of gaming units on any number of contests (e.g. sporting events) during a specified time frame, bankroll permitting. For each contest on which a wager is placed, the user is able to select a wager type and amount, similarly as discussed above. Thus, the users are playing against a game clock and seeking to win as many wagers as possible during the set time period.

In step 2004, the system receives input from a user identifying (a) at least one game to be joined and (b) an initial investment value to be placed on the outcome of the at least one game. In one embodiment, the initial investment value may be an entry fee and the system selectively processes payment equal to the amount of the initial investment by the player for example by receiving and processing user payment information (e.g. credit card information). In another embodiment, no payment by the user is required and the user can engage in game play without paying an entry fee. The initial investment value is associated with a user account for the system and once the game has begun, the system automatically deducts the initial value from the user account and grants the user access to the gaming environment.

In step 2006, the system automatically generates data representing a dynamically created payout table that includes a plurality of threshold values defining points at which rewards (or penalties) may be applied to a user. An example of the dynamically created payout table is shown in Table 1. Step 2006 is performed in response to receipt of user input defining the initial investment value to be placed on the outcome. In another embodiment, step 2006 may also include the activity of selecting a type of payout table corresponding to a desired risk amount and also including a total reward available to the user upon reaching the highest rewards threshold value. In step 2008, data representing the dynamically created payout table based on the initial investment value is transmitted to the user for display on a user display device. Alternatively, data representing the dynamically created payout table based on the payout table type selected as well as the initial investment value is transmitted to the user for display on a user display device. The system, in step 2010, queries the user to see if the user would like to modify the initial investment value set forth in step 2004. If the user does wish to modify the initial investment value, the method refers back to step 2004 and receives initial investment data having a different value (e.g. higher or lower), and re-generates a different dynamically created payout table based on the newly received initial investment data. However, if the query in step 2010 produces a "no" response, then the user's account is automatically updated with an amount of initial gaming units and the user is automatically provided access to the selected gaming environment in step 2012. No matter the amount of the initial investment by any player, every user is provided with the same number of gaming units at the start of the game. The system automatically correlates the possible monetary rewards (or penalties) available to the user based on the initial investment value but maintains the initial investment value in confidence preventing any other user from learning how much any one player is wagering in the game.

A game clock for the selected game is presented to the user in step 2014. The game clock may count down the time remaining in the gaming period or may display the time that has elapsed thus far in the gaming period. The game clock is generated by the system for each respective game being operated by the system. For example, the rules may specify that the gaming period is to last twenty one days. The clock will be displayed to the user on all gaming screens to provide the user with the amount of time until the gaming period end. The game clock and any time remaining on the game clock is specific to each user. User's may play their own game simultaneously with other users but gaming period for each user is defined by the user-specific clock generated and presented in step 2014.

Once engaged in game play, the system, in step 2016, generates a user interface (UI) that includes a plurality of user selectable image elements. The user selectable image elements enable the user to place wagers of an amount of gaming units on at least one type of wager on at least one type of contest that is available during the active gaming period. While the UI is described as having selectable image elements, one skilled in the art would appreciate that the UI may have user tillable fields for receiving user input or candidate selection lists (e.g. drop-down lists) including bet and/or contest types. For example, the user may be presented with a plurality of different soccer matches that are being played on a given day and for each match, there may be at least one type of bet (e.g., parlays, teasers, run line bets, over/under, progressive parlays, head-to-head bets, etc.) associated with the respective match. Other betting options may be available to the user at certain points throughout the game. For example, the system may enforce bet maximums (e.g. no more than 25% of current amount of gaming units per bet or a fixed number) to prevent players from going bankrupt too soon as well as to set bet minimums (e.g. 5% of current gaming units per bet must be placed). For example, players will be limited to a maximum bet amount of 25% and a minimum of 5% of their bankroll for any specific bet. Moreover, the betting rules and features described above with respect to FIGS. 1 and 2 may also be included in the present embodiment. Additionally, the system may enable bet "boosters" (e.g. a 10 k unit free bet after a predetermined number of bets have been placed by a user). The bet boosters described above with respect to FIGS. 1 and 2 may also be incorporated in this embodiment.

The system receives a bet request signal generated by a user in step 2018. The bet request signal includes data representing (a) the amount of gaming units to be wagered; (b) at least one contest type; and (c) at least one bet type to be placed. Once the "signal" is received, the signal is validated against the virtual funds that a user has in their account, and the applicable limits—is the risk amount over the minimum allowed, and under the maximum; has the game already started, etc. Steps 2016 and 2018 may be repeated as often as possible within the gaming period thereby allowing the user to place multiple different types of bets on as many contests/events as possible so long as the user has a sufficient amount of gaming units associated with their account. The bet request signal may also include data representing a bet booster to be applied to at least one of the bets being made by the user.

After a predetermined period (e.g. after all contests for a given day have been completed, or progressively as each individual contest has been completed), the system automatically reconciles the bets placed by the user with the outcomes of the contests/events in step 2020 and in step 2022 automatically updates the user account by (a) adding gaming units won to the user account in response to winning bets; (b) subtracting gaming units lost from the user account in response to losing bets; or (c) making no modification to the user account because, based on the reconciliation of bets, the user has neither won nor lost gaming units.

The system queries whether the gaming period has ended in step 2024. If the gaming period has not expired, then steps 2016-2024 are repeated. If the gaming period has expired, then the system automatically reconciles the user's account by applying any rewards or penalties earned during the gaming period in step 2026. The system determines if a user has a number of gaming units that is equal to or greater than a threshold value (e.g. the first user to 1,000,000 units). This determination is made at set times during the gaming period and not just at the expiration of the gaming period. Alternatively, if no user has the requisite number of gaming units to equal or exceed the threshold value prior to the expiration of time, the system identifies the user as having "beaten the house". The user, as determined by the system, will be provided with a reward (e.g. money prize) that would automatically be deposited in the winner's system account. Additionally, players that have not beaten the house may also be provided with rewards depending on the level of gaming units possessed at the time when their user-specific game clock expires. In this instance, the user's account may be automatically updated to include prizes or rewards that are determined using a payout table as shown in Table 1 above, for example.

In another embodiment, the determination as to whether the gaming period has ended may include at least one of (a) reaching the highest threshold listed on the user's dynamically created pay table (e.g. one million gaming units); (b) user has no gaming units remaining on account; and (c) player selectively chooses to end game participation and cash out. At the conclusion of the gaming period user selectively cashes out, the system automatically determines the number of gaming units in the user's account and compares that number with the thresholds set forth in the user-specific dynamically created payout table and either rewards the user by providing a reward to the user matching the threshold reached or subtracts at least a portion of the initial investment value provided when the game had started.

In another embodiment, upon determining that the user has reached the highest threshold listed in the payout table during the active gaming period, a second game is initiated. While referred to here as a second game, it should be noted that the second game and all activities associated therewith occur during the active game period. The second game is a bonus game that allows the user to make additional wagers to reach a second different set of thresholds until a time remaining in the active gaming period has ended. Upon entering the second game (e.g. bonus game) the system automatically notes the rewards earned by the user associated with reaching the highest threshold level in the payout table and stores data representing earned awards for the particular user. The second game begins with the amount of game units that the user has accumulated from the first game. For example, if the highest threshold in the payout table is one million game units, the user begins the second game with at least one million game units. A second payout table is dynamically created that includes a set of reward level thresholds which, when reached, apply a bonus to the reward amount earned during the first game. In one embodiment of the second game, all betting rules that governed the amounts and types of wagers are eliminated and the user is free to wager any amount of game units on any particular contest that is going on within the time period. Alternatively, the second game may employ a second different set of betting rules that are modified from the rules of the first game to enable the user to place larger one-time wagers. In one embodiment, the second dynamically created payout table associated with the second game includes four threshold levels having a predetermined amount of gaming units between respective reward threshold levels and a predetermined bonus multiplier associated with each respective reward threshold level. In another embodiment, the user may be presented with an option of selecting a type of payout table from a set of payout tables to function as the second payout table as discussed above. The second game ends when the time remaining in the active gaming period expires or when the system determines that the user has an amount of gaming units equal to or greater than the highest threshold level (e.g. greatest number of gaming units to reach the greatest reward level) on the second payout table. At this time, a total amount of gaming units equal to the initial reward amount earned by reaching the highest threshold in the first payout table plus a bonus amount applied to the initial reward amount based on the threshold reached in the second payout table is deposited into the use's account. Should time in the active gaming period expire prior to reaching any of the threshold levels in the second payout table or should a user lose all of the previously accumulated gaming units, a reward amount equal to the reward associated with the highest threshold of the first payout table is deposited into the user's account. Thus, the second game, actively encourages users to wager greater amount of gaming units because no matter the outcome of the wagers, the user has still earned an initial amount of rewards.

For example, in the event that a user selected and completed a high risk game, the second payout table may include a first threshold level of ten million gaming units and, if reached, would apply a fifty percent bonus to the reward earned at the conclusion of the first game. The second payout table may include a second threshold level of twenty five million gaming units and, if reached, would apply a one hundred percent bonus to the reward earned at the conclusion of the first game. The second payout table may include a third threshold level of fifty million gaming units and, if reached, would apply a two hundred percent bonus to the reward earned at the conclusion of the first game. The second payout table may include a fourth threshold level of one hundred million gaming units and, if reached, would apply a three hundred percent bonus to the reward earned at the conclusion of the first game. At no point in the second game is the user at risk of losing the reward amount earned in the first game. The number of threshold levels, amounts of gaming units between threshold levels and rewards amounts associated with threshold levels is described for purpose of example only and any number of threshold levels with any number of gaming units between respective threshold levels may be employed. Additionally, each threshold level may be associated with any bonus rewards amounts.

In an exemplary operation, an initial investment amount of a user may be ten euros resulting in a maximum reward of 200 euros upon reaching the highest reward threshold level of one million gaming units in the first game. Upon completion of the first game and entrance into the second game, the 200 euro reward would be deposited into the user's system account. Thereafter, the system automatically generates the second payout table with the second set of reward threshold levels as described above. The user plays the asynchronous risk-based game to try to increase the current amount of gaming units into an amount reaching at least one of the reward threshold levels in the second payout table. At the conclusion of the second bonus game, if the user has an amount of gaming units equal to or greater than the third threshold level but less than the fourth threshold, a bonus is applied to the initial reward amount earned from the first game and deposited into the user's system account. For example, if the user has reached fifty million gaming units, a two hundred percent bonus is applied to the initial reward amount of 200 hundred euros resulting in an additional 400 euros being deposited into the user's system account resulting in the user having earned a total of 600 euros from their initial investment of 10 euros upon reaching the appropriate reward threshold levels.

Figure 21:
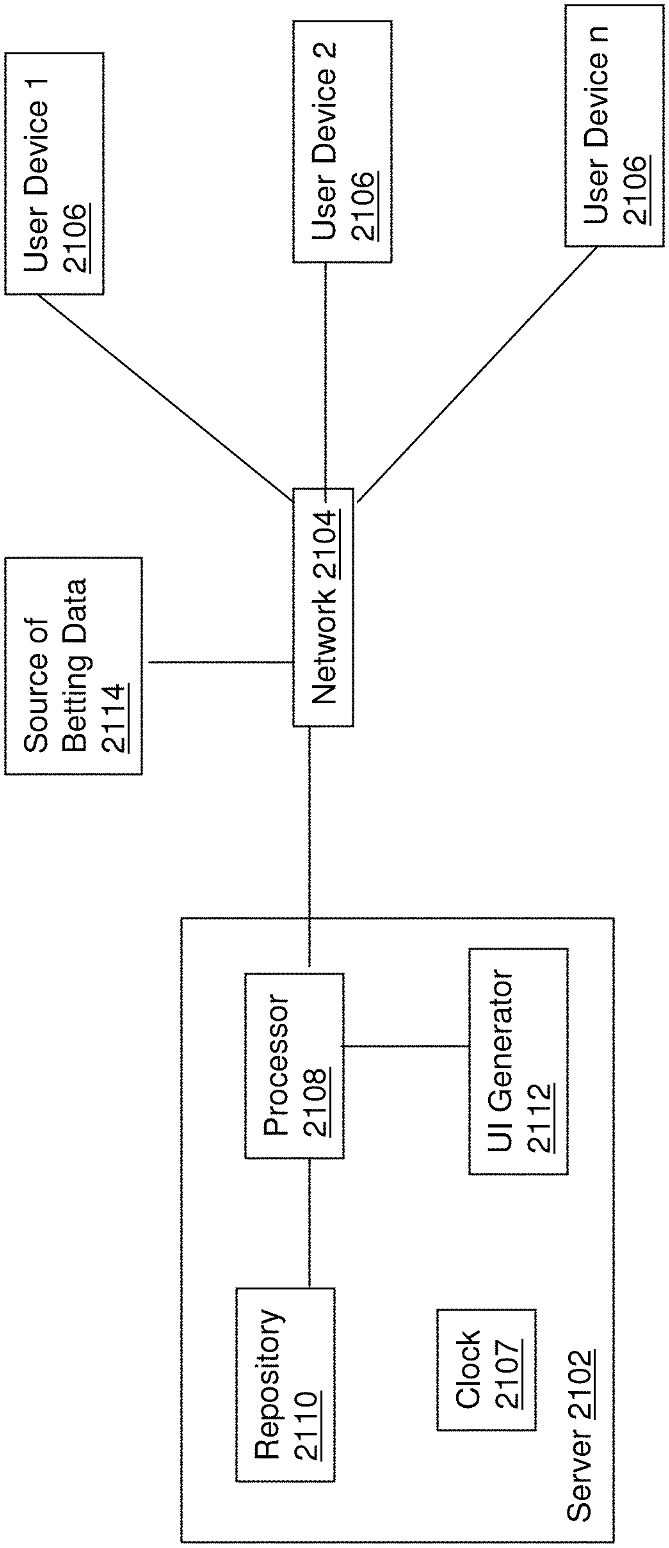
FIG. 21 is a block diagram of an embodiment of a system for implementing a gaming system according to invention principles.

FIG. 21 is a block diagram of the asynchronous risk-based fantasy sports gaming system according to invention principles. The hardware shown and described herein is able to implement the instructions described above with respect to FIG. 20 which represents an algorithm for operating the system. The system includes a server 2102 connected via a communication network 2104 to a plurality of user devices 2106. While only three user devices are shown and described herein, it is apparent that any number of user devices may connect to the server 2102 via communication network 2104. The user devices 2106 allow users to transmit and receive data associated with the gaming system in order to engage in game play as discussed above. User devices 2106 include at least one of a computer, a tablet computing device, a cellular phone, a smartphone, a conventional telephone and any other device able to receive input from a user and transmit data corresponding to the user input for receipt by the server 2102 as well as receive requested data from the server 2102. In one embodiment the user device is a cell phone. The cell phone is able to place a bet on a contest by inputting a text message and sending that text message via the communication network 2104 for receipt by the server.

The server 2102 includes a processor 2108, a repository 2110, a clock generator 2107 and a user interface generator 2112. The repository 2110 includes a plurality of instructions stored therein that direct the operation of the gaming system. The instructions may be in the form of machine executable code that are able to perform the functions described hereinabove with respect to FIG. 20. When an activation of a particular feature is requested, the processor 2108 executes the instruction corresponding to the particular feature that is stored in the repository 2110. Upon execution and activation of the feature, the processor 2108 conditions the user interface generator 2112 to generate a display image for display to at least one user that allows the user to make use of the particular feature. The system is also in communication with an external source of betting data 2114 from which a category of bets, types of bets and parameters of bets may be obtained for use during game play. Alternatively, betting data may be stored locally in the repository 2110 or acquired from external source 2114 and cached in the repository 2110. Examples of data retrieved from external sources include sports event data (teams, schedules/fixtures, game times, game results); betting odds (for a given game, what odds were being set); and contest results data that provides the ability to score/settle bets.

The processor 2108 executes an initial instruction which conditions the user interface generator 2112 to generate a home page for presentation to at least one user upon the user accessing the system at an address on the communication network. An example is a home page encoded in a particular data format (e.g. HTML, with JavaScript and CSS) that is selectively accessible by users via a web address using a communication protocols such as TCP/IP and HTTP. The home page provides a gateway for users of the system to access their accounts and initiate additional system functions. In an exemplary embodiment, the home page provides a plurality of user selectable image elements that enable a user to choose at least one asynchronous betting game in which to participate.

The clock generator 2107 automatically generates a game clock to be associated with each active game being operated by the system. Thus, the game clock generated by clock generator 2107 is user-specific. The clock generator 2107 automatically provides clock data including an amount of time remaining or time elapsed in a respective game to the processor 2108 and the UI generator 2112. During each active game the clock data generated by the clock generator 2107 is provided to the user showing how much time is left in the game or how much time has passed in the game. The system references the clock data at predetermined times in order to at least one of (a) reconcile bets placed within a time period; and (b) determine a winner of the game. Game operation is tied to the user-specific clock data because each game is time-based and ends after expiration of the game clock.

Figure 22A:
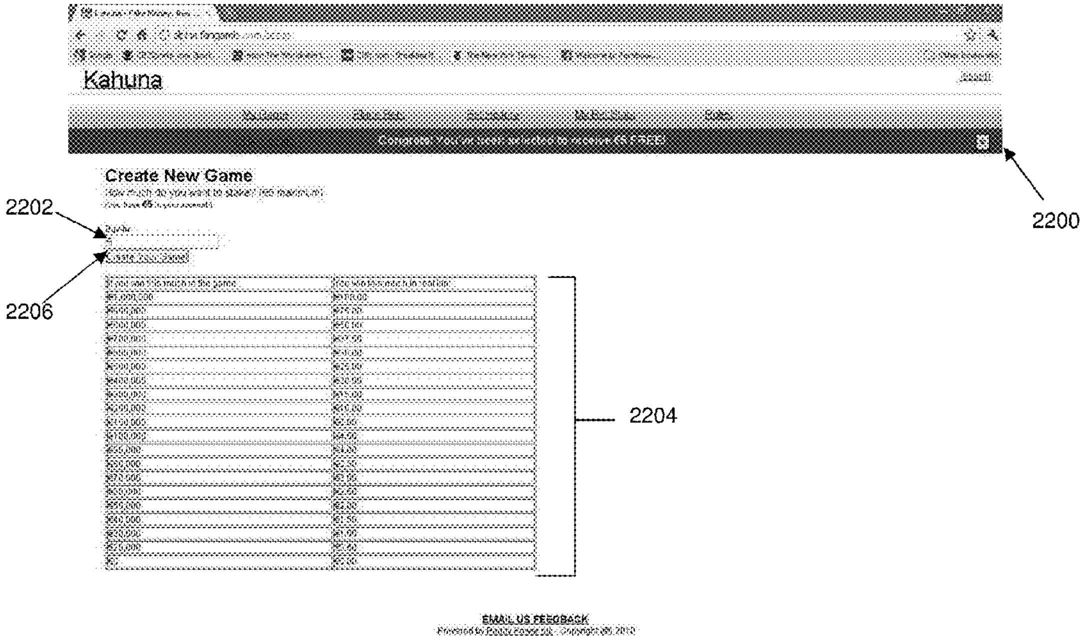
FIGS. 22-28 are exemplary screen shots of display images generated by the gaming system enabling users to engage in game play.

In response to a user logging into the system to access their accounts in a manner discussed above with respect to FIG. 4, the user is presented with a display image enabling them to generate an access request including data representing at least one asynchronous game in which they wish to participate. The access request signal is transmitted from a respective user device 2106 via communication network 2104 and received by server 2102. The processor 2108 initiates a new game creation algorithm in accordance with FIG. 20 and conditions the UI generator to generate the display image which is provided to the user device 2106 via communication network 2104 and shown in FIG. 22A. FIG. 22A shows an exemplary display image 2200 that may viewed, for example, on a browsing application executing on a user device 2106. The display image 2200 includes a user input field 2202 for receiving user input representing the initial investment value to be staked in the game. The processor 2108 receives data representing the initial investment value and automatically generates a dynamically created pay table 2204 that shows the various threshold values that may be achieved during the game along with the corresponding rewards (or penalties) available at each threshold. The user may selectively re-enter data representing different initial investment values and the processor 2108 will automatically modify the data in the payout table. This advantageously enables the user to see what the potential payout will be at the conclusion of the game. The display image 2200 includes a game creation image element 2206 that may be activated when the user decides on the initial investment value. Selection of the game creation image element 2206 causes an access request signal including data representing the game being joined and the initial investment value to be staked in the game to be transmitted via communications network 2104 for receipt by processor 2108. The server 2102 processes the access request signal and provides access to the gaming environment as will be discussed hereinbelow.

Figure 22B:
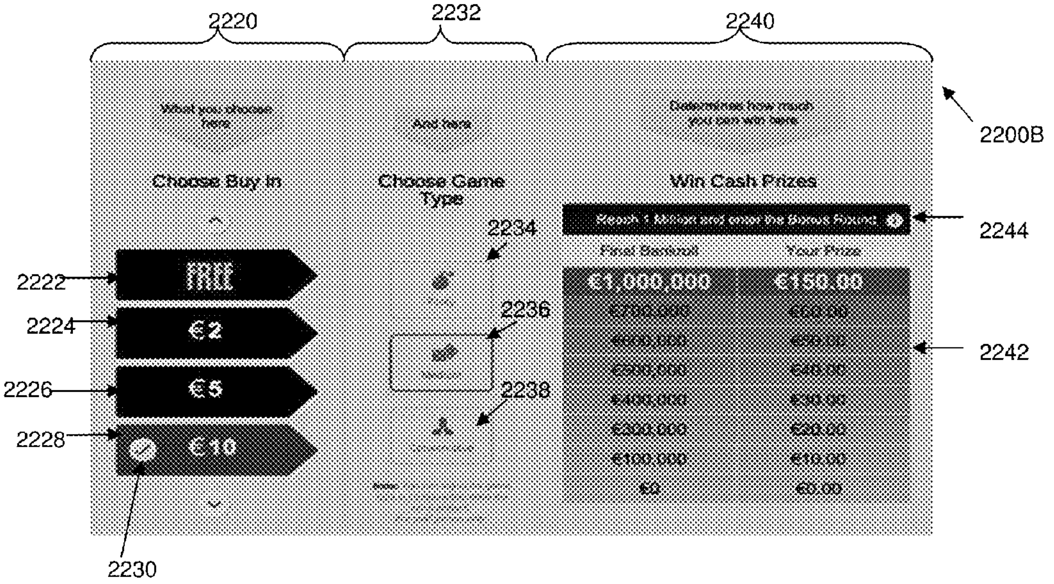

In another embodiment, upon receipt by the server 2102 of the access request signal from a respective user device 2106 via communication network 2104, the processor 2108 initiates a new game creation algorithm in accordance with FIG. 20 and conditions the UI generator 2112 to generate the display image which is provided to the user device 2106 via communication network 2104 and shown in FIG. 22B. FIG. 22B provides an exemplary display image 2200B that enables a user to selectively determine at least one of the initial investment value and select a type of payout table corresponding to a risk level associated with the game to be played. Display image 2200B includes an initial investment selection region 2220 including a plurality of user selectable image elements corresponding to an amount of initial investment to be made by the user. The initial investment selection region 2220 may include a first image element 2222 enabling a user to select an initial investment amount of zero, a second image element 2224 enabling a user to select an initial investment amount of two euros, a third image element 2226 enabling a user to select an initial investment amount of five euros and a fourth image element 2228 enabling a user to select an initial investment amount of ten euros. The number of image elements and the amounts of initial investments available to the user are shown for purposes of example only and any number may be generated by the system. In another embodiment, the user may selectively input an initial investment amount similar to the manner discussed above with respect to FIG. 22A. Additionally, an investment amount indicator 2230 may be selectively displayed to visually depict which initial investment amount was selected by the user.

The display image 2200B also includes a game type selection region 2232 that allows a user to selectively determine a risk amount to be associated with the game being created. The game type selection region 2232 may include a first game type selection image element 2234 associated with a high risk, a second game type selection image element 2236 associated with a medium risk and a third game type selection image element 2238 associated with a low (conservative) risk. Selection of a respective one of image elements 2234, 2236 or 2238 results in selection of a respective type of payout table that corresponds to the risk level associated with the selected image element. The system automatically generates the selected payout table type corresponding to the risk level selected by the user. The dynamically generated payout table corresponding to the selected risk level is displayed in the payout table display region 2240. The payout table display region 2240 includes the dynamically created payout table 2242 associated with the selected risk level of "medium". The dynamically created payout table displayed allows the user to see game milestones prior to the game beginning and, the display image 2200B allows a user to modify any of the selections previously made to view different available game options. Additionally, the payout table display region 2240 may include an information window 2244 that provides additional information about the game type selected by the user. In one example, information window 2244 displays information about how and when a bonus second game may be initiated such as by reaching a respective one of the threshold levels listed in the payout table 2242 displayed in the payout table display region 2240.

While FIG. 22B is displaying an embodiment showing the user has selected an initial investment value of ten euros and decided to play a medium risk game resulting in the particular payout table 2242 being shown in region 2240, one skilled in the art would understand how a different payout table corresponding to any of a different initial investment value and/or game type will be generated by the system and displayed in payout table display region 2240. Additionally, the information shown in information window 2244 will also be automatically modified to correspond to different rules governing when the second bonus game is to begin based on the initial investment value and/or the type of game selected by the user.

Figure 22C:

FIG. 22C shows an exemplary display image 2200C that includes a dynamically generated second payout table type 2250 for a second bonus game that occurs automatically upon a user reaching the maximum threshold value listed in payout table 2242 in FIG. 22B. This display image includes similar display regions as discussed above with respect to FIG. 22B.

However, the electability of the image elements in regions 2220 and 2232 is disabled. Only information in the payout table display region 2240 changes. As shown herein second payout table 2250 includes four rewards threshold levels and displays the prize amount achievable by reaching these threshold levels for a medium risk game. In the active gaming period of a medium game, and after the user has reached the highest threshold in payout table 2242, should a user reach the first bonus threshold level, the total prize earned includes a twenty five percent bonus based on the top reward shown in payout table 2242. Similarly, if a user reaches the second bonus threshold, the total prize earned includes a fifty percent bonus based on the top reward shown in payout table 2242. Reaching the third bonus threshold results in the user receiving a one hundred percent bonus based on the top reward shown in payout table 2242 and if the fourth bonus threshold is reached, the user receives a three hundred percent bonus based on the top reward shown in payout table 2242. In any event, the user will never lose that initial reward shown in the highest threshold of payout table 2242. In one embodiment, the payout table display region 2240 may include a second information window 2252 including information describing how the second bonus game is played and how rewards are achieved. The exemplary second payout table 2252 is generated to show total reward values available to the user who has already reached the maximum threshold value in a medium risk game.

Figure 22D:
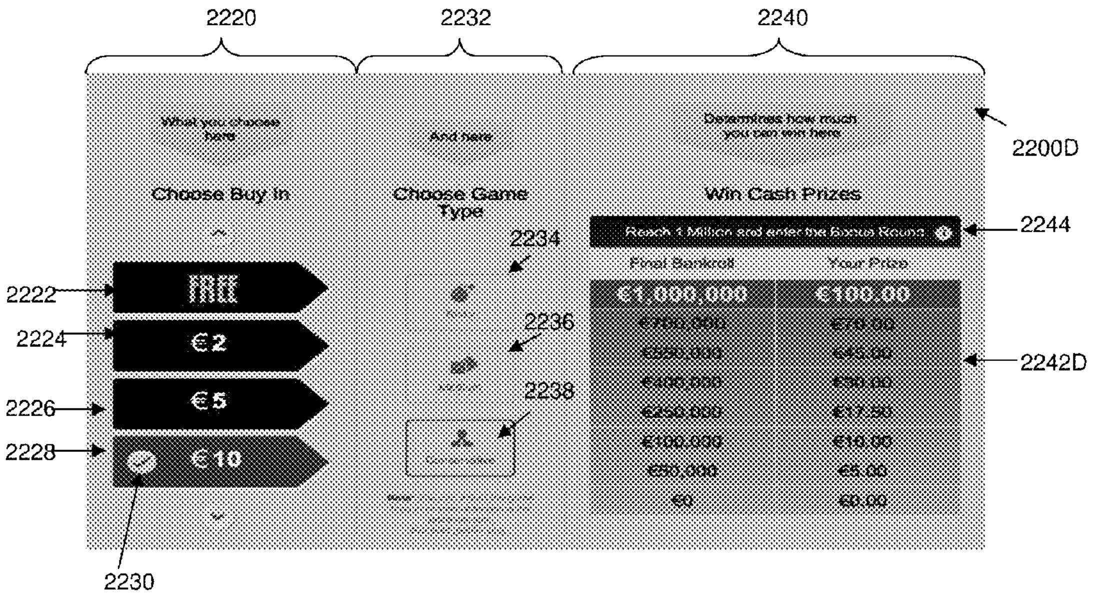
Figure 22E:
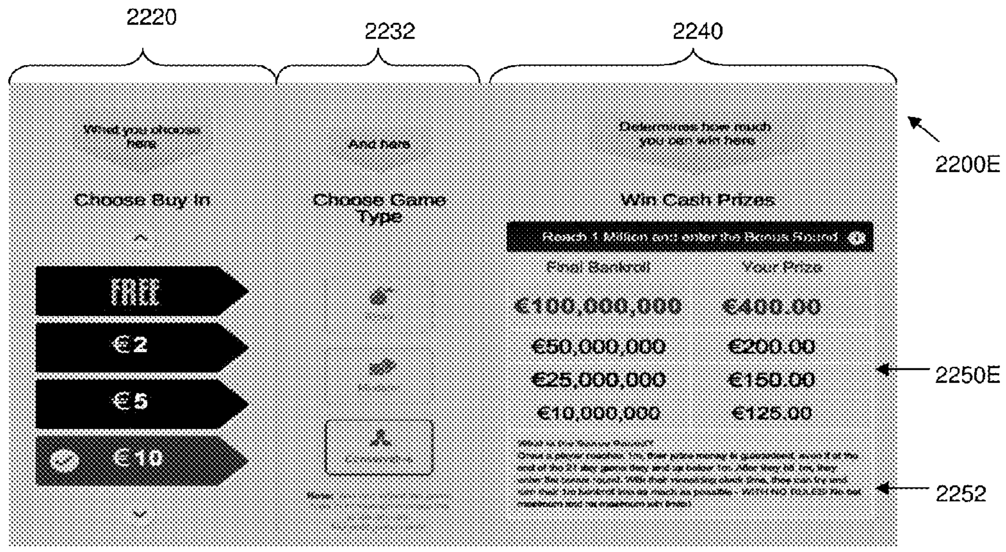

FIG. 22D is an exemplary display image 2200D similar to the display image 2200B in FIG. 22B. Thus, like reference numerals indicate common features. FIG. 22D differs from FIG. 22B in that a user has selected the image element 2238 corresponding to a selection of a "conservative" type game. In response to selection of the conservative type image element 2238, the system automatically generates a conservative payout table 2242D. The conservative payout table 2242D includes the same number of threshold levels as compared to the payout table 2242 in FIG. 22B but the amount of gaming units between respective threshold levels is less in the conservative game type as compared to the medium game type. In another embodiment, the conservative type game may include a greater number of threshold levels as compared to the medium risk game type. In a further embodiment, the conservative payout table may include any combination of greater number of thresholds and different amounts of game units between respective thresholds. Also, the rewards associated with each threshold level in the conservative payout table 2242D are less than the rewards associated with the threshold levels in the payout table 2242 in FIG. 22B. If during the course of an active gaming period it is determined that the user playing the conservative type game reaches the highest threshold (e.g. one million gaming units) shown in FIG. 22D, a dynamically generated second payout table type 2250E for a second bonus game is generated as shown in FIG. 22E. FIG. 22E includes similar elements as those shown in FIG. 22C. The second payout table type 2250E includes four bonus threshold levels as shown in FIG. 22C. The rewards associated with each bonus threshold level are of the same percentage of the reward earned by reaching the highest threshold in payout table 2242E. In the active gaming period of a conservative game, and after the user has reached the highest threshold in payout table 2242E, should a user reach the first bonus threshold level, the total prize earned includes a twenty five percent bonus based on the top reward shown in payout table 2242E. Similarly, if a user reaches the second bonus threshold, the total prize earned includes a fifty percent bonus based on the top reward shown in payout table 2242E. Reaching the third bonus threshold results in the user receiving a one hundred percent bonus based on the top reward shown in payout table 2242E and if the fourth bonus threshold is reached, the user receives a three hundred percent bonus based on the top reward shown in payout table 2242E. In any event, the user will never lose that initial reward shown in the highest threshold of payout table 2242E.

Figure 22F:
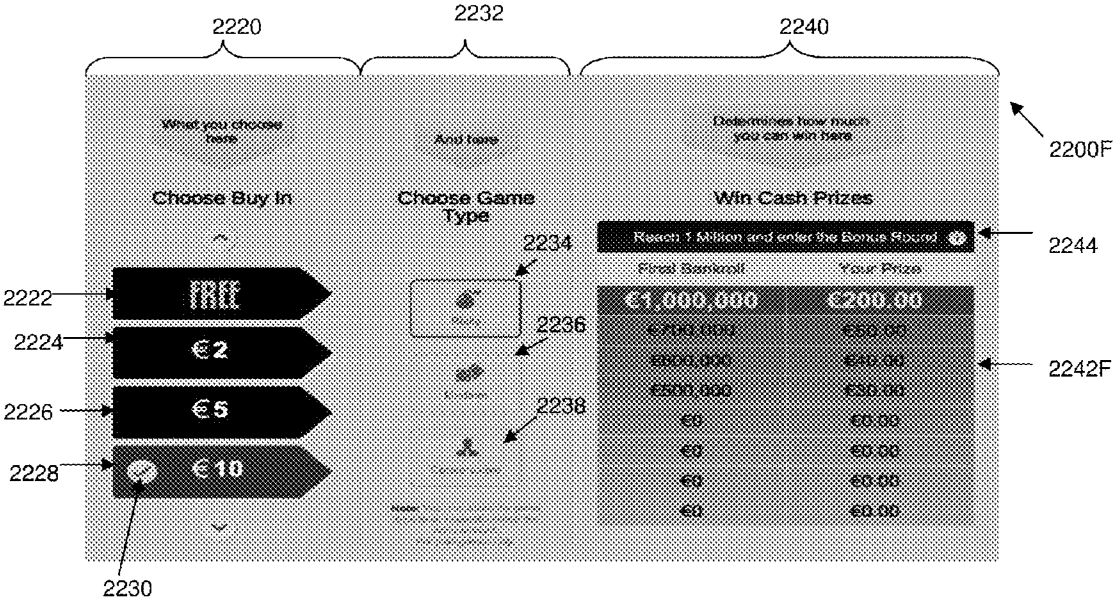
Figure 22G:
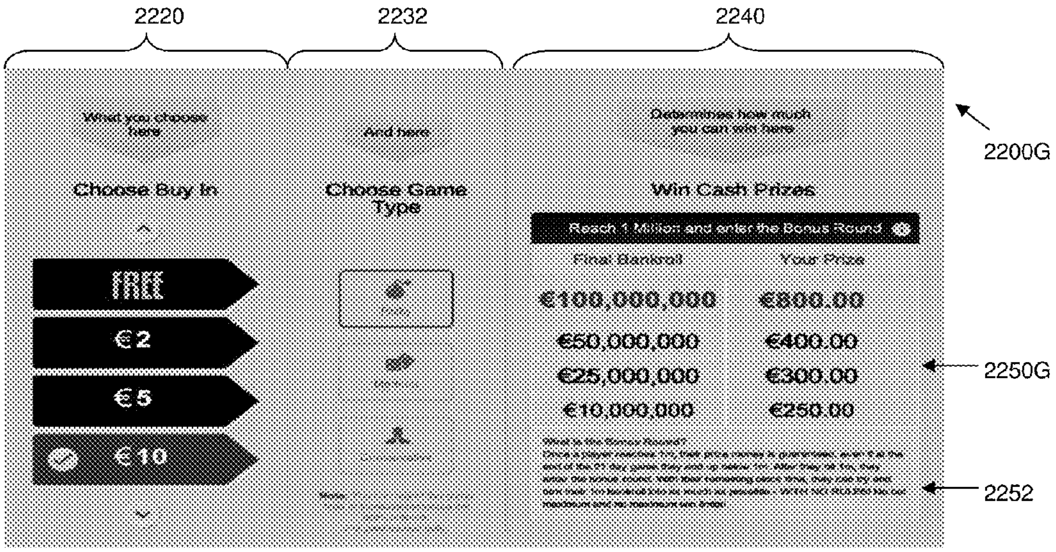

FIG. 22F is an exemplary display image 2200F similar to the display image 2200B in FIG. 22B. Thus, like reference numerals indicate common features. FIG. 22F differs from FIG. 22B in that a user has selected the image element 2234 corresponding to a selection of a "risky" type game. In response to selection of the risky type image element 2238, the system automatically generates a conservative payout table 2242F. The conservative payout table 2242D includes the same number of threshold levels as compared to the payout table 2242 in FIG. 22B but the amount of gaming units between respective threshold levels is greater in the risky game type as compared to the medium game type. In another embodiment, the risky type game may include a number of threshold levels less than the threshold levels in the medium risk game type. In a further embodiment, the risky payout table may include any combination of less number of thresholds and different amounts of game units between respective thresholds. Also, the rewards associated with each threshold level in the risky payout table 2242F are greater than the rewards associated with the threshold levels in the payout table 2242 in FIG. 22B. If during the course of an active gaming period it is determined that the user playing the risky type game reaches the highest threshold (e.g. one million gaming units) shown in FIG. 22F, a dynamically generated second payout table type 2250G for a second bonus game is generated as shown in FIG. 22G. FIG. 22G includes similar elements as those shown in FIG. 22C. The second payout table type 2250G includes four bonus threshold levels as shown in FIG. 22G. The rewards associated with each bonus threshold level are of the same percentage of the reward earned by reaching the highest threshold in payout table 2242F. In the active gaming period of a risky game, and after the user has reached the highest threshold in payout table 2242F, should a user reach the first bonus threshold level, the total prize earned includes a twenty five percent bonus based on the top reward shown in payout table 2242F. Similarly, if a user reaches the second bonus threshold, the total prize earned includes a fifty percent bonus based on the top reward shown in payout table 2242F. Reaching the third bonus threshold results in the user receiving a one hundred percent bonus based on the top reward shown in payout table 2242F and if the fourth bonus threshold is reached, the user receives a three hundred percent bonus based on the top reward shown in payout table 2242F. In any event, the user will never lose that initial reward shown in the highest threshold of payout table 2242F.

Figure 23:
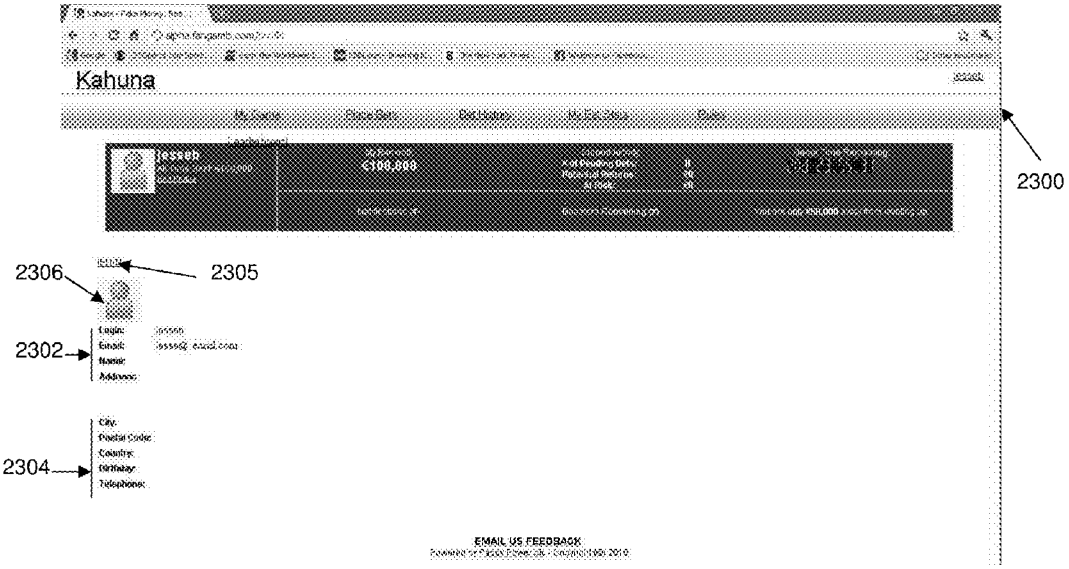

In one embodiment, once access to the gaming environment is provided, the system enables the user to input user specific characteristic data that describes the user and which may be viewed by other users in the present gaming environment. Thus, the asynchronous game provides for social interaction between a plurality of users to encourage discussion, collaboration, competition and an overall enjoyable experience. FIG. 23 is an exemplary display image 2300 of a user interface that enables a user to edit their user profile. Data stored in the user profile is presented to other users in accordance with a set of user-specified privacy rules so that only a desired level of information is shared with other users. Display image 2300 includes a first set of user characteristic fields 2302 and second set of user characteristic fields 2304. The first set of user characteristic fields 2302 include at least one of (a) user login name; (b) user email address; (c) user name and (d) user address. The second set of user characteristic fields 2304 include at least one of (a) user city; (b) postal code; (c) country; (d) birthday; (e) elephone; and (f) other user specific data. For example, user specific data may include data representing at least one of (a) the user's favorite team; (b) the user's favorite sport; (c) the user's favorite cities; (d) user's favorite type of wager and (e) the user's favorite sporting venues. The types of data described in fields 2302 and 2304 are described for purposes of example only and the user profile may contain any relevant data that can be used to describe a characteristic of a user. A respective field in the sets of fields 2302 and 2304 is selectively editable by a user in response to selection of an edit link 2305. In response to selecting the edit link 2305, the system receives an edit request message and the processor 2308 conditions the UI generator to generate a display image that allows the user to modify data appearing at least one user characteristic field in the sets of user characteristic fields 2302 and 2304. The user may selectively modify user characteristic data to update the data in the user profile that will be displayable to other users during the game. Additionally, display image 2300 includes a user specific image element identifier 2306 (e.g. avatar) that may be at least one of provided by the system or provided by the user. The user is able to upload image data for use as a user specific image element identifier 2306 when editing the user profile in the manner discussed above. Once received by the system, the identifier 2306 is linked with the user account and will be displayed to all users during the game. Alternatively, the system may allow for multiple different identifiers 2306 to be provided by the user and allow the user to specify a particular identifier 2306 to be presented to different users or different sets of users.

Figure 24:
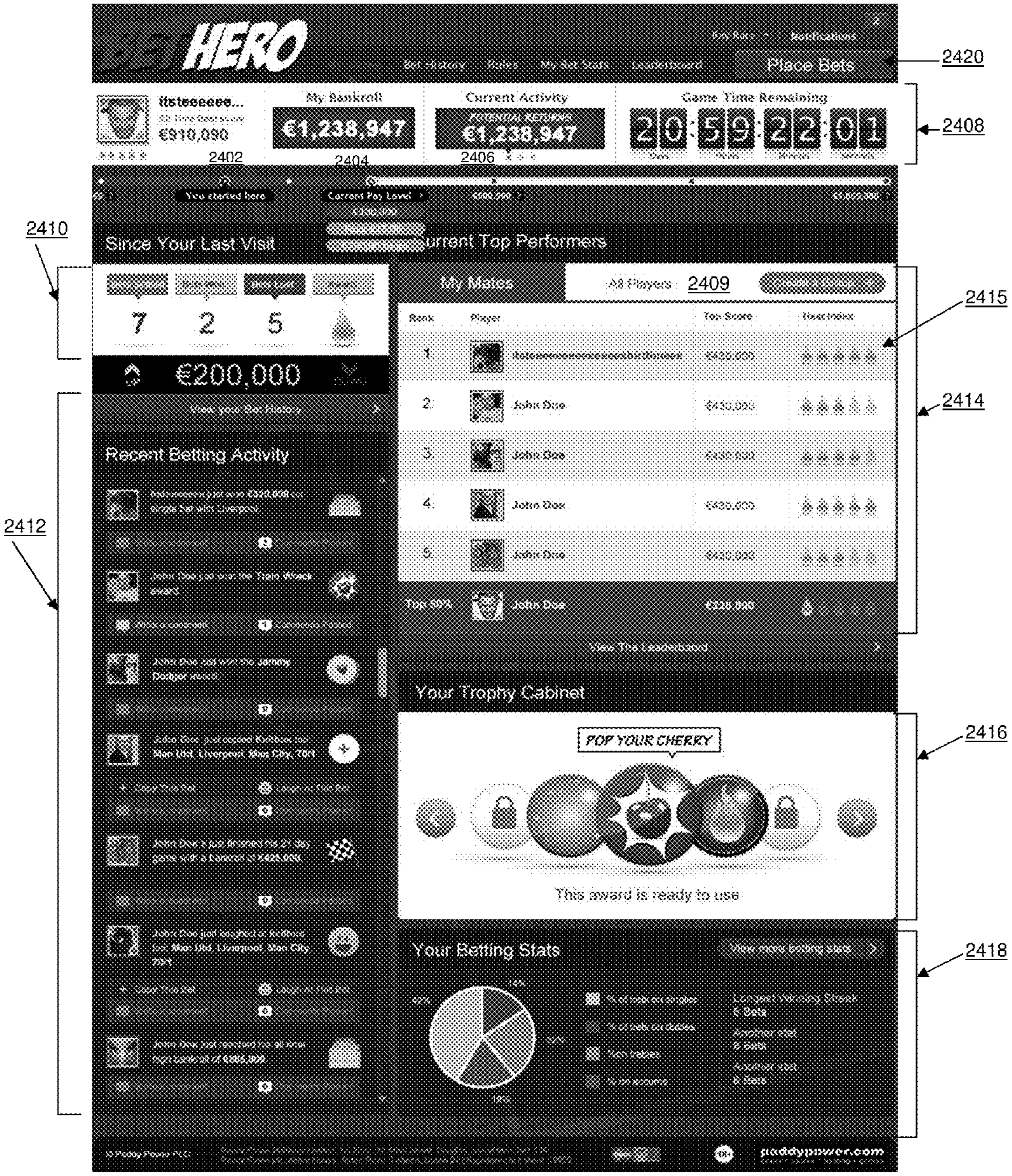
Figure 25:
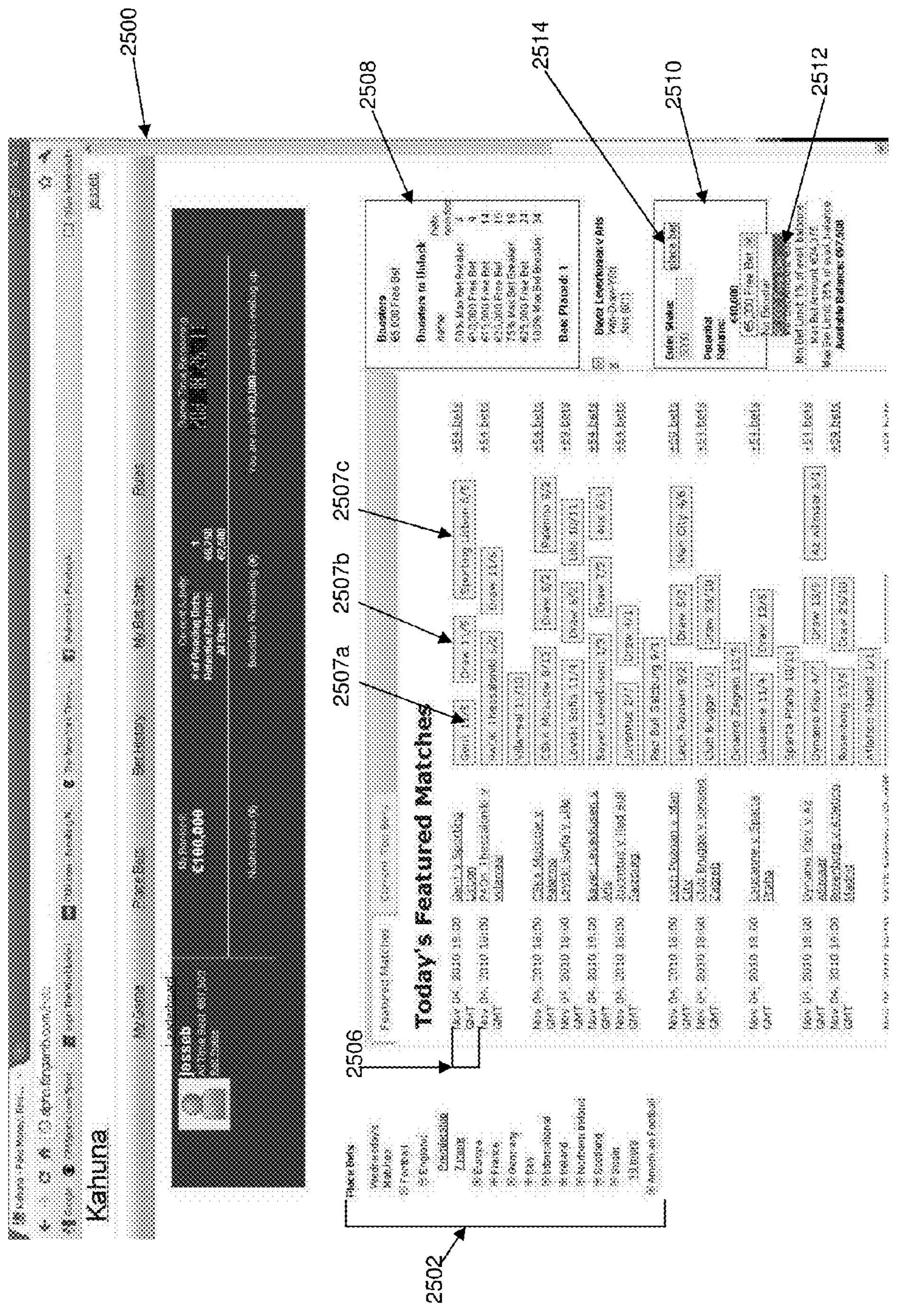

Once a user profile has been created and edited as provided in FIG. 23, the processor 2108 conditions the UI generator 2112 to generate the display image 2400 shown in FIG. 24. Display image 2400 is an exemplary display image of a home page that is presented to the user in response to user accessing the gaming environment. Display image 2400 presents a snapshot of all game information to a user and serves as game access portal facilitating game play. All data items described herein are derived from a set of user game data that is stored in repository 2110 and which the processor 2308 derives from repository 2110 based on a user home page template that specifies the type and format of the data to be provided in display image 2400. Home page template may be initially provided by the system operator and automatically implemented when the user joins a particular game. However, to support customization, the user may selectively modify the home page template data to reconfigure at least one of the type of data being displayed and the format in which the data is displayed.

User home page 2400 includes user identifier image element 2402 which was specified by the user when creating their profile (FIG. 23). The home page 2400 displays data representing the user's current amount of gaming units 2404 (e.g. bankroll). The home page also displays the user's current betting activity 2406. Current activity data provides the user with a snap-shot of the potential returns available if all active bets were successful. The game clock 2408 is also displayed on the home page 2400 in order to inform the user how much time is left in the current game and encourage the user to place additional bets before the time period ends. Game clock data is provided by clock generator 2107 and consistently updated in real-time. Home page 2400 also displays data representing betting history 2410. Betting history data include images including data representing (a) total bets settled; (b) number of bets won; (c) number of bets lost; and (d) any recent in-game awards. In-game awards are indicators that generated by the system after at least one condition during game play has been met. For example, an in-game award may be provided if the user has placed five bets and won all five bets. The indicators may be icons that are then associated with the user account in the repository and are selectively displayable on the home page 2400 as well as to other users when they access a public version of the user's home page. These awards enable other users to see how successful you have been during the game.

Home page 2400 further includes window 2412 that displays data representing recent betting activity by other game players. Recent betting activity data is provided for each user and for each bet placed by the user. The recent betting activity data includes at least one of (a) data identifying the user; (b) data identifying the type and nature of the bet; (c) data representing an amount of gaming units that were wagered and won or lost; and (d) data representing an award associated with the bet. Additionally, for each user listed in the recent betting activity window 2400, image elements identifying if other users have commented on the respective bet are presented as well as image element enabling the user to comment on the other user's activity. By selecting a comment image element, the system automatically provides the user with the ability to enter a comment using, for example, a comment form or via a messaging application. Window 2412 may also include an image element that enables scrolling thereby allowing the user to see a larger amount of recent betting activity data.

Home page 2400 may also include a players window 2414 that includes data representing all other users that the current user has identifies as "friends". Alternatively, if the player selects tab 2409, then the window includes data representing all players. Data in players window 2414 includes user identifying data, scoring data and a success indicator. Success indicator 2415 may provide other users with information regarding how successful a particular player has been over a recent period of time. In this example, the success indicators 2415 are flames and, the number of flames displayed depends on how successful the player has been over a given period. Success indicator 2415 may rate the player on a scale of 1 to 5 for example. Therefore, if over the past three days, the user has won 90% of the bets placed, then the success indicator 2415 displayed may show five flames. In another embodiment, success data may be calculated by a success algorithm that utilizes a points system to be applied to each user's bets to provide an indicator as to the success of the player without considering their bankroll. This exemplary algorithm determines the success of a player (i.e. heat index) by summing the number of bets placed over a time period multiplied by the result of each bet (e.g. 1 for win, 0 for loss) multiplied by the odds of winning the particular bet. The success algorithm is shown in equation 1 below.

$$P_{gained} = \sum (P_{placed} R_{result} O_{odds}) \quad \text{Equation 1}$$

This algorithm is applied only after a minimum number of bets have been placed by the user to prevent artificially inflating their success level. Additionally, this algorithm calculates success levels based on set of the most recent number of bets (e.g. most recent 25 bets). Additionally, a time component may be added to the algorithm whereby if a user placed a certain number of bets within a particular period (e.g. the user placed 51% of their bets during the most recent week), an additional value will be included in the algorithm that gives them a higher success level. If the user does not maintain the frequency of bets then the a penalty applies and the success level will be decreased by a predetermined amount. This algorithm is described for purposes of example only and any method to determine how successful a player has been over a given period may be employed by the system. Success data is useful to other players because it allows them to analyze bets placed by the successful player for future events and copy the bets made by that player in the hopes of increasing the bankroll. Home page 2400 may also include a window 2416 including data representing at least one of (a) an in-game reward; and (b) a betting booster that may be applied to future bets placed by the user.

A betting statistics window 2418 indicating a statistical analysis of the betting history and activity may also be displayed on home page 2400. During the duration of each game, processor 2108 automatically associates betting history data with the user account and stores all data about the user's betting history in repository 2110. At predetermined intervals, processor 2108 initiates a statistical analysis algorithm to generate betting statistics for the user. The results of the statistical analysis may be provided in window 2418. Examples of betting statistics include (a) percent of bets on a single event; (b) percent of bets on double events; (c) percent of bets on treble events; (d) percent of bets on accumulators; (e) longest win streak; and (f) average amount won. The statistics described herein are for purpose of example only and any statistic derived from user betting data may be shown in window 2418. Alternatively, the system may provide the user with the ability to create user-specific statistics that can be created by the user. The system may allow the user to select at least one type of betting data from a candidate list of stored betting data and apply a statistical measure to the selected at least one type of betting data to produce user-specific betting statistics. In another embodiment, the system may enable the user to share user-specific betting statistics with other users to help provide the other users with additional information. In a further embodiment, sharing of user-specific statistics may be provide only upon payment of a fee to the creating user and a transaction fee to the system operator thereby enabling additional revenue generation for the system operators. Additionally, in another embodiment, home page 2400 may display an image 2407 representing the payout table that is being used by the system to determine the rewards and penalties to be applied to the user. As shown herein, payout table image 2407 is an image element that includes indicators identifying a level at which the user started and the current level at which the user is at. The image 2407 further provides additional indicators representing various threshold levels that could be met to give the user a sense of their success during this particular game period.

From home page 2400 in FIG. 24, a user may select an image element 2420 that enables the user to place at least one type of bet on at least one type of contest. In response to selection of image element 2420, processor 2108 automatically queries at least one of the repository 2110 and source of betting data 2114 to identify the contests available and the types of bets available for each contest. Upon receipt of betting data, processor 2108 conditions the user interface to generate betting display image 2500 shown in FIG. 25 according to a predetermined format. Display image 2500 includes a user-navigable bar (or drop down menu) 2502 that includes a candidate list of contest types on which bets can be placed. Each item in the candidate list may be expandable to reveal additional subsets of contest types that may be available. The contests/events available for betting are automatically displayed in window 2504. Data items in window 2504 are organized into rows whereby each row 2506 represents a unique contest on which a bet may be placed. Additionally, user selectable image elements, for example, 2507*a-c* corresponding to available types of bets for each contest are displayed in each row. The system receives a betting request generated in response to selection by a user of at least one of the image elements 2507*a-c*. The system processes the received betting request and generates betting window 2510 that includes at least one user fillable field allowing the user to specify a number of gaming units to be bet on the selected bet type for the selected contest. Betting window 2510 may also include a booster selection list 2512 that enables the user to view the available betting boosters and select a booster to be applied to the current bet. Booster data is derived by the processor 2108 from user account data stored in repository 2110. Betting window 2510 further includes a place bet image element that generates a betting message or may include data representing the contest, such as the type of bet, an amount being wagered and any booster being applied. The system receives the betting message and updates the user's account and also places the bet in a queue to be reconciled. If the betting message includes a booster to be applied, the processor 2108 automatically updates the user account to reflect that the booster is no longer available.

Figure 26:
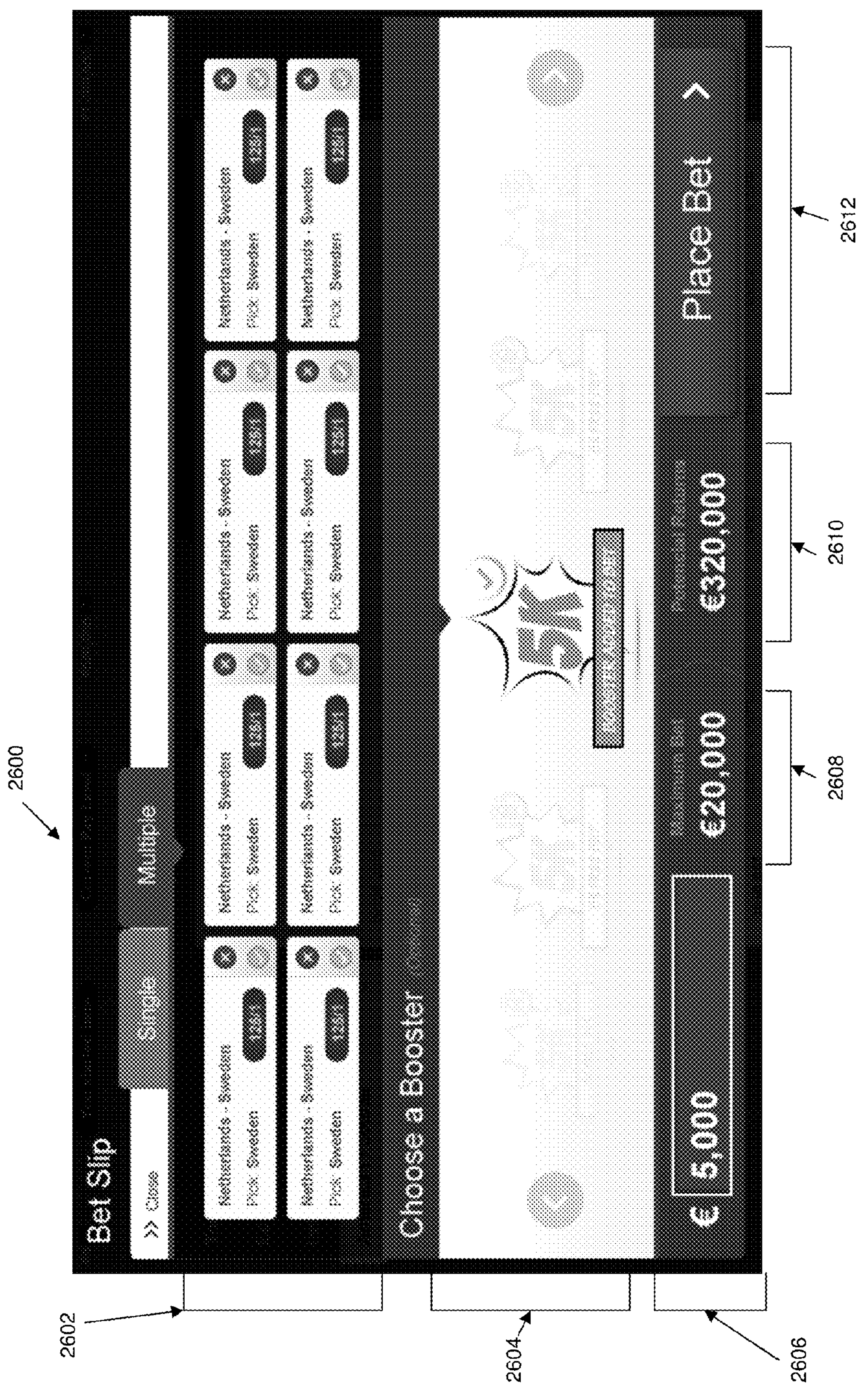

FIG. 26 is an exemplary display image 2600 of a betting slip that may be generated and presented to the user. The display image 2600 may replace the betting window 2510 described in FIG. 25. Display image 2600 includes region 2602 that provides a list of contests able to be selected as well as the type of bets associated with each contest. A user may select an image element corresponding to the contest and bet type and enter an amount of game units to be wagered in field 2606. The bet slip display image further provides the user with information about the maximum bet 2608 and potential return on a successful bet 2610. Additionally, booster window 2604 includes image elements corresponding to boosters that are available to be applied to the selected bet. In this example a "5K" booster that provides the user with 5000 game units that is not part of the user's bankroll to be wagered on the contest. Upon selection of this booster, field 2606 is automatically populated with the amount 5000. Once finalized, a user may select image element 2612 to place the bet as discussed above with respect to FIG. 25.

During game play, the system actively encourages social interaction between the players and enables the user to access other user's home pages to view a subset of user information. As described above with respect to FIG. 23, the system enables user profile creation and modification. The user may also set permission levels for types of information that may be shown to other users. For example, if the type of information is the user's email address, the user may specify that only user's indicated as "friends" may view this type of information while all other players that are not "friends" will be unable to see the user's email address. This principle is applicable to any type of information that may be entered by a user and stored by the system. Thus, each user is provided with a private homepage that is only viewable by the user such as shown in FIG. 24. Additionally, each user has a public homepage that is viewable by other system users.

Figure 27:
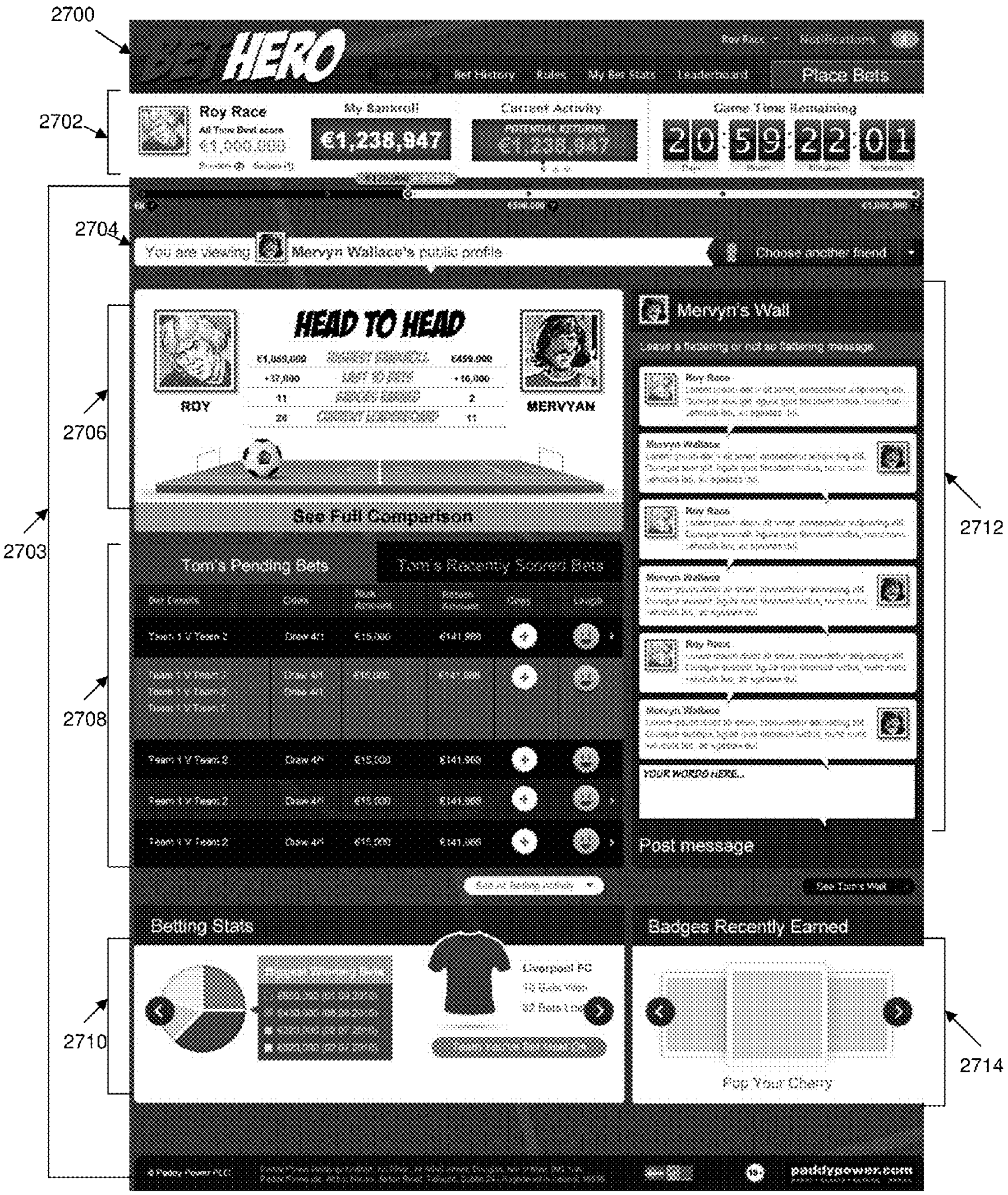
Figure 28:
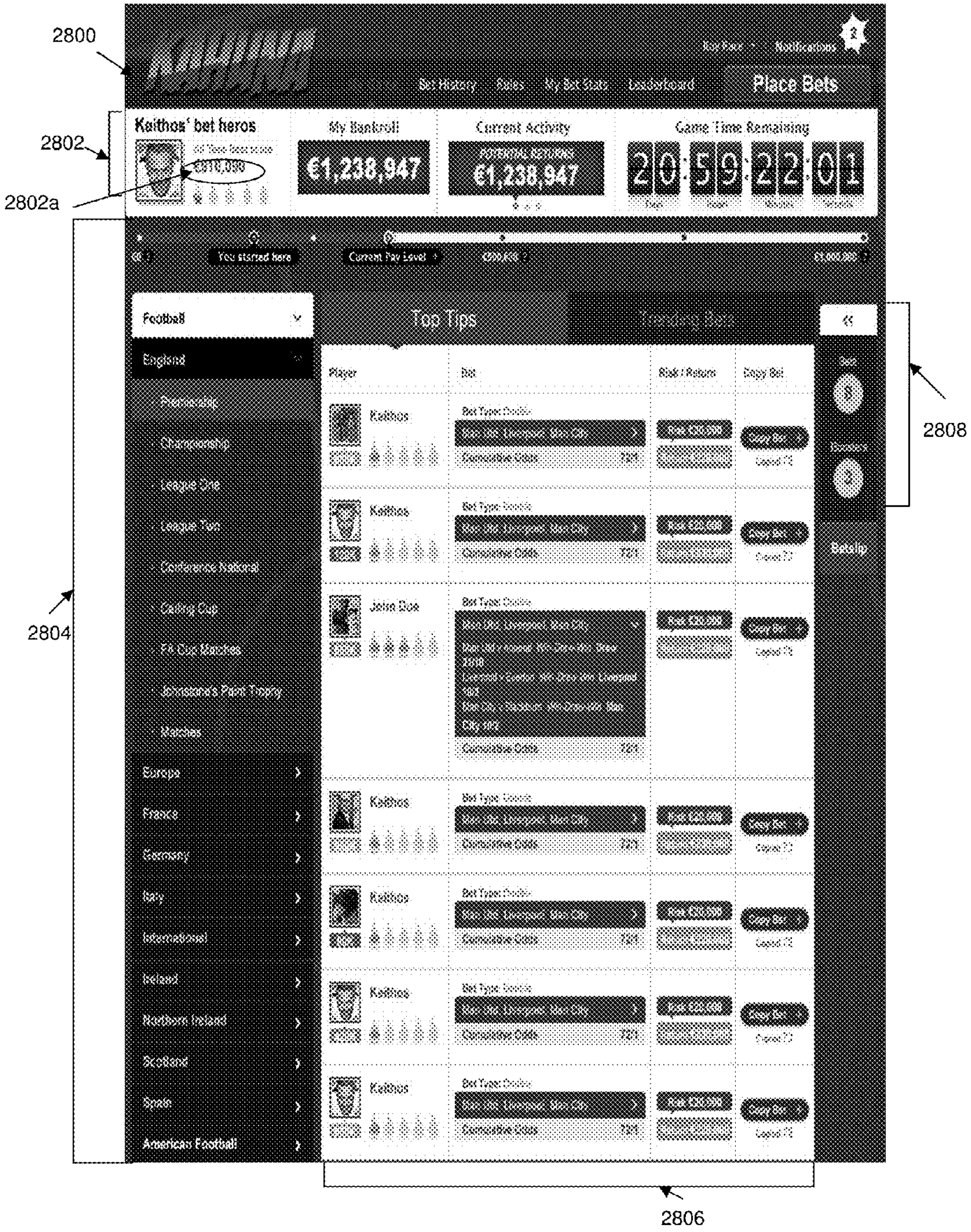

An example of a display image of a public homepage 2700 for a user is shown in FIG. 27. Data representing the public home page 2700 is generated by the UI generator 2112 in response to receipt of a control signal generated when a user selects an image element (e.g. link) corresponding to another different user. The control signal includes a user identifier identifying the user's profile sought to be accessed. Links to other users may be present on a plurality of different game pages such as the private user home page (FIG. 24), the betting page (FIG. 25) or betting slip (FIG. 26). Additionally, the other different user may or may not be playing the same game as the requesting user at the present time. Thus, the system advantageously enables users to see what other games the users are playing and how well the other users are doing in the current or other games in which they are involved. In response to receipt of the control signal, the processor 2108 queries the repository for user data corresponding to the user identifier in the control signal. Upon retrieval of the user profile data, processor 2108 parses the user data for items that are determined to be available for public viewing using user permission data associated with the identified user. Data determined to be "public" is provided to the UI generator which formats the data and generates the user display image shown in FIG. 27.

Display image 2700 includes requesting user information area 2702. The data items in area 2702 identify current in game characteristics for the user requesting profile access. In game characteristics include but are not limited to (a) user identifier; (b) bankroll data; (c) data identifying potential winnings; and (d) game clock data. Additionally, region 2702 may include a progress bar that displays a graphical representation of the user's progress along the various thresholds set forth by the payout table thereby giving the user a snapshot view of their in-game progress/status.

In addition to requesting user information area, display image 2700 includes public profile region 2703 that includes a plurality of data items associated with the user whose profile is being requested. Public profile region 2703 includes a user identifier 2704 identifying the name of the user associated with the public profile. In one embodiment, region 2704 includes a user selectable image element enabling the user to select a different user's profile. Public profile region 2703 may also include a comparison region 2706. Data in the comparison region 2706 presents a comparison of at least one game characteristic for each of the requesting users and the profiled user. An example of the at least one game characteristic includes (a) highest bankroll; (b) success over a predetermined number of recent bets; (c) number of badges (e.g. in-game awards) earned; and (d) position on the current leader board. These characteristics are described for purposes of example only and any characteristic or statistical measure tracked by the system may be presented in comparison region 2706. In one embodiment, the comparison region 2706 may include image elements enabling the requesting user to modify the type of game characteristic being displayed therein. In this instance, the user could select at least one different game characteristic causing a request message to be generated and received by the system. The processor 2108 parses the request message and identifies the new game characteristic requested by the user, queries the repository 2110 for data corresponding to the new game characteristic and provides the new characteristic data to UI generator 2112. UI generator 2112 automatically modifies the public profile region for the profiled user to include the new game characteristic data.

Public profile region 2703 may also include a betting data region 2708. Data displayed in region 2708 may include a list of pending bets that were placed by the profiled user and/or a list of bets that have been reconciled by the system and scored within the rules of the game. For each respective pending bet listed in region 2708, at least one bet characteristic is provided for display. Bet characteristics include but are not limited to (a) event or contest description; (b) bet type (e.g. odds, over/under, etc); (c) amount of game units risked; (d) amount of game units to be won if successful; and (e) booster data identifying if a booster was used.

A user selectable image element enabling the user to comment on the particular bet is also present. In response to selection of the comment image element, the system receives a comment request and automatically initiates execution of a messaging application that is able to receive user input and automatically apply the received user input to the profile of the user.

In another embodiment, for each bet listed in region 2708, the display image includes at user selectable image element that enables the requesting user to copy the pending bet and automatically place the bet in the queue of bets of the requesting user that have not yet been reconciled or settled. In response to selection of the copy image element, a copy request including data representing bet characteristics is generated. The processor 2108 receives the copy request and parses the request to identify the type and nature of the bet to be copied. The processor 2108 automatically updates a betting queue of the requesting user with bet data derived from the copy request. For example, if the requesting user sees that the profiled user is betting a Draw with 4/1 odds between Team A and Team B and risking 15000 game units and decides that this is a good bet, the user can select the copy image element and data identifying the bet, bet type and amount risked is packaged in a copy request that is received by the system. The processor 2108 automatically adds the bet to the requesting user's bet queue to be reconciled. The ability of copying bets using a single user action advantageously actively encourages users of all skill levels to view other user profiles, in particular users that have been successful in the past, to identify bets that may be successful but which the requesting user did not consider placing.

In yet another embodiment, for each bet listed in region 2708, the display image includes at user selectable image element that enables the requesting user to challenge a pending bet placed by another user. During the gaming period a user has a predetermined number of "challenges" that may be used. Challenges enable a user to question the potential success of another user's wager. In response to issuing a challenge, the system automatically awards a predetermined bonus number of gaming units to the person challenging the wager (e.g. "The Attacker") or to the person who placed the wager (e.g. "The Defender). For example, if User A challenges a wager made by User B, and User B loses the wager, then the system automatically updates User A's bankroll with a predetermined number of gaming units indicating that User A successfully attacked User B. However, if the wager placed by User B is successful, then the system automatically updates User B's bankroll with a predetermined number of gaming units. The number of gaming units available to be won by either the Attacker or the Defender may be automatically calculated by the system and based on the odds for the particular wager.

In one embodiment, the number of challenges and amount of gaming units associated with a respective challenge is based on the number of times a user logs into the current game. A user may be awarded a challenge each day the user logs into the current game. The amount of gaming units able to be awarded based on successful challenges increases with each consecutive day that a user logs into the game. On a first day, a player is presented with an initial challenge value (e.g. twenty five hundred gaming units). On a second consecutive day, the user logs into the game and is presented with a second challenge value which is a number of gaming units greater than the gaming units of the initial challenge value (e.g. five thousand gaming units). This continues for every consecutive day until a user reaches a maximum challenge value (e.g. twelve thousand five hundred gaming units). If a user fails to log into the game on consecutive days, the user then returns back to the initial challenge value at the next login. Additionally, each game period has a maximum challenge reward available to the player. For example, a user may win up to twenty five thousand gaming units using challenges.

The system further includes a plurality of challenge rules that determine which wagers may be challenged by a particular player. Wagers may be challenged if at least one of the following conditions is satisfied: (a) no other player has challenged the wager; (b) the user does not have a currently pending challenge against them; and (c) the odds on the wager are less than a threshold odds value (e.g. no greater than 2/1). In operation, upon determining that at least one of the above conditions are satisfied, a user may challenge a wager. If the wager of the player being challenged is successful, the challenged player wins an amount of gaming units equal to the challenge value. If the wager of the player being challenged loses, then the user who made the challenge wins an amount of gaming units equal to the challenge value.

Challenge data is automatically detected and stored by the system and may be provided for display on the user's page to show how successful or unsuccessful a player is in challenging other users. Additionally, information about the types of challenges, including amounts and types of contests are automatically stored and may be displayed to at least one of the user and other users in the community.

In another embodiment, challenges may be selectively determined using a challenge pay table. An exemplary challenge pay table is shown in Table 2A and 2B.

TABLE 2A

| Challenge Pay Table | | |
|---|---|---|
| Odds | Attacker Win Bonus | Defender Win Bonus |
| 10/1+ | 1000 | 19000 |
| Between 2/1 and 9.99/1 | 5000 | 15000 |
| Between 1/2 and 1.99/1 | 10000 | 10000 |
| Between 1/1.99 and 1/9.99 | 15000 | 5000 |
| 1/10+ | 19000 | 1000 |

In this exemplary embodiment, if the odds of success of a wager are 10/1, then it is unlikely that the wager is going to succeed and thus the Attacker is only awarded 1000 gaming units. However, if the wager does succeed, the Defender is awarded 19000 gaming units because the initial odds of success were so low. As the odds improve for a particular wager, the number of gaming units increases for the Attacker and decreases for the Defender. Another exemplary challenge payout table is shown in Table 2B.

TABLE 2B

| Challenge Pay Table | | |
|---|---|---|
| Odds | Attacker Win Bonus | Defender Win Bonus |
| 25/1+ | 500 | 9500 |
| Between 10/1 and 25/1 | 1000 | 9000 |
| Between 5/1 and 10/1 | 2500 | 7500 |
| Between 13/8 and 5/1 | 4000 | 6000 |
| Between 13/8 and 8/13 | 5000 | 5000 |
| Between 8/13 and 1/5 | 6000 | 4000 |
| Between 1/5 and 1/10 | 7500 | 2500 |
| Between 1/10 and 1/25 | 9000 | 1000 |
| 1/25+ | 9500 | 500 |

The amounts listed in the payout tables are shown for purposes of example only and the system may use any number of gaming units at each level for a particular challenge. Alternatively, the amounts available to be won may be calculated dynamically and be based, at least in part, on the success rate of the user making the challenge. For example, if the attacking user has been successful on a predetermined number of challenges over all games played, then the system may modify the amount of gaming units available to be won in further challenges. The available gaming units may at least one of increase or decrease based on the challenge success rate of a particular user.

In exemplary operation, upon determining an amount of available gaming units to be won by the Attacker and the Defender, the system may automatically present this information as challenge outcome information within the user interface. For example, the UI generator 2112 (FIG. 21) may generate a pop-up display image element that appears when a user scrolls over the user selectable challenge image element thereby providing the user with the amount of gaming units able to be won by the attacker if the challenge is successful as well as the amount of gaming units able to be won by the defender if the challenge is unsuccessful. The challenge module implemented by the system advantageously contributes to the social aspect of the risk-based asynchronous game by letting users interact and affect the outcome of their respective games without actually playing the same game.

The challenge module implemented by the system may execute on the processor 2108 (FIG. 21) and be governed by a set of challenge rules stored in repository 2110 (FIG. 21). The challenge rules are applied to each user playing a game in a unique manner. Challenge rules data may identify a set of players that the user is able to challenge. In one embodiment, the set of players able to be challenged include other users that are identified as "friends". Alternatively, the set of users able to be challenged may also include other users who the challenging user has been "following" over a predetermined time period. For example, if User A notes that User B has been very successful, User A may designate User B as a person of interest and enable User A to follow User B's progress. In another embodiment, the set of users may include users who are indicated as following one another. Challenge rules may also include data representing a number of challenges available to a particular user. For example, if the gaming period is twenty one days, a user may have three challenges available. Additionally, the number of available challenges may be automatically updated based on the successful use of the challenges at least one of (a) during the current gaming period and (b) over the course of at least two gaming periods. In one embodiment, if the user has been successful a certain number of times, the number of available challenges at the start of any gaming period may be increased from three to four. The amount of challenges is described for purpose of example only and any number of challenges may be available to the player as part of a set of challenge rules.

In response to reconciliation of challenges placed by users, the system automatically derives challenge data that may be used in additional aspects of system operation. Challenge data may be stored in repository 2110 (FIG. 21) as part of the user profile. Challenge data may include data representing at least one of (a) number of challenges available; (b) number of challenges that have been used; (c) the success/failure of challenges used during current gaming period and/or all gaming periods; (d) amount of gaming units won by the Attacker on successful challenges during the current gaming period and/or over all gaming periods; (e) amount of gaming units won by defenders on unsuccessful challenges during the current gaming period and/or over all gaming periods; (f) user identification data identifying users that have been challenged frequently; (g) types of wagers on which the challenges were issued; (h) success and failure rate on challenges according to the type of wager; and (i) data representing in-game rewards acquired based on challenges.

Challenge data may be used by the system to automatically calculate challenge statistics that are selectively displayed on the user profile page. Alternatively, challenge data may be used by the system to generate notification messages that are transmitted to the user and the user's friends indicating the success and/or failure of challenges placed by the user. Challenge data may also be used by the system in determining in game rewards (e.g. badges) that indicate that user's have met a certain threshold of success. For example, if the player has won all three challenges during a gaming period, a badge indicating that the user has been "challenge perfect" may be applied to the user and shown in the user profile. Additionally, challenge data may be used to determine if the user is entitled to any challenge boosters. Challenge boosters operate in a similar manner as the boosters described hereinabove but are challenge specific. An example of a challenge booster may be a re-calculation of the challenge payout table to at least one of increase or decrease an amount of gaming units able to be won by a user if the user has been successful on a predetermined number of challenges during at least one of the current gaming period and over the course of all gaming periods. A further example of a challenge booster may be the issuance of additional available challenges if the user has been successful on a predetermined number of challenges during at least one of the current gaming period and over the course of all gaming periods.

In another embodiment, the system automatically reconfigures a set of available boosters based on at least one piece of challenge data stored by the system. For example, a user may not be able to challenge other user's until at least a certain threshold milestone has been achieved. Thus, the challenges available to the user's may take the form of challenge boosters whereby the boosters are automatically awarded to the user after a threshold condition has been met (e.g. placing a predetermined number of bets or winning a predetermined number of bets). This is described for purposes of example only and any piece of challenge data stored by the system may be used to selectively add and/or remove boosters from a user's account depending on the rules of the game.

In response to selection of the challenge image element, a challenge request including data representing bet characteristics is generated. The processor 2108 receives the challenge request and parses the request to identify the type and nature of the bet to be challenged as well as data identifying the user who placed the bet. The processor 2108 automatically updates a betting queue of the challenging user with bet data derived from the challenge request. When the contest has been completed and the bets have been reconciled, the system determines if the bet was successful or unsuccessful. Upon determining the success or failure of the bet, the processor 2108 queries the challenge payout table to identify an amount of gaming units to be awarded to the challenging user, if the bet was unsuccessful, or the user who placed the original bet if the bet was successful. The processor 2108 automatically adds an amount of gaming units corresponding to the identified amount of gaming units listed in the challenge payout table. The processor 2108 also automatically updates the user profile of the challenging user to note that a challenge has been used as well as whether or not the challenge was successful.

The challenge module advantageously introduces a feature to the game that improves interaction with other users by encouraging users to actively view one another progress in the attempt to win additional gaming units without risking any bankroll. This motivates users to add friends as well as motivate the users added as friend to play and interact with one another. The challenge module is mutually beneficial for players and impacts their progress and opportunities in the game by enabling them to win additional gaming units.

Profile region may also include a betting statistics region 2710 that includes betting statistics for the profiled user. The data in this region is similar to the data described above with respect to FIG. 24. An example of a betting statistic shown in region 2710 is data identifying a team that on which the profiled user has placed the most bets as well as the number of successful outcomes of those bets as compared to the number of unsuccessful outcomes associated with that team.

Profile region 2703 may also include a user comment region 2712 that includes data representing comments posted by at least one user about the profiled user. The comment region may also include a user fillable data field enabling the requesting user to comment on the profiled user. By filling the comment field in the comment region 2712, a comment message is generated including the user-entered data and transmitted for receipt by the processor 2108. Data included in the comment message is automatically appended to the profiled user's account and data representing the comment will be placed within the comment region 2712 of the profiled user.

Profile region 2703 may also include an award region 2714 including data items that identify various awards that have been won by the profiled user. Awards may be displayed as "badges" that identify that certain in game conditions have been met. The rules under which the game is operated include at least one set of conditions that, if met, result in an award being appended to a user account. For example, in response to placing the first bet in the game, the system may automatically award a badge indicating that the player is now officially playing the game. In another example, if the player has placed ten bets and was successful on all ten bets, then a badge indicating that condition has been met will be appended to the user's account. Badges may be image elements that are stylized and designed to correlate to the condition that needs to be met in order for the badge to be awarded. Some badges will be publically promoted "goals" to drive specific desirable user behavior. Other badges will be so-called "mystery badges" which aren't publically promoted until they are won and displayed by a user on their profile. Additionally, badges may be accompanied by boosters that may be used to enhance future bets that were placed. In another embodiment, upon earning a particular badge the user may also earn bankroll bonuses associated with that badge. The bankroll bonuses associated with each badge may be selectively redeemable during at least one of a current game or future game. Thus, the bankroll bonus amounts may carry over during the life of the user's account to be redeemed later. Alternatively, the bankroll bonuses may be automatically deposited into a user's system account upon earning these badges. For example, badges may include (a) a bronze badge which may be associated with a bankroll bonus of twenty thousand gaming units; (b) a silver badge which may be associated with a bankroll bonus of thirty thousand gaming units; (c) a gold badge which may be associated with a bankroll bonus of forty thousand gaming units; and (d) a platinum badge which may be associated with a bankroll bonus of fifty thousand gaming units. Award region 2714 enables the requesting user to view award information, including badges and boosters, that have been earned by the profiled user. This information advantageously allows the requesting user to see how successful the player has been and may result in the requesting user copying bets from the profiled user in order to improve the success of the requesting user.

In another embodiment, the system generates a display image 2800 that is displayed when a user is placing bets during the gaming period. This image provides the user with information about bets that are being placed by other users during the corresponding gaming period. Similarly as discussed above with respect to FIG. 27, display image 2800 includes user information region 2802. An example of a type of user information shown in region 2802 is user level information 2802*a* that provides an indicator representing the highest threshold level reached by the user in any game played at any time. The user level information is further displayed on a leader board which compares the highest values each user has reached in a any gaming period. Display image 2800 includes contest selection region that identifies all available contest types on which wagers can be placed. Display image 2800 may also include an information window 2806 that includes a list of a plurality of data items representing bets that have been placed by other users and have been identified as "tips" by the user placing the bet. Respective bets are displayed in rows and include at least one of (a) data identifying the user who placed the bet; (b) data identifying the success of the user who placed the bet; (c) the type of bet; (d) type and nature of the contest; (e) data identifying the amount risked; and (f) data identifying the potential return. Additionally for each bet listed, an image element indicating the recent success of the users who has placed the bet is shown thereby enabling the viewing user to determine if he/she would like to place the same or similar bet. Bet copying image element 2810 is provided for each bet and, upon selection thereof, data representing the bet is automatically added to the requesting user's queue and the bet will be settled at the designated time. In order to provide additional information to the user, display image 2800 includes user-specific bet information in region 2808. Data items in region 2808 include at least one of (a) the number of bets placed; and (b) a number of boosters available to be used on future bets.

The above described asynchronous game system advantageously enables a single player to test their knowledge and skill on picking the correct outcome of a contest or event. In another embodiment, a plurality of users (2 or more) may team up together and engage in a cooperative game where the users together provide an initial investment value to be staked in a game. In the cooperative gaming environment, the users, via their own homepages are able to operate and engage all game features including placing bets on any contest that occurs during the gaming period. In this manner, the cooperation fosters further social interaction between the community of users. Moreover, in the cooperative gaming environment, the system enables each user agreeing to cooperate to stake their own amount of money and the dynamically created payout table generated by the system uses the combined initial investment value. In the instance when the users stake different individual amounts, the system automatically apportions an amount of reward that is due to each player if certain thresholds are met. In one embodiment, the individual initial investment values are confidential and the actual payout amounts are only provided on the respective user's home page.

The above described asynchronous gaming environment may incorporate any of the features described with respect to the league creation gaming system including but not limited to rules, operation, revenue generation mechanisms and the like.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

What is claimed is:

1. A method of providing an interactive gaming system for a plurality of users connected via a communication network includes the activities of:

creating, via a processor, at least one interactive social gaming community allowing at least one of a plurality of users to engage in a wagering contest against a single entity;

allocating, via the processor, an initial amount of gaming units to each of the at least one of the plurality of users, the initial amount of gaming units associated with an initial investment amount selected by each of the at least one of the plurality of users;

receiving, via the processor, data representing a risk level associated with a type of game from each of the at least one of the plurality of users;

dynamically generating, via the processor, data representing a payout table including at least one threshold including an amount of gaming units associated with at least one type of reward available to each of the at least one of the plurality of users, the payout table being associated with the risk level of the type of game, wherein the risk levels include at least one of (a) a conservative risk level having a first maximum reward level and a first number of threshold levels; (b) a medium risk level having a second maximum reward level greater than the first maximum reward level and a second number of threshold levels less than the first number of threshold levels; and (c) a high risk level having a third maximum reward level greater than the second maximum reward level and a third number of threshold levels less than the second number of threshold levels;

automatically, via the processor, reconciling a bet request signal received from a user with an outcome of at least one type of contest occurring during an active gaming period, the bet request signal including data representing the amount of gaming units to be associated with at least one type of wager on the at least one type of contest;

updating, via the processor, a user account by modifying the amount of gaming units in a user account based on a result of the at least one type of wager; and comparing, via the processor, data representing a current amount of gaming units in the user account with the at least one threshold to determine if each of the at least one of the plurality of users has earned the at least one type of reward associated with the at least one threshold.

2. The method as recited in claim 1, wherein the activity of dynamically generating further includes:

generating, via the processor, a payout table including a plurality of thresholds, each threshold representing an associated type of reward available to the user.

3. The method as recited in claim 1, wherein:

the risk level determines at least one of (a) a number of threshold levels to be included in the payout table; (b) an amount of gaming units separating respective threshold levels; (c) a maximum reward available to the user upon reaching a threshold having the greatest number of gaming units associated therewith; and (d) rewards associated with respective ones of the thresholds in the payout table.

4. The method as recited in claim 1, wherein upon determining that each of the at least one of the plurality of users has reached the at least one threshold level, further comprising the activity of:

providing, via the processor, each of the at least one of the plurality of users with the reward associated with the at least one threshold level.

5. The method as recited in claim 4, further comprising the activity of:

initiating, via the processor, a second game period at the conclusion of the active gaming period enabling each of the at least one of the plurality of users to earn a bonus associated with the reward level by wagering additional gaming units in an amount greater than the at least one threshold to reach at least one bonus threshold and earning a bonus reward in addition the provided reward.

6. The method as recited in claim 4, further comprising the activity of:

automatically generating a second payout table including at least one further threshold level associated with at least one further reward, the at least one further reward being a bonus reward available in addition to the provided reward; and displaying the second payout table on a user's display device.

7. The method of claim 1, further comprising the activity of receiving, via the processor, data representing a challenge from a first user of the plurality of users to a wager placed by a second different user of the plurality of users, the challenge data including an amount of challenge gaming units to be wagered and information identifying the second user and a respective wager placed by the second user;

reconciling, via the processor, a challenge outcome by determining if the wager placed by the second user was successful; and if the second user's wager was successful, subtracting an amount of gaming units equal to the amount of challenge game units from the first user's account, or if the second user's wager was unsuccessful, adding an amount of gaming units equal to the amount of challenge game units to the first user's account.

8. The method of claim 7, further comprising the activity of providing, via the processor, a challenge option to each of the at least one of the plurality of users on each day during the active gaming period in which the user logs into the game.

9. The method of claim 8, wherein the activity of providing a challenge includes:

identifying a first amount of challenge game units available to each of the at least one of the plurality of users on a given day during the active gaming period;

automatically increasing an amount of challenge game units available to each of the at least one of the plurality of users upon logging into the game on successive days; and upon detecting that each of the at least one of the plurality of users has failed to log into the game on successive days during the active gaming period, automatically reducing the amount of challenge game units to the first amount.

10. The method of claim 1, wherein said activity of creating comprises setting rules identifying at least one type of contest able to be wagered on by the at least one of the plurality of users; and at least one type of wager to be associated with the selected contest.

11. The method of claim 10, wherein said at least one type of contest includes at least one of a sporting event and non-sporting event including competition between competitors performing at least one task and having a definitive outcome.

12. The method of claim 10, wherein the at least one type of wager includes selecting at least one of an outcome of the contest and an outcome of an event within the contest.

13. The method of claim 10, wherein the rules include an allotment of allowable wager types including at least one of a max bet representing a maximum amount of gaming units able to be wagered on particular contest;

a min bet representing a minimum amount of gaming units able to be wagered on the particular contest; and a lock bet enabling a player to multiply an amount able to be won on a particular wager without risking an additional amount of the bankroll.

14. The method of claim 1, wherein the activity of creating includes defining the active gaming period during wherein a wager may be placed on any contest occurring during the active gaming period.

15. The method of claim 14, further comprising displaying, via a user interface generator, an amount of time remaining in the active gaming period to each of the at least one of the plurality of users.

16. The method of claim 1, wherein the activity of reconciling includes automatically updating an account of each of the at least one of the plurality of users by (a) adding gaming units won to the user account in response to winning wagers; (b) subtracting gaming units lost from the user account in response to losing wagers; and (c) making no modification to the user account if the user neither won nor lost the wager.

17. A interactive gaming system comprising:

a processor that creates at least one interactive social gaming community allowing at least one of a plurality of users to engage in a wagering contest against a single entity;

allocates an initial amount of gaming units to each of the at least one of the plurality of users, the initial amount of gaming units associated with an initial investment amount selected by the each of the at least one of the plurality of users;

receives data representing a risk level associated with a type of game from each of the at least one of the plurality of users;

dynamically generates data representing a payout table including at least one threshold including an amount of gaming units associated with at least one type of reward available to the each of the at least one of the plurality of users, the payout table being associated with the risk level of the type of game, wherein the risk levels include at least one of (a) a conservative risk level having a first maximum reward level and a first number of threshold levels; (b) a medium risk level having a second maximum reward level greater than the first maximum reward level and a second number of threshold levels less than the first number of threshold levels; and (c) a high risk level having a third maximum reward level greater than the second maximum reward level and a third number of threshold levels less than the second number of threshold levels;

automatically reconciles a bet request signal received from each of the at least one of the plurality of users with an outcome of at least one type of contest, the bet request signal including data representing an amount of gaming units to be associated with at least one type of wager on the at least one type of contest;

updates accounts of each of the at least one of the plurality of users by modifying an amount of gaming units based on a success of the at least one type of wager; and compares data representing a current amount of gaming units in the account of each of the at least one of the plurality of users with the at least one threshold to determine if the at least one type of reward associated with the at least one threshold has been earned by each of the at least one of the plurality of users;

an image generator connected to said processor that generates display images in response to a control signal from said processor and enables each of the at least one of the plurality of users to access said system; and an interface that connects said processor to the plurality of users through a communication network and provides said display images from said image generator to said each of the at least one of plurality of users.

18. The system of claim 17, wherein the at least one type of contest includes at least one of a sporting event and non-sporting event that includes competition between competitors performing at least one task and having a definitive outcome, and the at least one type of wager includes an outcome of the contest and an outcome of an event within the contest.

19. The system as recited in claim 17, wherein:

the risk level determines at least one of (a) a number of threshold levels to be included in the payout table; (b) an amount of gaming units separating respective threshold levels; (c) a maximum reward available to the user upon reaching a threshold having the greatest number of gaming units associated therewith; and (d) rewards associated with respective ones of the thresholds in the payout table.

20. The system as recited in claim 17, wherein upon determining that each of the at least one of the plurality of users has reached the at least one threshold level, the processor provides each of the at least one of the plurality of users with the reward associated with the at least one threshold level.

21. The system as recited in claim 20, wherein said processor initiates a second game period enabling the user to earn a bonus associated with the reward level by wagering additional gaming units in an amount greater than the at least one threshold to reach at least one bonus threshold and earning a bonus reward in addition to the provided reward.

22. The system of claim 17, wherein said processor receives data representing a challenge from a first user of the plurality of users to a wager placed by a second different user of the plurality of users, the challenge data including an amount of challenge gaming units to be wagered and information identifying the second user and a respective wager placed by the second user;

reconciles a challenge outcome by determining if the wager placed by the second user was successful; and if the second user's wager was successful, subtracting an amount of gaming units equal to the amount of challenge game units from the first user's account, or if the second user's wager was unsuccessful, adding an amount of gaming units equal to the amount of challenge game units to the first user's account.

23. The system of claim 17, wherein said processor defines an active gaming period wherein a wager may be placed on any contest occurring during the active gaming period and said image generator displays an amount of time remaining in the active gaming period to each of the at least one of the plurality of users.

* * * * *